(12) United States Patent
Noba

(10) Patent No.: US 7,623,198 B2
(45) Date of Patent: Nov. 24, 2009

(54) LIGHT SOURCE APPARATUS AND DISPLAY APPARATUS HAVING THE SAME

(75) Inventor: Koya Noba, Fujiyoshida (JP)

(73) Assignee: Citizen Electronics Co., Ltd., Fujiyoshida-shi, Yamanashi-ken (JP)

(*) Notice: Subject to any disclaimer, the term of this patent is extended or adjusted under 35 U.S.C. 154(b) by 87 days.

(21) Appl. No.: 12/041,222

(22) Filed: Mar. 3, 2008

(65) Prior Publication Data
US 2008/0259244 A1    Oct. 23, 2008

(30) Foreign Application Priority Data

Mar. 2, 2007   (JP)   ............... 2007-052983
May 18, 2007   (JP)   ............... 2007-133104

(51) Int. Cl.
*G02F 1/1335*    (2006.01)

(52) U.S. Cl. .................................. 349/67
(58) Field of Classification Search .............. 349/67
See application file for complete search history.

(56) References Cited

U.S. PATENT DOCUMENTS

2006/0158080 A1   7/2006   Nakano et al.

FOREIGN PATENT DOCUMENTS

JP    63-132215 A    6/1988
JP    2002-244211 A    8/2002

OTHER PUBLICATIONS

Noba, U.S. Application entitled "Light Source Apparatus", U.S. Appl. No. 11/963,529, filed Dec. 21, 2007 (12820/59).

*Primary Examiner*—David Nelms
*Assistant Examiner*—Phu Vu
(74) *Attorney, Agent, or Firm*—Brinks Hofer Gilson & Lione

(57) ABSTRACT

The present invention provides a light source apparatus less costly, capable of being reduced in size and thickness and superior in light combining performance and a display apparatus having the light source apparatus. The light source apparatus has a plurality of light sources different in emission wavelength from each other and a prism sheet having a plurality of mutually parallel fine elongated prisms on at least one surface thereof. Lights from the light sources enter the prism sheet through a light entrance surface of the prism sheet at a predetermined angle and output from an exit surface thereof as color-mixed exiting light. A bandpass mirror is disposed between each light source and the prism sheet to transmit light in a wavelength region emitted from the associated light source and to reflect light in the other wavelength regions.

28 Claims, 53 Drawing Sheets

(a)

(b)

(c)

(d)

US 7,623,198 B2

LIGHT SOURCE APPARATUS AND DISPLAY APPARATUS HAVING THE SAME

REFERENCE TO THE RELATED APPLICATIONS

This application claims priority under 35 U.S.C. §119 to Japanese Patent application No. JP2007-052983 filed on Mar. 2, 2007 and Japanese Patent application No. JP2007-133104 filed on May 18, 2007, the entire contents of which are hereby incorporated by reference.

TECHNICAL FIELD

The present invention relates to a light source apparatus that mixes a plurality of different colors of incident light from a plurality of light sources and emits the color-mixed light. More particularly, the present invention relates to a light source apparatus capable of being reduced in size and thickness and improved in light utilization efficiency and also relates to a display apparatus having such a light source apparatus.

RELATED CONVENTIONAL ART

There have heretofore been display systems using color light sources, such as color projectors, projection type color television systems, and liquid crystal display systems using a backlight unit and so forth. One type of light source apparatus used in these systems, e.g. color projectors and projection type color television systems, employs a dichroic prism (for example, see Japanese Patent Application Publication No. 2002-244211). This type of light source apparatus suffers, however, from the disadvantages that because the dichroic prism is a costly member, the overall cost of the apparatus increases unfavorably. In addition, this type of light source apparatus essentially involves a large loss in light quantity. To solve these disadvantages, there has been proposed a light source apparatus that uses linear prisms to convert a plurality of lights into a single beam (for example, see Japanese Patent Application Publication No. Sho 63-132215). As a backlight unit for liquid crystal display systems and the like, a light source apparatus has been proposed in which light emitted from an LED (light-emitting diode) light source is passed through two prism sheets to enhance the uniformity of luminance (for example, see Japanese Patent Application Publication No. 2006-228710).

The arrangements of the conventional light source apparatus will be explained below with reference to the accompanying drawings. FIGS. 53 and 54 show the arrangement of a color projector disclosed in Japanese Patent Application Publication No. Sho 63-132215. FIG. 53 is a schematic view showing the arrangement of the color projector. FIG. 54 is a fragmentary sectional view of a part of a linear prism plate shown in FIG. 53. In FIG. 54, a linear prism plate 50 has an upper surface serving as an exit surface having a multiplicity of prism rows and a lower surface constituting a plane light entrance surface 51. Light P51a and P51b entering the linear prism plate 50 through the light entrance surface 51 from two different oblique directions are refracted by the light entrance surface 51 and thereafter refracted by two exit surfaces 52 and 53, respectively, of each prism and are finally emitted from the linear prism plate 50 as light P52 and P53 in the same direction.

That is, by appropriately designing the refractive index of the linear prism plate 50, which is determined by the constituent material thereof, and the prism apex angle (tip angle), two light entering the linear prism plate 50 on the prism rows from two directions perpendicular thereto are refracted by two exit surfaces of each prism and are finally emitted in the same direction. Based on this principle, incident light from two different kinds of light sources can be combined together and emitted as single combined light. If the two different kinds of light sources emit lights of different colors, two colors of light can be mixed and emitted as color-mixed light. If it is desired to combine together lights from three or more different kinds of light sources, combining of lights is repeatedly by using a plurality of linear prism plates 50 to obtain combined light.

FIG. 53 shows a color projector having a light source apparatus that combines together three colors of light, i.e. red (hereinafter referred to as "R"), green (hereinafter referred to as "G") and blue (hereinafter referred to as "B"), by using two linear prism plates 50 as shown in FIG. 54. In the figure, linear prism plates 50a and 50b have the same structure as that of the above-described linear prism plate 50. Reference numerals in FIG. 53 are used to denote as follows: 55 is a projection lens; 56 is a projection screen; 57 is an R light source; 58 is a G light source; 59 is a B light source; and 61, 62 and 63 are relay lenses of the R, G and B light sources 57, 58 and 59.

The R light source 57 and the G light source 58 are arranged to face a light entrance surface of the linear prism plate 50a at an angle of 45° in different directions. R light and G light emitted from the R light source 57 and the G light source 58 respectively are collimated into parallel light through the respective relay lenses 61 and 62 and then reenter through the light entrance surface of the linear prism plate 50a from mutually different 45° oblique directions. The two incident light R and G are combined together by the linear prism plate 50a and exit as single light from the exit surface of the linear prism plate 50a in a direction perpendicular thereto. The combined light exiting the linear prism plate 50a enters the linear prism plate 50b through the light entrance surface of the linear prism plate 50b, which is disposed at an angle of 45° to the linear prism plate 50a, from a 45° oblique direction.

B light emitted from the B light source 59 is collimated into parallel light through the relay lens 63 before entering the linear prism plate 50b through the light entrance surface of the linear prism plate 50b from a 45° oblique direction different from the incidence direction of the single light synthesized from R and G light. As a result, the R and G combined single light and the B light are combined together by the linear prism plate 50b and emitted as single light synthesized from R, G and B light from the exit surface of the linear prism plate 50b in a direction perpendicular thereto.

Next, the arrangement of a planar light-emitting apparatus disclosed in Japanese Patent Application Publication No. 2006-228710 will be explained with reference to FIGS. 55 and 56. FIG. 55 is an exploded perspective view of the planar light-emitting apparatus. FIG. 56 is a fragmentary enlarged side view showing the way in which light is emitted from a light-emitting substrate shown in FIG. 55. In FIG. 55, a planar light-emitting apparatus 70 has two prism sheets 70a and 70b layered in such a manner that respective prism rows extend perpendicular to each other. A light-emitting substrate 75 is disposed underneath the stack of two prism sheets 70a and 70b. The light-emitting substrate 75 comprises a retaining substrate 74 having a plurality of LEDs 72 and a plurality of reflectors 73. A liquid crystal unit 80 is disposed directly above the planar light-emitting apparatus 70 to constitute a liquid crystal display system using the planar light-emitting apparatus 70 as a backlight unit.

The light-emitting substrate 75 has a plurality of LEDs 72 arranged thereon in a matrix, for example. The reflectors 73 are each disposed to cover one row of LEDs 72 all together. As shown in FIG. 56, each reflector 73 has a first surface 73a facing the light-emitting surfaces of the LEDs 72 and a second surface 73b that covers the top thereof. Light emitted from the LEDs 72 is reflected sideward by the first surface 73a of one reflector 73 and enters the next reflector 73. The incident light is reflected upward by the second surface 73b of the next reflector 73 to enter the two layered prism sheets 70a and 70b. The layered prism sheets 70a and 70b adjust the optical path of reflected light from the second surfaces 73b of the reflectors 73 disposed on the light-emitting substrate 75 so that the light exits upward (toward the liquid crystal unit 80).

The planar light-emitting apparatus 70 arranged as stated above emits white light as backlight. Accordingly, the light-emitting substrate 75 emits white light. In this regard, white LEDs are roughly divided into two types: one type in which an LED having a specific emission wavelength is combined with a fluorescent substance; and another type in which three LEDs of R, G and B are disposed in one package. Either type is usable. It is also possible to implement a planar white light-emitting apparatus by using three different types of LEDs, i.e. R, G and B LEDs, as a plurality of LEDs 72 disposed on the light-emitting substrate 75 and arranging such that the three colors of light are reflected by the first and second surfaces 73a and 73b of the reflectors 73 so as to mix together to emit white light.

SUMMARY OF THE INVENTION

However, the related conventional light source apparatus have the following problems. The light source apparatus using a dichroic prism, disclosed in Japanese Patent Application Publication No. 2002-244211, has an increased cost because the dichroic prism is a costly member that is formed by bonding together four dichroic-mirrored glass members. In addition, this type of light source apparatus essentially involves a large loss in light quantity.

The light source apparatus using linear prisms, disclosed in Japanese Patent Application Publication No. Sho 63-132215, needs to provide a spacing having a predetermined angle for placing two linear prisms to combine together light from light sources of LEDs emitting three colors of light, e.g. R, G and B. Therefore, the linear prisms require a widened space for installation. Accordingly, the overall size of the light source apparatus increases, and it becomes difficult to reduce the thickness of the apparatus. Further, because a beam of light obliquely enters each linear prism, the width of the beam when exiting the linear prism is expanded, resulting in a difference in beam width between incident light and exiting light. In addition, the aspect ratio of the beam changes undesirably. The amount of change of the aspect ratio increases with the increase in the number of times of oblique light incidence on linear prisms. That is, in the case of the light source apparatus shown in FIG. 53, R light and G light obliquely enter the linear prism plate 50a to combine together. Thereafter, the combined single light obliquely enters the linear prism plate 50b to combine with B light. Therefore, for R light and G light, oblique incidence on a linear prism is performed twice. Consequently, the amount of change of the aspect ratio doubles.

The light source apparatus using a light-emitting substrate with reflectors and two prism sheets, disclosed in Japanese Patent Application Publication No. 2006-228710, has the problem to be solved as follows. The two prism sheets are layered in such a manner that the respective prism rows extend perpendicular to each other, but the synthesization of white light is performed on the light-emitting substrate 75. Thus, the two layered prism sheets having their prism rows arranged orthogonally to each other are merely used to change the optical path of the synthesized light.

The present invention has been made in view of the above-described problems with the related conventional art. Accordingly, an object of the present invention is to provide a light source apparatus that is less costly, capable of being reduced in size and thickness and superior in light combining performance and improved in light utilization efficiency by combining a prism sheet and bandpass mirrors to reduce thickness of an optical system of the apparatus and devising a scheme for the incidence directions of light from a plurality of light sources to allow the prism sheet to perform a light-combining function. Another object of the present invention is to provide a display apparatus having the light source apparatus according to the present invention.

The present invention provides a light source apparatus including a plurality of light sources different in emission wavelength from each other and a prism sheet having a plurality of mutually parallel fine elongated prisms on at least one surface thereof. The prism sheet is configured to receive lights from the plurality of light sources through a light entrance surface thereof at predetermined angles and emit the lights from an exit surface thereof as color-mixed exiting light. The light source apparatus further includes a bandpass mirror disposed between each of the light sources and the prism sheet to transmit light in a wavelength region emitted from a corresponding light source and to reflect light in the other wavelength regions.

With the above-described arrangement, lights from the light sources entering the prism sheet from the light entrance surface side thereof at predetermined angles enter one or the other prism inclined surface of the prism sheet. The prism sheet is configured to refract and emit the light at the exit surface of the prism sheet, after the light entering one prism inclined surface. The bandpass mirror is configured to reflect and return the light to the light prism sheet through the other light entrance surface, after the light entering the other prism inclined surface are directed bandpass mirror.

In the case of using a prism sheet having prisms on both surfaces thereof, incident light from a plurality of light sources can be combined together with a single prism sheet. If two linear prism sheets are used to combine incident light from a plurality of light sources, a space for arrangement is required between the prism sheets. Such a space is not necessary in the light source apparatus of the present invention. Accordingly, a thin light source apparatus can be constructed. In addition, combining of light and color mixing can be realized with a single sheet member without using a costly member for combining light. Therefore, the component cost is reduced, and it is possible to provide a light source apparatus that is small and thin in shape and less costly.

Accordingly, light can be effectively utilized, and a light source apparatus improved in light utilization efficiency can be provided. In addition, because incident light from a plurality of light sources can be combined together by a thin optical system comprising a prism sheet, it is possible to provide a light source apparatus that is small and thin in shape and optically superior in light combining performance.

As the above-described prism sheet, it is possible to use a prism sheet in which the other surface is smooth. It is also possible to use a prism sheet having the above-described prisms formed on both surfaces thereof such that the length direction of the prisms on one surface and the length direction of the prisms on the other surface intersect each other at a predetermined angle as seen from the direction of incidence of light.

The prisms each have one prism inclined surface through which incident light is refracted to exit from the exit surface and the other prism inclined surface that reflects incident light toward the bandpass mirror. The bandpass mirror is preferably arranged to allow the light reflected from the other prism inclined surface to reenter on the light entrance surface of the prism sheet.

Incident lights from the light sources are applied toward a predetermined converging point at the prism sheet.

A lens for collecting light is disposed in front of the light-emitting surface of each light source.

The lens is one that has different radii of curvature in longitudinal and transverse directions thereof.

With the above-described arrangement, incident light can be collimated into parallel light, and the use of a lens having different radii of curvature in longitudinal and transverse directions thereof can suppress expansion of the light width of exiting light due to oblique incidence of incident light.

The bandpass mirror may be a reflection coating formed on an exit surface of the lens.

The exit surface of the lens, on which the reflection coating is formed, may be a curved surface.

With the above-described arrangement, the bandpass mirror can be formed on the exit surface of the lens. Therefore, it is unnecessary to dispose an extra member as the bandpass mirror. Consequently, the number of components can be reduced, and an installation space for the bandpass mirror is unnecessary. In addition, the light-collecting performance of the bandpass mirror can be adjusted by the configuration of the lens.

The light source apparatus may have a plurality of prism sheets.

In this case, it is preferable that the prism sheets comprise two prism sheets that are layered each other and the length directions of their respective prisms intersect each other at a predetermined angle.

With this arrangement, the two layered prism sheets can be made to perform a light-combining function by a method of applying incident light from a plurality of light sources, which is characteristic of the present invention. That is, the light sources are disposed in four zones defined by intersection of the prism rows on the two layered prism sheets, and the lights from the light sources are applied along near center lines passing through the respective centers of the angles of intersection between the prism rows on the two layered prism sheets. Further, the lights from all the light sources are applied toward a predetermined converging point at the two layered prism sheets.

The light sources are disposed in four zones defined by intersection of prism rows each comprising the mutually parallel prisms of the two layered prism sheets.

In this case, the lights from the light sources enter the entrance surface along near center lines passing through the respective centers of the angles of intersection between the prism rows of the two layered prism sheets.

Alternatively, the incident lights from the light sources are directed toward a predetermined converging point at the prism sheets.

According to another light source arrangement, the light sources are disposed in point symmetry with respect to the predetermined converging point.

According to still another light source arrangement, the light sources are disposed in line symmetry with respect to an axis that passes through the predetermined converging point.

When a plurality of prism sheets are used or two prism sheets are layered, the light sources include red, green and blue light-emitting diode light sources.

Specifically, the light sources are disposed at four positions, respectively, at a side of the light entrance surface of the prism sheets such that red, green and blue light-emitting diode light sources are disposed at three of the four positions and a green light-emitting diode light source is disposed at the remaining one of the four positions.

With the above-described arrangement, the number of green light-emitting diode light sources is increased to emit white light by color mixing of light from red, green and blue light-emitting diode light sources. The reason for this is as follows. The green light-emitting diode light source emits a smaller amount of light than each of the red and blue light-emitting diode light sources. Therefore, the number of green light-emitting diode light sources used is increased to emit white light of good color balance.

Alternatively, red, green and blue light-emitting diode light sources are disposed at three positions, respectively, at the side of the light entrance surface of the prism sheets, and a blue YAG light-emitting diode light source is disposed at one position at the side of the light entrance surface of the prism sheets.

Alternatively, red, green and blue light-emitting diode light sources are disposed at three positions, respectively, at the side of the light entrance surface of the prism sheets, and a reflection mirror is disposed at one position at the side of the light entrance surface of the prism sheets.

Particularly, when two prism sheets are layered, the light sources are arranged as follows. Red, green and blue light-emitting diode light sources are disposed at three positions, respectively, at the side of the light entrance surface of the prism sheets, and a green light-emitting diode light source is disposed at one position at the side of the light entrance surface of the prism sheets. The two green light-emitting diode light sources are disposed in mutually adjacent zones.

In the above-described light source apparatus, the fine prisms have an apex angle of substantially 90 degrees.

The light sources are disposed in four zones defined by intersection of the prism rows each comprising the mutually parallel prisms of the both surfaces of the prism sheet.

Alternatively, red, green and blue light-emitting diode light sources are disposed at three positions, respectively, at the side of the light entrance surface of the prism sheet, and a white light-emitting diode light source is disposed at one position on the side of the light entrance surface of the prism sheet.

Addition of a white light-emitting diode light source different in emission spectrum from the red, green and blue light-emitting diode light sources enables realization of a light source apparatus that is bright and superior in color rendering properties.

In the light source apparatus, two light-emitting diode light sources having the same emission wavelength are disposed at two positions, respectively, at the side of the light entrance surface of the prism sheet. The two light-emitting diode light sources are disposed in zones opposing each other with respect to an axis parallel to the rows of the prisms formed on the side of the light entrance surface of the prism sheet.

In addition, the present invention provides a liquid crystal display apparatus including the above-described light source apparatus as a backlight unit for a liquid crystal cell. The liquid crystal display apparatus further includes a reflection-type polarization-converting element disposed between the liquid crystal cell and the light source apparatus.

With the above-described arrangement, light that would otherwise become ineffective light can be recycled by reflecting it back to the light source apparatus on crystal cell. Thus, the light utilization efficiency can be increased In this case, the prism sheet has birefringent properties. Thus, light can be converted into effective light for the liquid crystal cell by the birefringent properties of the prism sheet.

The conversion to be effective light can also be performed by disposing a phase plate between the reflection-type polarization converting element and the bandpass mirror.

That is, the liquid crystal display apparatus of the present invention uses the light source apparatus as a backlight unit for a liquid crystal display element in combination with a reflection-type polarization converting element and a prism sheet having birefringent properties or a phase plate. Thus, the light recycling efficiency can be increased, and a bright display apparatus can be provided.

As has been described above, the light source apparatus of the present invention can combine and color-mix incident light from a plurality of light sources by a thin optical system comprising a prism sheet and can increase the light utilization efficiency by using bandpass mirrors. Accordingly, it is possible to provide a light source apparatus that is small and thin in shape and optically superior in light combining performance and also provide a display apparatus having the light source apparatus.

DETAILED DESCRIPTION OF THE INVENTION

Figure 1:
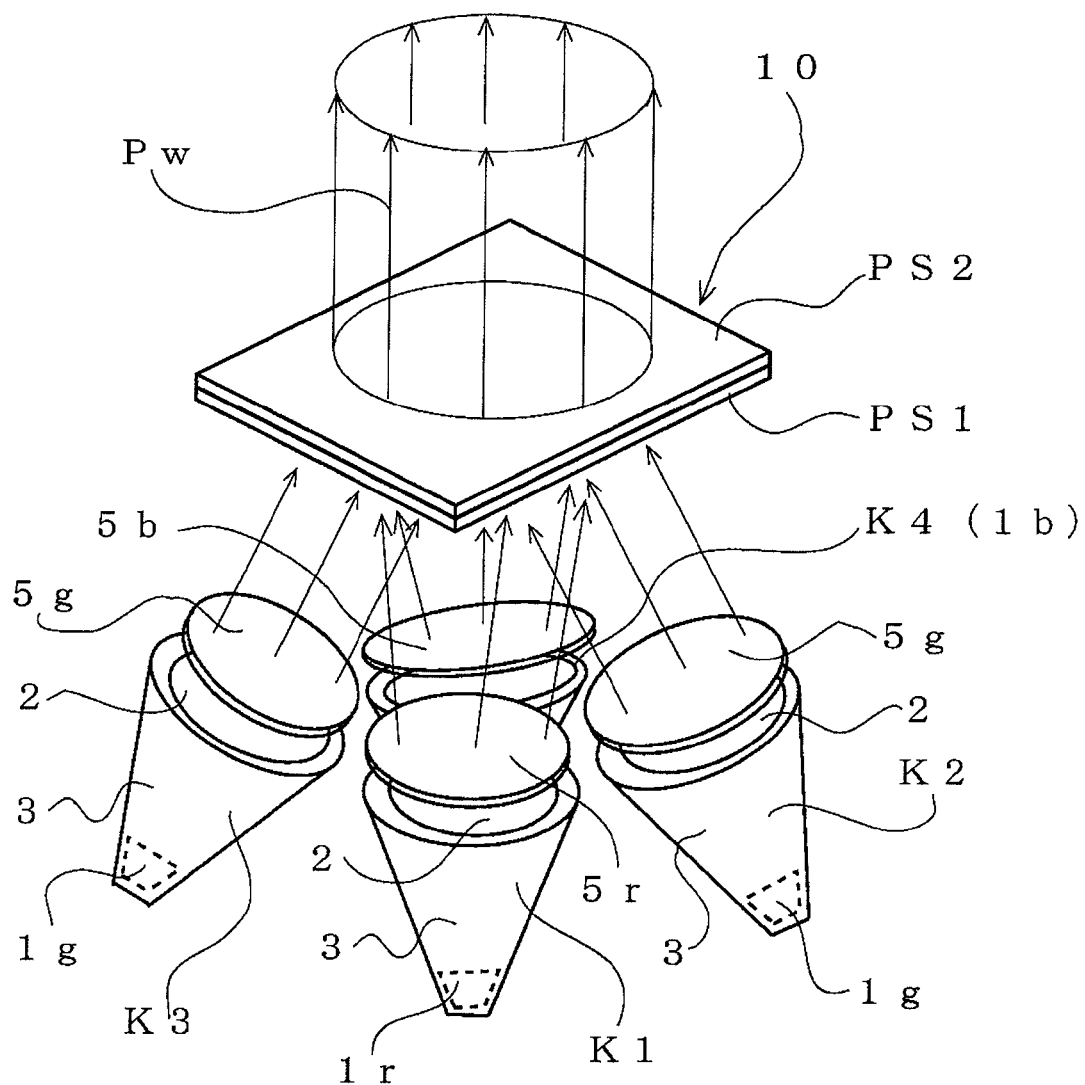
FIG. 1 is a perspective view of a light source apparatus according to a first embodiment of the present invention.

A light source apparatus according to this embodiment has a plurality of light sources different in emission wavelength from each other and a prism sheet having a plurality of fine prisms on at least one surface thereof. The light sources are disposed at the light entrance surface side of the prism sheet at a tilt of a predetermined angle.

That the light sources are disposed at a tilt of a predetermined angle and the prism sheet is configured to receive lights from the light sources through the light entrance surface side thereof at a predetermined angle and emit the light through the exit surface side of the prism sheet as color-mixed exiting light. The exiting light are emitted in the same direction, e.g. directly upward. That is, the light sources are configured to emit light toward a predetermined converging point on the prism sheet.

The above-described arrangement of the light sources is determined, for example, by the refractive index of prism sheet, the number of prism sheets to be used, the positional relationship between prism sheets when a plurality of prism sheets are used, which of two prism sheet surfaces, i.e. a surface having fine prisms and a plane surface, is a light entrance surface or an exit surface, the prism configuration, the prism apex angle, etc.

The feature of the light source apparatus according to this embodiment resides in that a bandpass mirror is disposed between each light source and the prism sheet to transmit light in a wavelength region emitted from the associated light source and to reflect light in the other wavelength regions. For example, a bandpass mirror disposed for a light source emitting red light transmits only light in the red region and reflects light in wavelength regions other than the red.

Next, the operation of the light source apparatus according to this embodiment will be explained. Light emitted from each light source enter the prism sheet at a predetermined angle through the bandpass mirror from the light entrance surface side of the prism sheet. Among the incident light, light entering the prism sheet through one prism inclined surface of the prism sheet is refracted and is finally emitted from the exit surface of the prism sheet, combined with light from the other light sources and emitted as combined light.

Meanwhile, light enters the other prism inclined surface of the prism sheet are reflected thereon and returned to the bandpass mirror. Because the bandpass mirror disposed in front of each light source reflects light in wavelength regions different from the wavelength region of light emitted from the associated light source, the light enters the bandpass mirror is reflected back to the prism sheet. The reflected light enters through the light entrance surface of the prism sheet and exit from the exit surface thereof. The exiting light is combined with the light entering the prism sheet through the one prism inclined surface and emitted as combined light. Thus, light reflected at the light entrance surface of the prism sheet is reflected back to the prism sheet and allowed to exit from the exit surface. In other words, light reflected by the prism sheet as non-effective light in the related conventional art can be converted into effective light. Therefore, light can be effectively utilized, and a light source apparatus improved in light utilization efficiency can be provided. In addition, the light source apparatus according to this embodiment can combine incident light from a plurality of light sources by a thin optical system comprising a prism sheet. Therefore, it is possible to provide a light source apparatus that is small and thin in shape and optically superior in light combining performance.

First, a light source apparatus using a prism sheet having prisms formed on one surface thereof will be explained below in detail by way of embodiments.

First Embodiment

Figure 2:
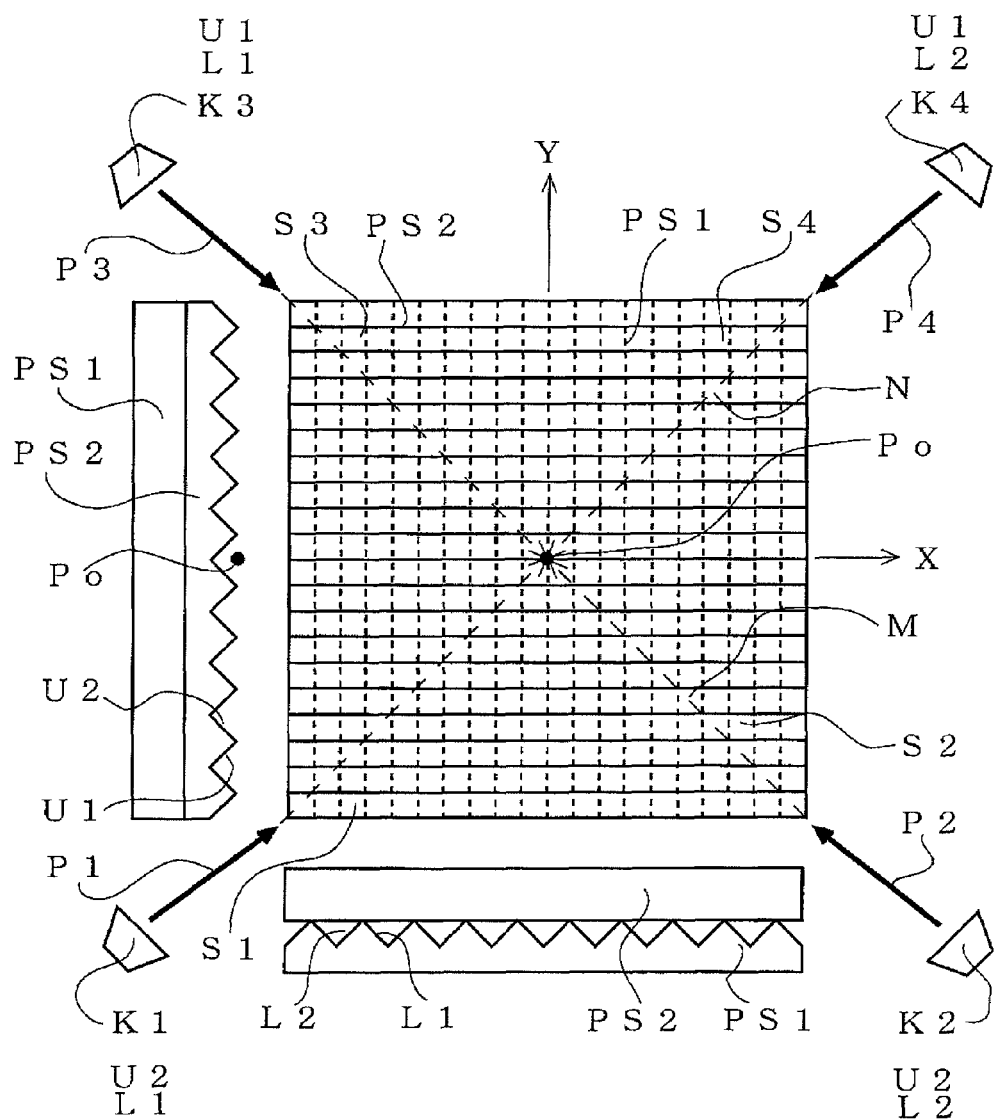
FIG. 2 is a diagram including top and side views showing the arrangement of two prism sheets in FIG. 1.
Figure 3:
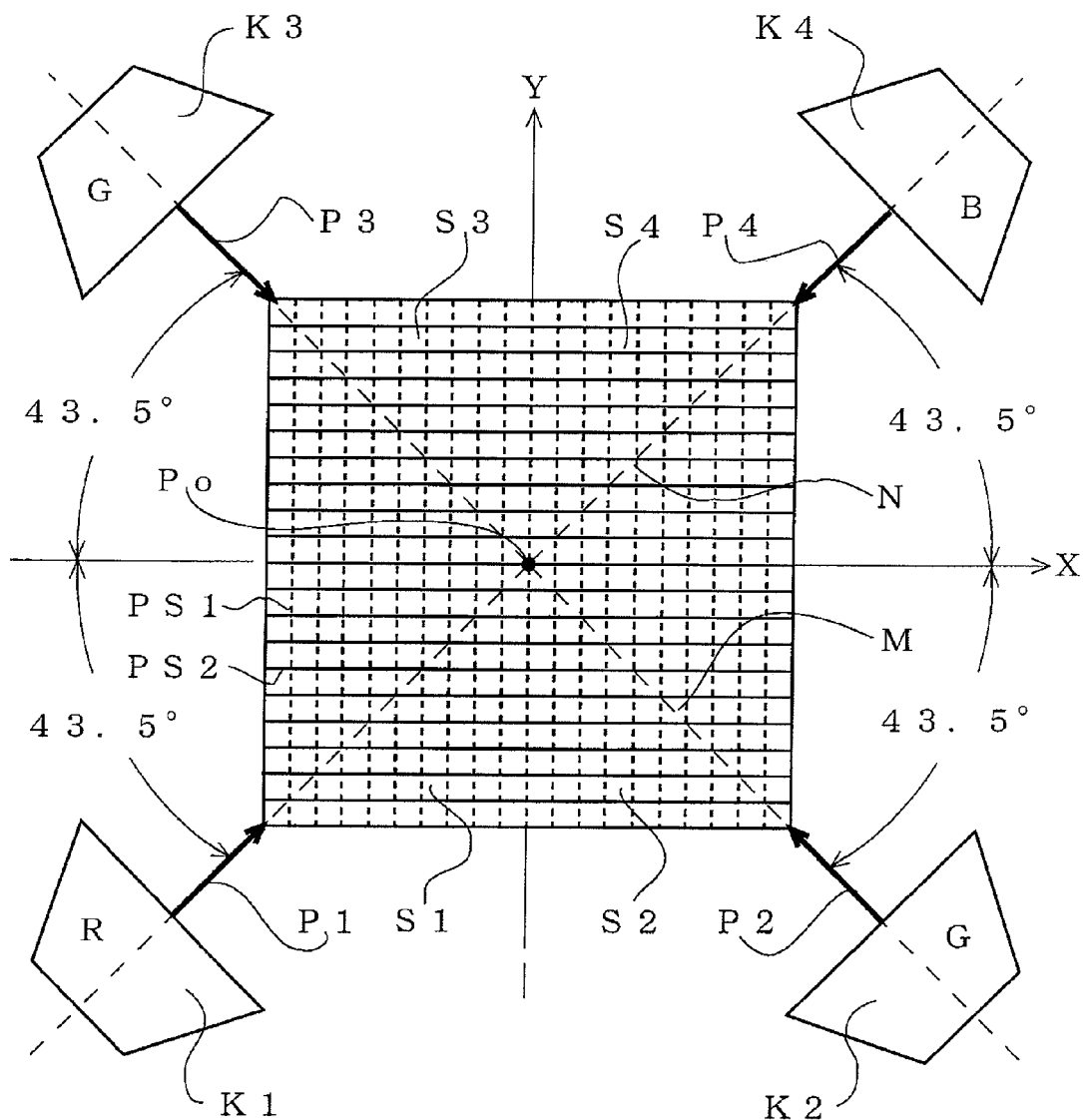
FIG. 3 is a plan view showing the relationship between the two prism sheets and a plurality of light sources in FIG. 2.

One embodiment of the light source apparatus according to the present invention will be explained below with reference to the accompanying drawings. FIGS. 1 to 13 show a light source apparatus according to a first embodiment of the present invention. FIG. 1 is a perspective view of the light source apparatus. FIG. 2 is a diagram including top and side views showing the arrangement of two prism sheets. FIG. 3 is a plan view showing the relationship between two prism sheets and a plurality of light sources.

As shown in FIG. 1, a light source apparatus 10 of this embodiment includes two layered prism sheets PS1 and PS2 and four light sources K1, K2, K3 and K4 disposed at the light entrance surface side of the prism sheets PS1 and PS2 at a tilt of a predetermined angle. Light emitted from the light sources K1, K2, K3 and K4 enters through a light entrance surface of the prism sheet PS1 and exits from an exit surface of the prism sheet PS2, and the exiting light enters a liquid crystal display element (not shown).

The light sources K1, K2, K3 and K4 comprise light-emitting diodes (hereinafter referred to as "LEDs") 1 emitting different colors of light, condenser lenses 2, and casings 3 each housing an LED 1 and a condenser lens 2, respectively. The condenser lenses 2 collect light emitted from the light sources K1, K2, K3 and K4, respectively. The light source K1 is a red LED 1r (hereinafter referred to as "R LED"). The light sources K2 and K3 are green LEDs 1g (hereinafter referred to as "G LEDs"). The light source K4 is a blue LED 1b (hereinafter referred to as "B LED").

Next, the positional relationship between the two prism sheets PS1 and PS2 and the four light sources K1, K2, K3 and K4 will be explained with reference to FIGS. 2 and 3. FIG. 2 is a diagram including top and side views showing the arrangement of the two prism sheets PS1 and PS2. FIG. 2 shows a top view of the layered prism sheets PS1 and PS2 in the center thereof, a side view of the prism sheets PS1 and PS2 as seen from an X axis direction on the left side thereof, and a side view of the prism sheets PS1 and PS2 as seen from a Y axis direction on the lower side thereof. FIG. 3 shows the positional relationship of the four light sources K1, K2, K3 and K4 to the top view of the layered prism sheets PS1 and PS2 shown in FIG. 2.

As shown in FIG. 2, the prism sheets PS1 and PS2 each have a smooth surface on one side thereof. The smooth surface is used as a light entrance surface. On the other side thereof, each prism sheet has a surface provided with a plurality of mutually parallel fine elongated prisms. The surface having the prisms is used as an exit surface. This embodiment uses prism sheets formed from an acrylic resin (PMMA) having a refractive index n of 1.49, each having symmetric prisms with their ridges extending parallel to each other. The prism pitch is 1 μm to 100 μm. The prism apex angle is substantially 90 degrees.

The prism sheets PS1 and PS2 are layered and their respective prisms are configured to substantially perpendicularly intersect each other in the length directions of their respective prisms (i.e. the alignment directions of rows of aligned prisms). The angle of intersection is determined by the prism sheets' constituent material, configuration and so forth of the prism sheets. In FIG. 2, an axis parallel to the length direction of the prisms of the prism sheet PSI (i.e. the prism alignment direction of the prism rows PS2) is defined as a Y axis, and an axis parallel to the length direction of the prisms of the prism sheet PS2 (i.e. the prism alignment direction of the prism rows PS1) is defined as an X axis. It should be noted that the solid lines parallel to the X axis show the lines of peaks and valleys of the prisms on the upper prism sheet PS2, and the dashed lines parallel to the Y axis show the lines of peaks and valleys of the prisms on the lower prism sheet PS1. The solid lines and the dashed lines form orthogonal cells. It should be noted that an axis perpendicular to the X-Y plane is defined as a Z axis. The X axis and the Y axis are axes passing through the center point of each prism sheet, which are center lines of the prism rows on the two prism sheets parallel to the alignment directions thereof.

The positional relationship of the four light sources K1, K2, K3 and K4 to the two prism sheets PS1 and PS2 will be explained below with reference to FIG. 3. The four light sources K1, K2, K3 and K4 are disposed in four zones, respectively, which are formed by intersection of the prism rows on the two layered prism sheets PS1 and PS2, i.e. four zones S1, S2, S3 and S4 defined by dividing the plane of the prism sheets PS1 and PS2 by the X axis as the center line of the prism rows on the prism sheet PS1 and the Y axis as the center line of the prism rows on the prism sheet PS2. That is, the four zones S1, S2, S3 and S4 are divided by two axes, which pass through the center point of each sheet. Accordingly, incident light P1, P2, P3 and P4 emitted from the light sources K1, K2, K3 and K4, respectively, are applied along near center lines N and M passing through the centers of the intersection angles of the prism rows on the two layered prism sheets PS1 and PS2. Further, the incident light P1, P2, P3 and P4 are convergently applied toward a predetermined converging point Po at the two prism sheets PS1 and PS2. In this embodiment, the predetermined converging point Po at the two prism sheets PS1 and PS2 is the center point at the upper side of the upper prism sheet PS2.

Consequently, the positional relationship between the light sources is as follows. As shown in FIG. 3, the light source K1 and the light source K4 are positioned in point symmetry with respect to the converging point Po, and so are the light source K2 and the light source K3. The light source K1 and the light source K3 are positioned in line symmetry with respect to the X axis that passes through the converging point Po, and so are the light source K2 and the light source K4. The angle of each light source from the X axis is the same. This angle is determined by the refractive index of the constituent material of the two prism sheets PS1 and PS2, the prism apex angle, etc. In this embodiment, the light sources K1, K2, K3 and K4 are all positioned at the same angle of 43.5° from the X axis as seen in the X-Y plane. The reason for this is as follows. The prism angle has plus and minus values, and hence there are four different directions of light depending on the surfaces on which the light is incident. However, the four directions are the same from the viewpoint of the angle relative to the normal to each surface. In other words, although the directions of light differ from each other, the incidence angles are the same. To allow exiting light to be emitted directly upward under the conditions that the refractive index n of the prism sheets PS1 and PS2 is 1.49 and the prism apex angle is 90°, the incidence directions of the incident light P1, P2, P3 and P4 are at the same angle of ±43.5° with respect to the X axis.

For the same reason, when viewed from the X-Z plane, the light sources K1, K2, K3 and K4 are all positioned at the same angle of 38.4° from the Z axis.

Next, the bandpass mirror 5, which is a characteristic feature of the present invention, will be explained with reference to FIG. 1. The bandpass mirror 5 is disposed between each of the light sources K1, K2, K3 and K4 and the prism sheet PS1. The bandpass mirror 5 partly transmits the light in a wavelength region emitted from the LED of the associated light source and partly reflects the light in the other wavelength regions. A bandpass mirror 5r is disposed in front of the light-emitting surface of the light source K1. The bandpass mirror 5r transmits the wavelength region of red light (hereinafter referred to as "R light") emitted from the associated R LED 1r and reflects the light in the other wavelength regions. Bandpass mirrors 5g are disposed in front of the respective light-emitting surfaces of the light sources K2 and K3. The bandpass mirrors 5g each transmit the wavelength region of green light (hereinafter referred to as "G light") emitted from the associated G LED 1g and reflect the light in the other wavelength regions. A bandpass mirror 5b is disposed in front of the light-emitting surface of the light source K4. The bandpass mirror 5b transmits the wavelength region of blue light (hereinafter referred to as "B light") emitted from the associated B LED 1b and reflects the light in the other wavelength regions. It should be noted that the bandpass mirror 5 may be implemented by forming a reflection coating on the exit surface of the condenser lens 2 of each light source.

Incidence conditions of light applied from each light source to the two layered prism sheets PS1 and PS2 in the present invention will be detailed later. The basic light-combining (color mixing) operation will be explained below with reference to FIG. 2. In the following explanation, one prism inclined surface constituting the prism surface of the prism sheet PS1 is denoted by L1, and the other prism inclined surface by L2. One prism inclined surface constituting the prism surface of the prism sheet PS2 is denoted by U1, and the other prism inclined surface by U2.

Incident light from each light source positioned as stated above is obliquely applied to the prism sheet PS1. The light source apparatus 10 of the present invention makes incident light from each light source obliquely enter the prism sheet through the prism surface and uses the prism surface diagonally, thereby allowing incident light applied from four different directions to be emitted with refraction under the same conditions. As shown in FIG. 2, incident light P1 emitted from the light source K1 passes through the prism inclined surfaces L1 of the prism sheet PS1 and the prism inclined surfaces U2 of the prism sheet PS2 to become exiting light. Similarly, incident light P2 emitted from the light source K2 passes through the prism inclined surfaces L2 of the prism sheet PS1 and the prism inclined surfaces U2 of the prism sheet PS2 to become exiting light. Incident light P3 emitted from the light source K3 passes through the prism inclined surfaces L1 of the prism sheet PS1 and the prism inclined surfaces U1 of the prism sheet PS2 to become exiting light. Incident light P4 emitted from the light source K4 passes through the prism inclined surfaces L2 of the prism sheet PS1 and the prism inclined surfaces U1 of the prism sheet PS2 to become exiting light.

Incident light with a wide sectional area that is emitted from each light source enters the two prism sheets PS1 and PS2 through the inclined surfaces of a multiplicity of prism rows formed on the two prism sheets PS1 and PS2 and is finally emitted from the prism sheet with refraction. In this regard, because the prism rows are arranged at a fine pitch of 1 μm to 100 μm, the light P1, P2, P3 and P4 as emitted from the two layered prism sheets PS1 and PS2 are not visually recognized as discrete exiting light but as combined single exiting light. Accordingly, if the light source K1 emits R light and the light source K4 emits B light and further the light sources K2 and K3 emit G light, then the R light, B light and G light are mixed together, and white light Pw is emitted as exiting light.

Figure 4:
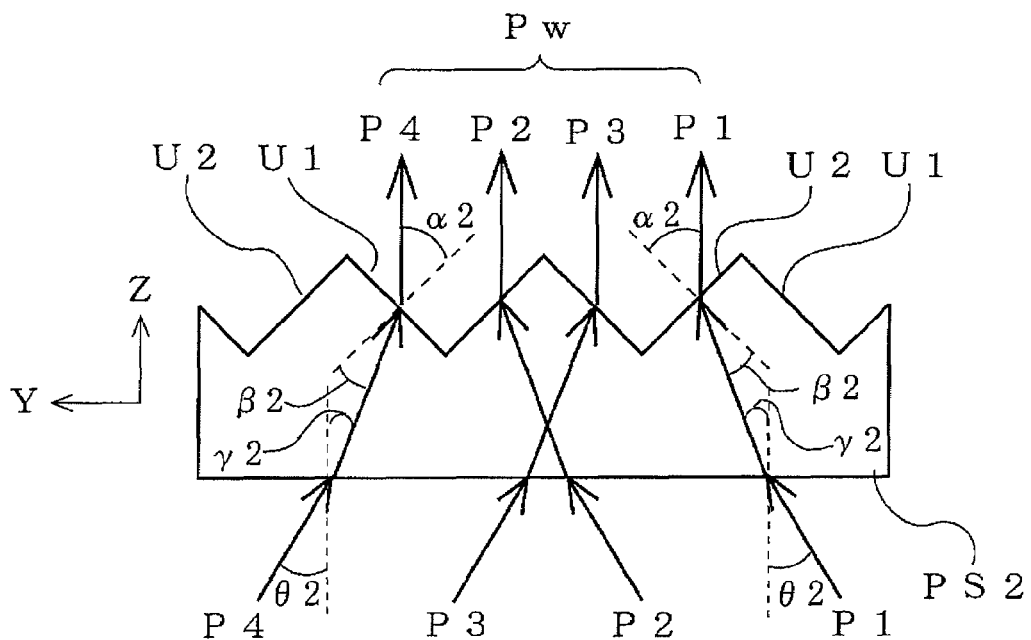
FIG. 4 is an enlarged view of a part of the prism sheet PS2 shown in FIG. 2.
Figure 5:
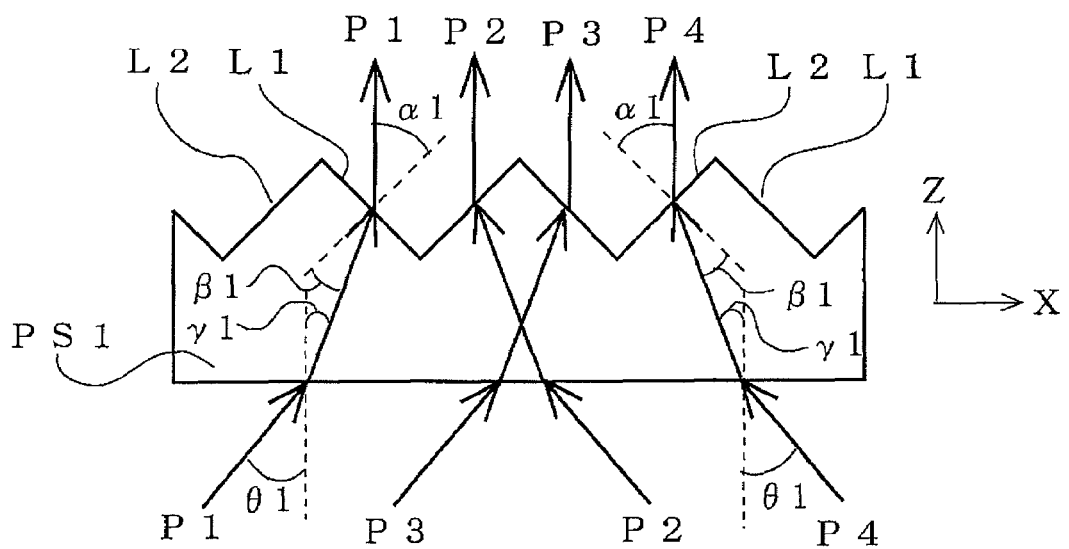
FIG. 5 is an enlarged view of a part of the prism sheet PS1 shown in FIG. 2.

Next, the optical path of incident light from each light source that is applied to the two prism sheets PS1 and PS2 will be explained in detail with reference to FIGS. 4 and 5. FIG. 4 is an enlarged view of a part of the prism sheet PS2 shown in FIG. 2, illustrating the optical path of each incident light passing through the prism sheet PS2 while being refracted. FIG. 5 is an enlarged view of a part of the prism sheet PS1 shown in FIG. 2, illustrating the optical path of each incident light passing through the prism sheet PS1 while being refracted.

To obtain an optical path through a prism, the following method is generally used: In a case where incident light is made to enter a single prism sheet from the light entrance surface side thereof to obtain exiting light emitted directly upward from the prism sheet, the light is traced backward to obtain the optical path. For example, in the case of the upper prism sheet PS2 shown in FIG. 4, color-mixed white light Pw needs to be emitted directly upward as exiting light. Therefore, exiting light from each light source is made to enter the prism sheet PS2 from directly above the prism sheet PS2 to trace the optical path of the light backward. At this time, the incident light travels through the prism sheet PS2 after being given a predetermined angle of refraction according to Snell's law at the interface between the air and the acrylic resin due to the difference in refractive index therebetween. When exiting into the air from the light entrance surface of the prism sheet PS2, the light is also given a predetermined refraction angle according to Snell's law at the interface between the acrylic resin and the air.

To use the prism sheet PS2 in an actual light source apparatus, incident light from each light source enters the two prism sheet PS2 through the light entrance surface of the prism sheet PS2 at an angle equal to the angle of light exiting into the air from the prism sheet light entrance surface in the above-described backward ray tracing. If light enters the two prism sheet PS2 through the light entrance surface of the prism sheet PS2 at this angle, the incident light travels through the prism sheet PS2 at a predetermined angle of refraction similar to the above. Therefore, it is possible to obtain exiting light emitted directly upward from the exit surface of the prism sheet PS2.

When the above-described optical path obtaining method is applied, light entering a prism sheet from each light source of the light source apparatus 10 passes along an optical path as shown in FIGS. 4 and 5.

In the case of the upper prism sheet PS2 shown in FIG. 4, the Y-Z plane is shown. Incident light P1 from the light source K1 and incident light P2 from the light source K2, which are shown in FIG. 2, pass through the left prism inclined surfaces U2 of the prism sheet PS2 and exit directly upward. Incident light P3 from the light source K3 and incident light P4 from the light source K4 pass through the right prism inclined surfaces U1 of the prism sheet PS2 and exit directly upward. Thus, the direction of incidence of the incident light P1 and P2 on the light entrance surface of the prism sheet PS2 is leftward oblique, and the incidence direction of the incident light P3 and P4 is rightward oblique. That is, the incidence directions of the incident light P1 and P2 and the incident light P3 and P4 are opposite to each other. However, the travel angles of these incident light are the same.

At this time, the angles $\theta 2$ and $\gamma 2$ of all incident light P1, P2, P3 and P4 relative to the normal (shown by the dashed lines) to the interface of the light entrance surface of the prism sheet PS2 are the same, respectively, and the angles $\beta 2$ and $\alpha 2$ of all exiting light P1, P2, P3 and P4 relative to the normal (shown by the dashed lines) to the prism inclined surfaces of the prism sheet PS2 are the same, respectively. For the prism sheet PS2 that is formed from an acrylic resin having a refractive index of 1.49 and that has a prism apex angle of 90°, the above-described angles are as follows: $\alpha 2 = 45.0°$; $\beta 2 = 28.3°$; $\gamma 2 = 16.7°$; and $\theta 2 = 25.3°$.

In the case of the lower prism sheet PS1 shown in FIG. 5, the X-Z plane is shown. The angles $\theta 1$ and $\gamma 1$ of all incident light P1, P2, P3 and P4 relative to the normal (shown by the dashed lines) to the interface of the light entrance surface of the prism sheet PS1 are the same, respectively, and the angles $\beta 1$ and $\alpha 1$ of all exiting light P1, P2, P3 and P4 relative to the normal (shown by the dashed lines) to the prism inclined surfaces of the prism sheet PS1 are the same, respectively. For the prism sheet PS1 that is formed from an acrylic resin having a refractive index of 1.49 and that has a prism apex angle of 90°, the above-described angles are as follows: $\alpha 1 = 50.3°$; $\beta 1 = 31.1°$; $\gamma 1 = 24.6°$; and $\theta 1 = 38.4°$. Although the exiting light P1 to P4 from the prism sheet PS1 in FIG. 5 are shown to be emitted directly upward for the sake of drawing, it should be noted that these exiting light have an angle of inclination relative to a direction perpendicular to the plane of FIG. 5. That is, the direction of inclination is invisible in FIG.

5, which shows the X-Z plane. In actuality, the exiting light P1 and P2 have an angle of inclination to the back of the plane of FIG. 5, and the exiting light P3 and P4 have an angle of inclination to the front of the plane of FIG. 5.

That is, the directions of inclination of the exiting light P1 and P2 and the exiting light P3 and P4 are opposite to each other, but the angles of inclination thereof are the same, i.e. 25.3° relative to the Z axis. This angle of inclination is 50.3° with respect to the normal to the interface of each prism inclined surface of the prism sheet PS1. Accordingly, the exiting light P1 to P4 from the lower prism sheet PS1 that has an inclination angle of 25.3° relative to the Z axis enters the prism sheet PS2 through the lower surface of the upper prism sheet PS2 at an incidence angle of 25.3° relative to the normal to the interface of the prism sheet lower surface. That is, the exiting light P1 to P4 become incident light having the incidence angle $\theta 2$. The incident light P1, P2, P3 and P4 travel through the prism sheet PS2 while being refracted to exit directly upward from the upper surface of the prism sheet PS2. It should be noted that FIGS. 4 and 5 show the way in which the incident light P1 and P2 (P3 and P4) enters the prism sheet PS1 or PS2 through different prism inclined surfaces for the sake of easy understanding. In actuality, the incident light P1 and P2 (P3 and P4) also enters the prism sheet PS1 or PS2 through the same prism inclined surfaces simultaneously and combined together.

Figure 6:
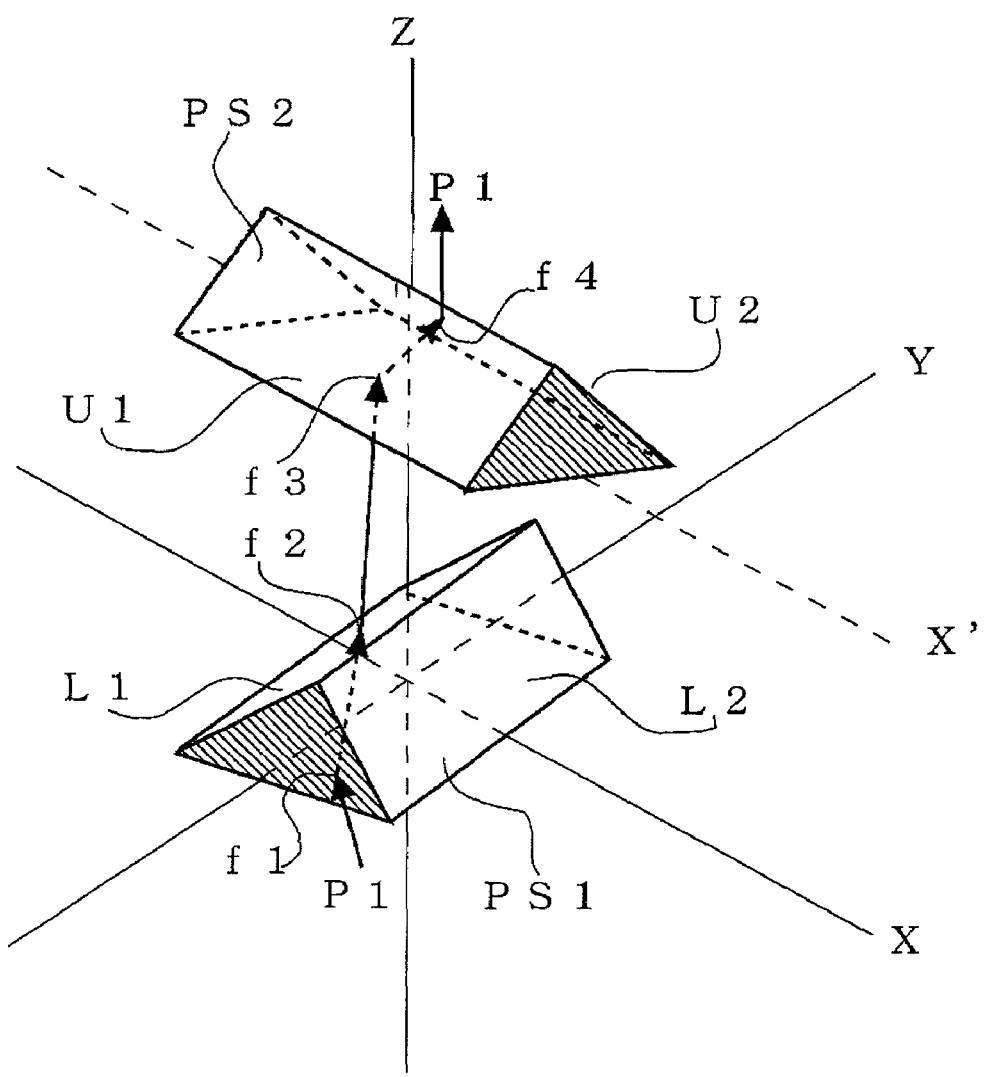
FIG. 6 is a perspective view schematically showing an optical path along which incident light passes through the two prism sheets shown in FIG. 2.

FIG. 6 is a perspective view schematically showing an optical path along which incident light passes successively through the two prism sheets PS1 and PS2. In FIG. 6, only incident light P1 is shown as a representative example. When incident light P1 enters the prism sheet PS1 from a point f1 on the light entrance surface thereof so as to enter the prism rows at an angle of 43.5° from the X axis in the X-Y plane direction and at an angle ($\theta 1$) of 38.4° from the normal to the interface of the prism sheet lower surface in the Z axis direction, the light exits into the air from a point f2 on the prism inclined surface L1 after being refracted in the prism sheet PS1. The incident light P1 exiting the prism sheet PS1 enters the upper prism sheet PS2 from a point f3 on the light entrance surface thereof at an angle ($\theta 2$) of 25.3° from the normal to the interface of the light entrance surface in the Z axis direction. The light is refracted in the prism sheet PS2 and emitted into the air directly upward from a point f4 on the prism inclined surface U2. Similarly, incident light P2, P3 and P4 (not shown in FIG. 6) travel and exit along the optical paths shown in FIGS. 4 and 5. It should be noted that in FIG. 6 the two prism sheets PS1 and PS2 are shown to be slightly more away from each other than actuality for the sake of easy understanding. In addition, an X' axis corresponding to the X axis is shown as a hypothetical axis for easy understanding of the position of the prism sheet PS2 relative to the prism sheet PS1.

Thus, two prism sheets are layered with their prism rows intersecting each other, and incident light enters the prism sheets through the prism rows from an oblique direction having an angle relative to the X-Y plane direction and an angle relative to the Z axis direction, thereby using the prism inclined surfaces diagonally. As a result, incident light from four different directions can be made to enter the two layered prism sheets simultaneously under the same optical conditions to combine them together. Thus, R light, G light and B light are combined together into single white light Pw, which is then emitted directly upward from the exit surface of the prism sheet PS2.

Figure 7:
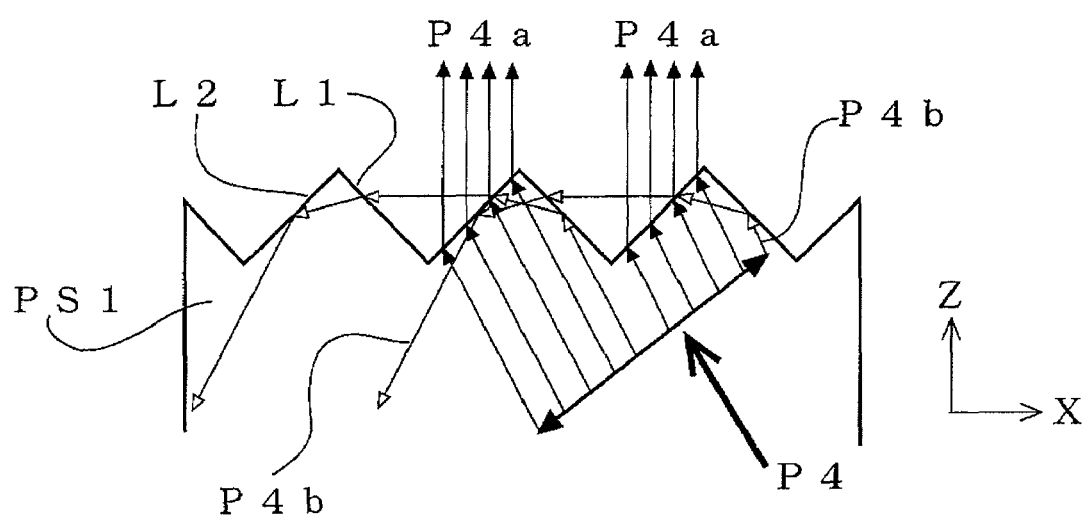
FIG. 7 is an enlarged view of a part of the prism sheet PS1 in FIG. 2, showing effective light and non-effective light.

In the light source apparatus 10, light emitted from each light source is configured to enter the prism sheet. In this regard, the light is partly allowed to exit to the exit surface side of the prism sheet as effective light and partly not allowed to exit to the prism sheet exit surface side ineffectively. Reasons of ineffective light occurrences will be explained below with reference to FIG. 7. FIG. 7 is a fragmentary sectional view of the lower prism sheet PS1, showing a state where incident light P4 from the light source K4 in FIG. 5 enters the prism sheet PS1 through the prism surface of the prism sheet PS1, by way of example. As shown in FIG. 7, the incident light P4 is leftward oblique incident light, and light entering the prism sheet PS1 through the inclined prism inclined surfaces L2 of the prism sheet PS1 leftwardly downwardly are allowed to exit as effective light. Accordingly, the prism inclined surfaces L2 are effective prism inclined surfaces, and the rightwardly downwardly inclined prism inclined surfaces L1 are non-effective prism inclined surfaces.

On the above-described assumption, when incident light P4 from the light source K4 having a certain width enters the prism sheet PS1 from the light entrance surface side thereof, the greater parts of the incident light P4 (shown by the black arrows) pass through the prism inclined surfaces L2, which are effective prism inclined surfaces, and exit as effective light P4a. However, some of the incident light P4 (shown by the white arrows) impinge on and are reflected by the prism inclined surfaces L1, which are non-effective prism inclined surfaces. After traveling through the prisms, the reflected light exit through the prism inclined surfaces L2 with refraction and travel through the air. Thereafter, the lights impinge on and are refracted by the prism inclined surfaces L1 of the next prisms. After traveling through the prisms again, the lights impinge on and are reflected by the prism inclined surfaces L2 to the light entrance surface side of the prism sheet PS1 as non-effective light P4b.

More specifically, the effective lights, which are shown by the black arrows, impinge on the prism inclined surfaces L2 at an angle smaller than the critical angle and are therefore transmitted therethrough with refraction. On the other hand, the non-effective lights, which are shown by the white arrows, impinge on the prism inclined surfaces L1 at an angle not smaller than the critical angle and are therefore reflected thereby. Thereafter, the non-effective lights reflected by the prism inclined surfaces L1 are transmitted or reflected according to whether or not the incident angle is smaller than the critical angle. Eventually, the non-effective lights are directed to travel in a direction opposite to the direction of incidence. In the case of the prism sheet PS1 in this embodiment, the optical path of non-effective light has the same angle to the lower surface of the prism sheet PS1 when the light enters firstly and emerges from it. That is, the angle of incidence and the angle of emergence are the same.

Figure 8:
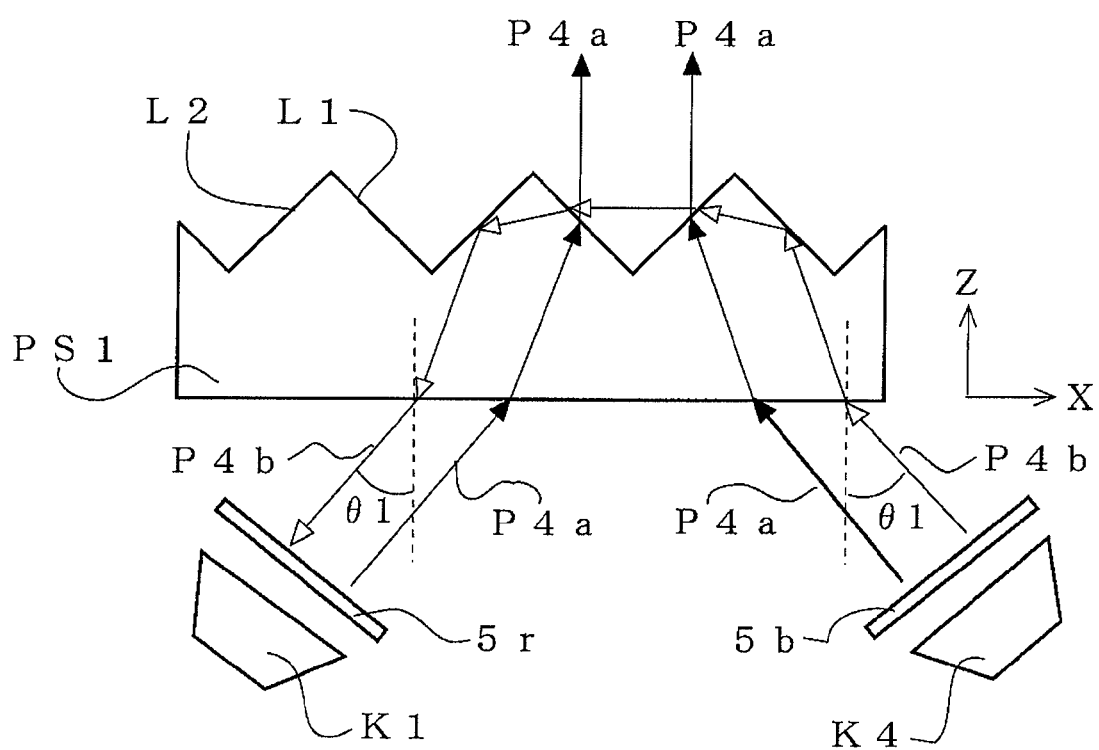
FIG. 8 is an enlarged view of a part of the prism sheet PS1 in FIG. 2, showing effective light and non-effective light.

Next, the principle of converting the non-effective light into effective light will be explained with reference to FIG. 8. FIG. 8 is a fragmentary sectional view of a prism sheet and light sources, showing an arrangement for converting a non-effective light component of light emitted from the light source K4 into effective light by the bandpass mirror 5r of the light source K1. In FIG. 8, the light source K4 and the light source K1 are disposed at mutually opposing positions as shown in FIG. 3. The light P4 emitted from the light source K4 includes effective light P4a and non-effective light P4b. The effective light P4a, which is shown by the black arrows, passes through the prism inclined surface L2 of the lower prism sheet PS1 and exits directly upward. The non-effective light P4b, which is shown by the white arrows, enters the prism sheet PS1 through the prism inclined surface L1 and repeatedly reflected and refracted and is finally emitted from the prism sheet PS1 through the lower surface of the prism sheet PS1.

Here, attention should be paid to the travel direction of the non-effective light P4b. That is, for the non-effective light P4b, the angle of first incidence on the light entrance surface of the prism sheet PS1 and the angle of emergence from the light entrance surface of the prism sheet PS1 are the same, as has been explained above in connection with FIG. 7. Consequently, the non-effective light P4b reflected to exit through the light entrance surface of the prism sheet PS1 impinges on and is reflected by the bandpass mirror 5r of the light source K1 disposed at a position opposite to the light source K4, thereby being converted into effective light P4a. More specifically, the reflected effective light P4a enters the prism sheet PS1 from the light entrance surface side thereof as rightward oblique incident light and passes through the prism inclined surface L1 to exit directly upward. The reason why the non-effective light P4b can be converted into effective light P4a is that the angle of first incidence of the non-effective light P4b on the lower surface of the prism sheet PS1 and the angle of emergence of the non-effective light P4b from the lower surface of the prism sheet PS1 are the same.

The reason why the non-effective light P4b converted into the effective light P4a by reflection from the bandpass mirror 5r can enter the prism inclined surface L1 of the prism sheet PS1 is that the size of the bandpass mirror and the distance from the prism surface to the bandpass mirror differ from the prism size to a considerable extent. That is, the pitch of the prism rows is as fine as 1 μm to 100 μm, whereas the bandpass mirror size and the distance from the prism surface to the bandpass mirror are 5 mm to 20 mm, i.e. about two digits greater than the prism pitch. Accordingly, lights after traveling through a long distance have some fluctuation due to the influence of parallelism, part assembly accuracy, etc. Therefore, the non-effective light P4b converted into the effective light P4a by reflection from the bandpass mirror 5r does not accurately return back to the previous position but returns with some fluctuation to the prism inclined surface L1, which provides a wide angle of incidence. As a result, almost all the reflected light passes through the prism inclined surface L1 and exits directly upward. In this way, non-effective light is converted into effective light.

Figure 9:
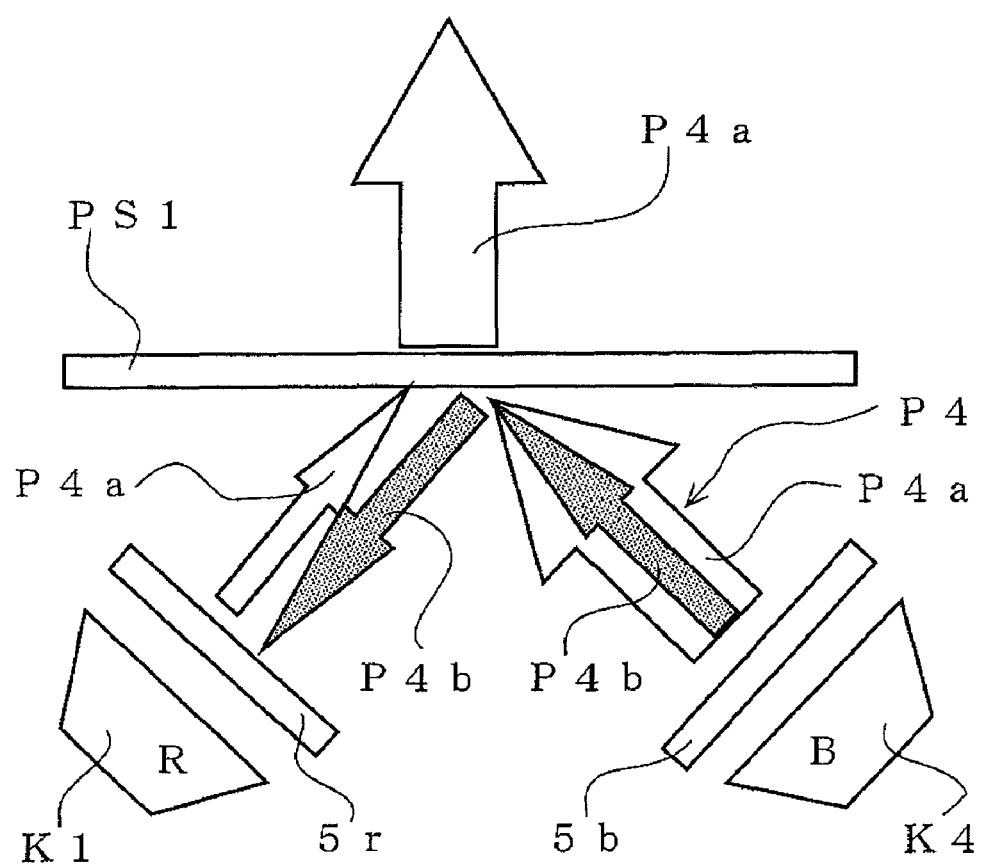
FIG. 9 is a fragmentary sectional view of a prism sheet and light sources, showing an arrangement for converting a non-effective light component of light emitted from a light source K4 into effective light by a bandpass mirror of a light source K1.
Figure 10:
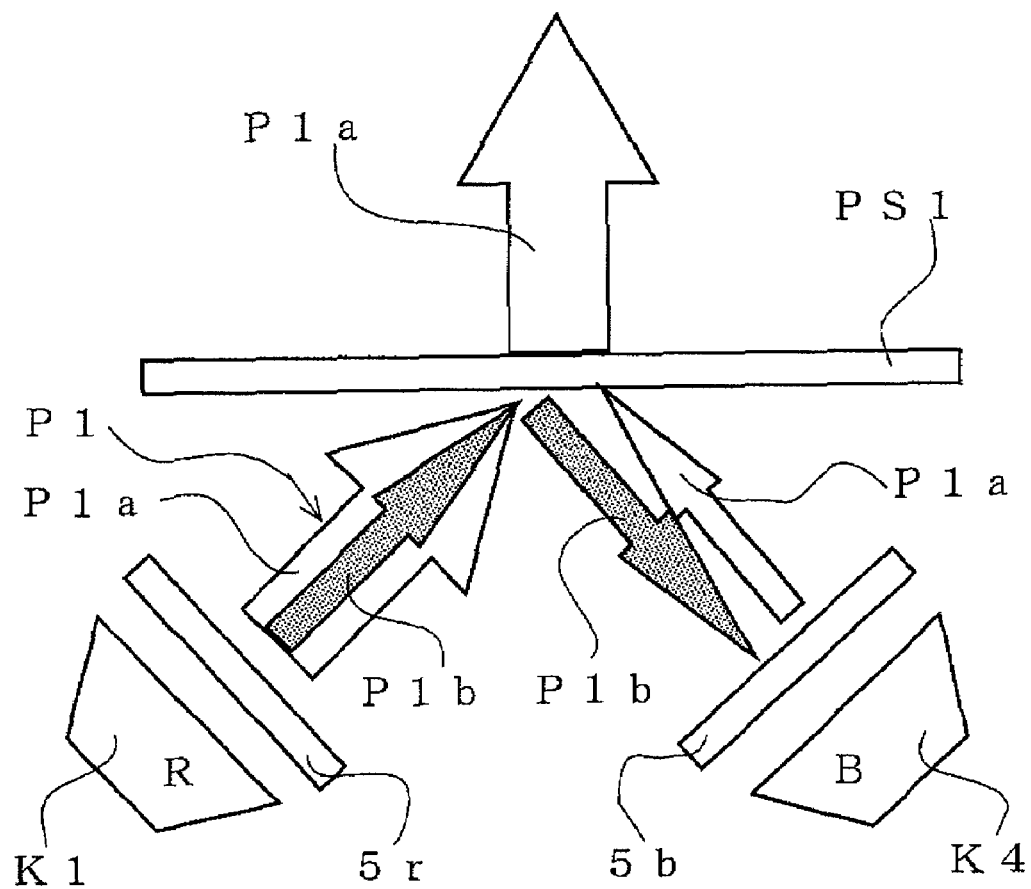
FIG. 10 is a fragmentary sectional view of a prism sheet and light sources, showing an arrangement for converting a non-effective light component of light emitted from the light source K1 into effective light by a bandpass mirror of the light source K4.

Next, the above-described arrangement for converting non-effective light P4b into effective light P4a will be explained with reference to FIGS. 9 and 10. FIG. 9 is a sectional view of a prism sheet and light sources, showing an arrangement for converting the non-effective light component P4b of light P4 emitted from the light source K4 into effective light P4a by the bandpass mirror 5r of the light source K1. FIG. 10 is a sectional view of a prism sheet and light sources, showing an arrangement for converting the non-effective light component P1b of light P1 emitted from the light source K1 into effective light P1a by the bandpass mirror 5b of the light source K4. It should be noted that in FIGS. 9 and 10 the thick arrows represent light having a predetermined sectional area. Effective light is shown as the white arrows, and non-effective light is shown as the black arrows. In FIG. 9, the light source K4 and the light source K1 are disposed at mutually opposing positions, as has been stated in connection with FIG. 8. Light P4 emitted from the light source K4 includes effective light P4a and non-effective light P4b. The effective light P4a shown by the white arrow passes through a multiplicity of prism inclined surfaces L2 of the lower prism sheet PS1 and exits directly upward. The non-effective light P4b shown by the black arrow enters the prism sheet PS1 through a multiplicity of prism inclined surfaces L1, and then, after repeatedly reflected and refracted on the prism sheet PS1, the non-effective light P4b exits the light entrance surface of the prism sheet PS1 toward the lower side.

The non-effective light P4b exiting to the lower side through the light entrance surface of the prism sheet PS1 impinges on and is reflected by the bandpass mirror 5r of the light source K1 disposed at a position opposite to the light source K4, thereby being converted into an effective light P4a. That is, the reflected effective light P4a enters the prism sheet PS1 from the lower side thereof as rightward oblique incident light and passes through a multiplicity of prism inclined surfaces L1 to exit directly upward.

The role of the bandpass mirror in the above-described converting operation is as follows. The bandpass mirror 5b of the light source K4 transmits only light in the wavelength region of B light and reflects light in the other wavelength regions. Therefore, B light P4 emitted from the light source K4 passes through the bandpass mirror 5b and enters the prism sheet PS1. The bandpass mirror 5r of the light source K1 transmits only light in the wavelength region of R light and reflects light in the other wavelength regions. Therefore, the B light P4b entering the bandpass mirror 5r from the prism sheet PS1 is reflected therefrom to reenter the prism sheet PS1. That is, each bandpass mirror 5 transmits light emitted from the associated light source and reflects light emitted from the other light sources, thus having the function of converting the non-effective light component of light emitted from the other light sources into effective light.

FIG. 10 is a sectional view of a prism sheet and light sources, showing an arrangement of converting the non-effective light component P1b of light P1 emitted from the light source K1 into effective light P1a by the bandpass mirror 5b of the light source K4. The converting arrangement shown in FIG. 10 is in reverse relation to that shown in FIG. 9. That is, the light P1 emitted from the light source K1 includes effective light P1a and non-effective light P1b. The effective light P1a shown by the white arrow passes through a multiplicity of prism inclined surfaces L1 of the lower prism sheet PS1 and exits directly upward. The non-effective light P1b shown by the black arrow enters the prism sheet PS1 through a multiplicity of prism inclined surfaces L2, and then, after repeatedly reflected and refracted on the prism sheet PS1, the non-effective light P1b exits the light entrance surface of the prism sheet PS1 toward the lower side.

The non-effective light P1b exiting to the lower side through the light entrance surface of the prism sheet PS1 impinges on and is reflected by the bandpass mirror 5b of the light source K4 disposed at a position opposite to the light source K1, thereby being converted into an effective light P1a. That is, the reflected effective light P1a enters the prism sheet PS1 from the lower side thereof as leftward oblique incident light and passes through a multiplicity of prism inclined surfaces L2 to exit directly upward.

The role of the bandpass mirror in the above-described converting operation is as follows. The bandpass mirror 5r of the light source K1 transmits only light in the wavelength region of R light and reflects light in the other wavelength regions. Therefore, R light P1 emitted from the light source K1 passes through the bandpass mirror 5r and enters the prism sheet PS1. The bandpass mirror 5b of the light source K4 transmits only light in the wavelength region of B light and reflects light in the other wavelength regions. Therefore, the R light P1b entering the bandpass mirror 5b from the prism sheet PS1 is reflected therefrom to reenter the prism sheet PS1.

In other words, the light source K4 and the light source K1 performs a function of converting each other's non-effective light into effective light by their respective bandpass mirrors. The converting operations of the two light sources are simultaneously performed. The light source K3 and the light source K2, which are opposed to each other, also perform a mutually converting function similar to the above. Accordingly, non-effective light from all the light sources is converted into effective light.

The mutually converting function is performed not only for light entering the prism sheet PS1 but also for light entering the upper prism sheet PS2. That is, when effective light P4a and P1a exiting the lower prism sheet PS1 enter the prism sheet PS2 from the light entrance surface side thereof, the incident light is divided into non-effective light and effective light in the same way as in the case of the prism sheet PS1. Let us explain this with regard to light P4a emitted from the light source K4 shown in FIG. 9, by way of example. The light P4a exiting the prism sheet PS1 enters the prism sheet PS2 from the lower side thereof in the form of rightward oblique incident light, as shown by incident light P4 in FIG. 4. Accordingly, the prism inclined surfaces U1 of the prism sheet PS2 are effective prism inclined surfaces, and the prism inclined surfaces U2 are non-effective prism inclined surfaces.

Consequently, the greater part of the light P4a entering the prism sheet PS2 passes through the prism inclined surfaces U1 and exits directly upward. However, light impinging on the prism inclined surfaces U2 are repeatedly reflected and refracted to exit the prism sheet PS2 from the light entrance surface side thereof, thus returning to the prism sheet PS1. The lights entering the prism sheet PS1 after emitted from the prism sheet PS2 impinge uniformly on the two different kinds of prism inclined surfaces, i.e. the prism inclined surfaces L1, and the prism inclined surfaces L2. Therefore, the lights pass through the prism sheet PS1, being divided into two, and are reflected by the bandpass mirror of each light source. After being converted from non-effective light into effective light by reflection from the bandpass mirror, the lights pass through the prism sheets PS1 and PS2 again and exit directly upward. The above-described mutually converting function is simultaneously performed for light emitted from all the light sources, as has been stated above.

Figure 11:
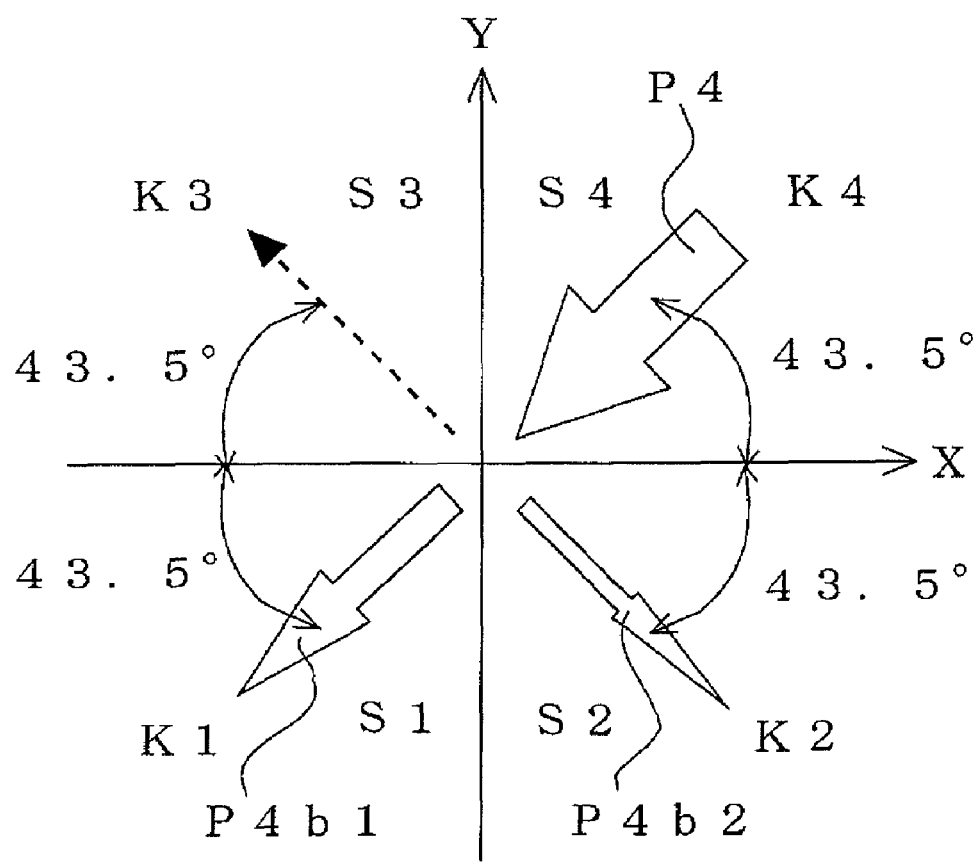
FIG. 11 is a plan view showing, in the X-Y plane, the relationship between incident light from the light source K4 and reflected light from two layered prism sheets.

FIG. 11 is a plan view showing, in the X-Y plane, the relationship between incident light from the light source K4 shown in FIG. 9 and reflected light from the two layered prism sheets PS1 and PS2. In FIG. 11, four zones defined relative to the X and Y axes correspond to the positional arrangement of the light sources shown in FIGS. 2 and 3. Reference symbol P4 denotes incident light from the light source K4 in the zone S4. Reference symbol P4b1 denotes reflected light directed toward the zone S1. The reflected light P4b1 comprises all the reflected light from the prism sheet PS1 and a half of the reflected light from the prism sheet PS2. Reference symbol P4b2 denotes reflected light directed toward the zone S2. The quantity of the reflected light P4b2 is half the reflected light from the prism sheet PS2. In the case of incident light from the light source K4, there is no reflected light directed toward the zone S3. The light direction of imaginary reflected light directed toward the zone S3 is shown by the dashed line.

In the X-Y plane, the directions of all light are at the same angle of 43.5° from the X axis. Almost all incident light P4 from the light source K4 is allowed to exit directly upward. A part of the incident light P4 is reflected and refracted by the prism sheet PS1 toward the zone S1. Further, light reflected and refracted by the prism sheet PS2 is halved at the prism surface of the prism sheet PS1, and the two halves of the light are directed to the zones S1 and S2, respectively. The above explanation has been made with regard to the light emitted from the light source K4 in the zone S4. A similar operation is also performed for the light emitted from the light source in each of the zones S1, S2 and S3.

Figure 12:
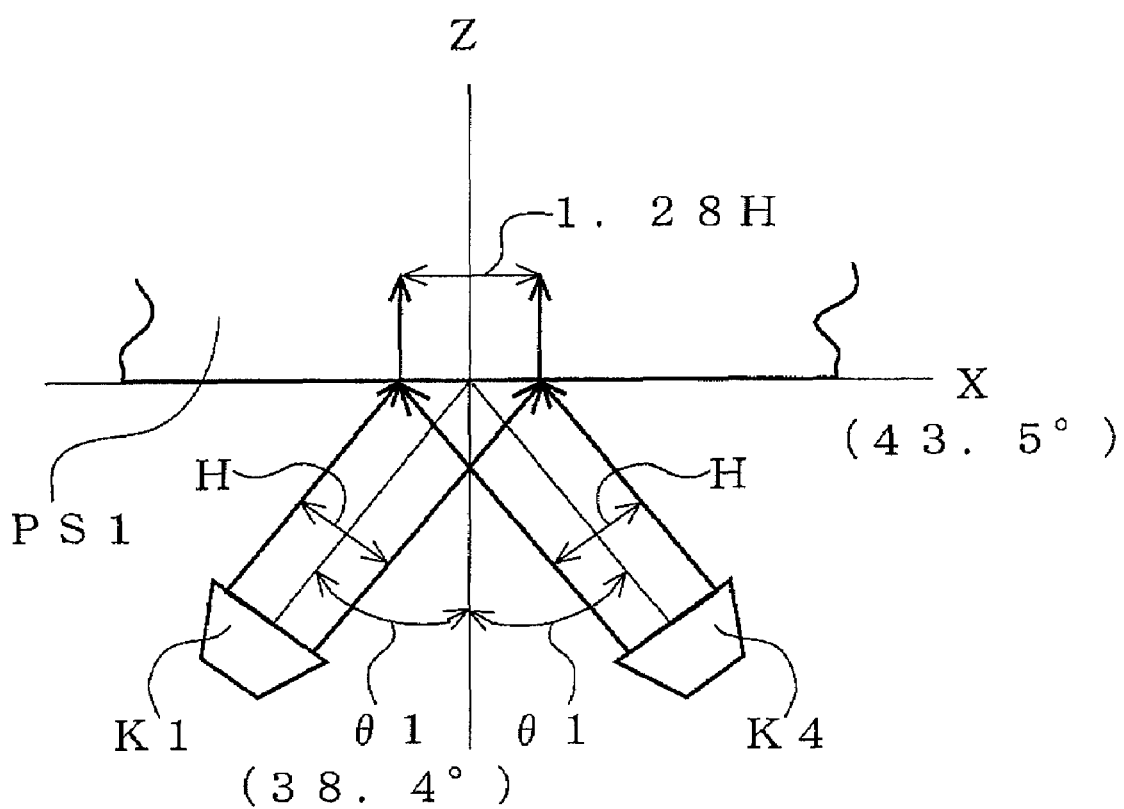
FIG. 12 is a side view showing the expansion of light when incident light obliquely enters a prism sheet in the present invention.

Next, the expansion of light in the light source apparatus of the present invention will be explained. FIG. 12 is a side view showing the expansion of light when incident light P1 and P4 enter the prism sheet PS1 through the lower surface of the lower prism sheet PS1. When the light source apparatus is used as a lighting apparatus, the optical axis of exiting light from the lighting apparatus is in a direction parallel to the Z axis, and the optical axis of incident light from each of the light sources K1 and K4 is in a direction inclined at an angle θ1 (38.4°) from the Z axis. The horizontal axis is an axis rotated through 43.5° from the X axis of the prism sheet PS1. Let us consider a case where incident light P1 having a light width H from the light source K1 enters the prism sheet PS1 through the lower surface of the prism sheet PS1. In this case, because a light having a width enters a horizontal plane from an oblique direction, the width of the light expands on the plane of incidence. Consequently, the incident light P1 exits as a light having a width of 1.28H. Incident light P4 from the light source K4 also enters the lower surface of the prism sheet PS1 from a position symmetric to the position of the light source K1 under the same optical conditions as the incident light P1 from the light source K1, and the light P4 expands in the same way as the above.

Figure 13:
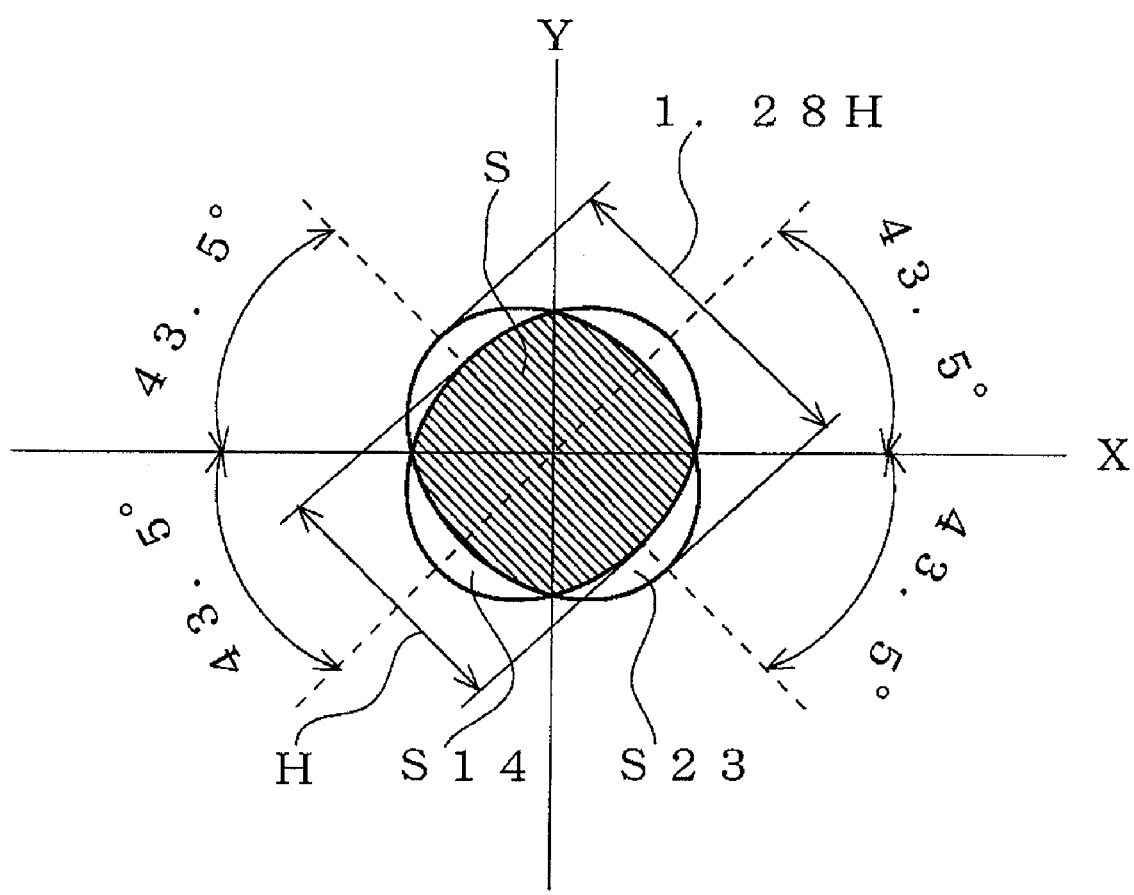
FIG. 13 is a plan view of light entering the prism sheet shown in FIG. 12 from four light sources.

FIG. 13 is a plan view showing the expansion of light when incident light P1 to P4 enters the two layered prism sheets PS1 and PS2 from four directions by the four light sources K1 to K4 in the light source apparatus shown in FIG. 12. In FIG. 13, the dashed lines show axes rotated through 43.5° from the X axis. Reference symbol S14 denotes illuminating light formed from light from the light sources K1 and K4. Reference symbol S23 denotes illuminating light formed from light from the light sources K2 and K3. Each illuminating light has an elliptical sectional shape having a minor diameter equal to the width H of the incident light and a major diameter equal to the width 1.28H of the exiting light. The two elliptic illuminating light S14 and S23 are superimposed on one another with their center points aligned with each other. As a result, the overlapping portions of the two ellipses, shown by the hatched lines, can be utilized as illuminating light S synthesized from the incident light P1 to P4 from the four light sources K1 to K4. That is, if light emitted from the four light sources K1 to K4 are R light, B light, G light and G light, color-mixed white light Pw can be utilized as illuminating light S.

Second Embodiment

Figure 14:
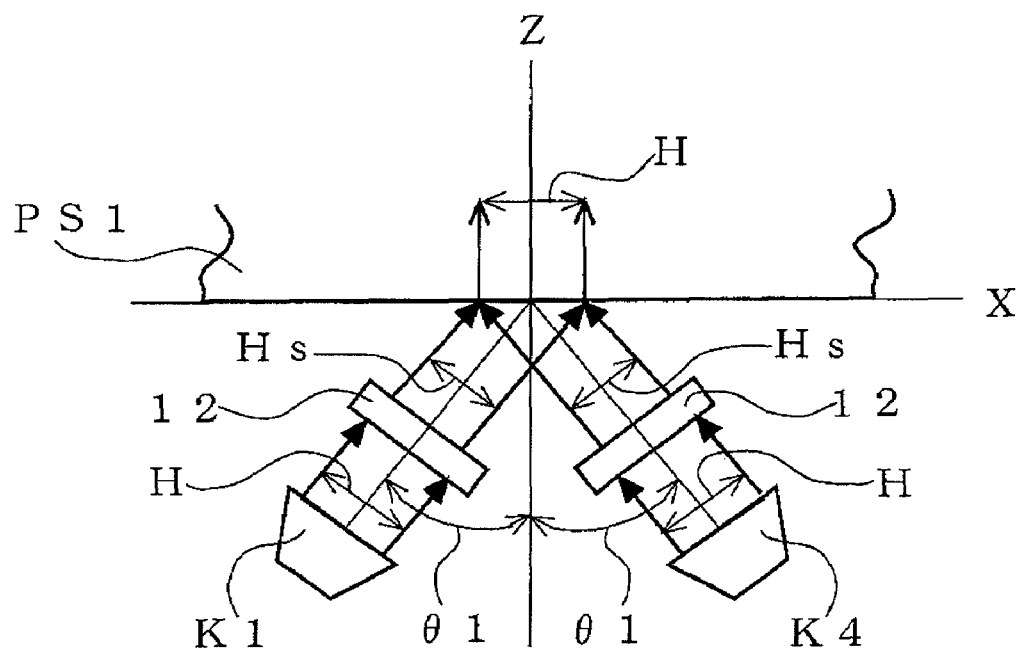
FIG. 14 is a side view showing the expansion of light when incident light obliquely enters a prism sheet in a light source apparatus according to a second embodiment of the present invention.
Figure 15:
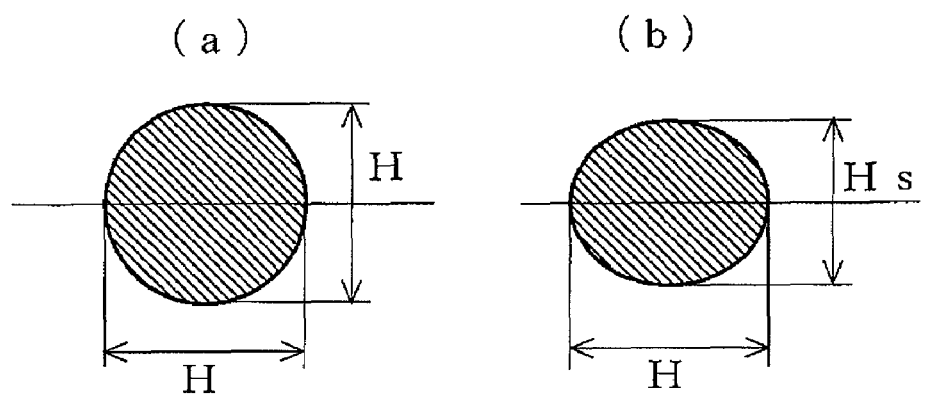
FIGS. 15a and 15b are plan views of incident light on the prism sheet shown in FIG. 14.

Next, a light source apparatus according to a second embodiment of the present invention will be explained with reference to FIGS. 14 to 16. FIG. 14 is a side view showing the expansion of light when incident light P1 and P4 from the light sources K1 and K4 enter the prism sheet PS1 through the lower surface of the lower prism sheet PS1, which corresponds to FIG. 12 showing the light source apparatus of the first embodiment. Accordingly, the same constituent elements as those of the light source apparatus shown in FIG. 12 are denoted by the same reference numerals as used in FIG. 12, and redundant explanation is omitted. The light source apparatus shown in FIG. 14 differs from the light source apparatus in FIG. 12 in that lenses each having different radii of curvature in the longitudinal and transverse directions thereof are disposed as optical elements in the respective optical paths between the light sources K1 and K4 and the lower surface of the prism sheet PS1. In this embodiment, anamorphic lenses 12 are used as the optical elements.

Next, the way in which lights expand will be explained with reference to FIGS. 14, 15a and 15b. Let us consider a case where incident light P1 of a circular sectional shape having a diameter H as shown in FIG. 15a is emitted from the light source K1. By passing through the anamorphic lens 12, the incident light P1 is subjected to different optical changes in the longitudinal and transverse directions thereof. Consequently, the incident light P1 is formed into a light having an elliptical sectional shape as shown in FIG. 15b, which has a major diameter H in the transverse direction and a minor diameter Hs in the longitudinal direction, and this elliptical incident light P1 enters the prism sheet PS1 through the lower surface of the lower prism sheet PS1. Because the incident light P1 is applied to a horizontal plane from an oblique direction, the light width in the longitudinal direction expands on the plane of incidence, resulting in the longitudinal light width expanding from Hs to H. Thus, the light is restored to a light of a circular sectional shape having a diameter H, as shown in FIG. 15a, and the restored light is allowed to exit. In other words, the light width of the incident light P1 is contracted in advance by an amount corresponding to the amount of expansion due to the oblique incidence by using the anamorphic lens 12, thereby obtaining exiting light having the same sectional shape as that of the incident light.

Figure 16:
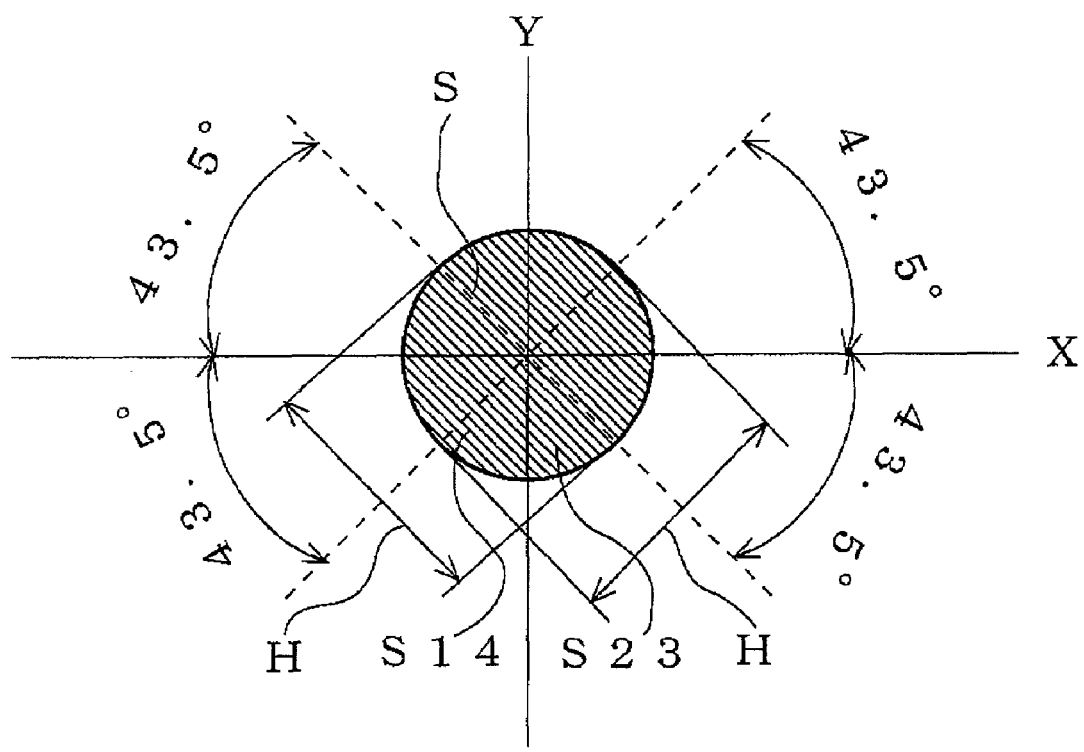
FIG. 16 is a plan view of light entering the prism sheet shown in FIG. 14 from four light sources.

FIG. 16 is a plan view showing the expansion of light when incident light enters the two layered prism sheets PS1 and PS2 from four directions by the four light sources K1, K2, K3 and K4 in the light source apparatus having the anamorphic lenses 12 shown in FIG. 14. FIG. 16 corresponds to FIG. 13 showing the light source apparatus of the first embodiment. FIG. 16 differs from FIG. 13 as follows. In FIG. 16, both illuminating light S14 formed from light from the light sources K1 and K4 and illuminating light S23 formed from light from the light sources K2 and K3 have a circular sectional shape of a diameter H, and hence illuminating light S obtained by superimposition of the illuminating light S14 and S23 also has a circular sectional shape of a diameter H. Accordingly, all the illuminating light S14, S23 and S become a single light of a circular sectional shape shown by the hatched lines. That is, the light source apparatus of the second embodiment can utilize all the incident light as illuminating light and hence can serve as an efficient lighting apparatus. It should be noted that the light source apparatus shown in FIG. 14 has an arrangement in which the anamorphic lenses 12 are disposed in the optical paths of the light source apparatus of the first embodiment shown in FIG. 7. The arrangement, however, is not necessarily limited to the illustrated one. An anamorphic lens 12 may be used in place of the condenser lens 2 disposed in each light source K. A reflection coating may be formed on the exit surface of the anamorphic lens 12 to implement a bandpass mirror function.

Third Embodiment

Figure 17:
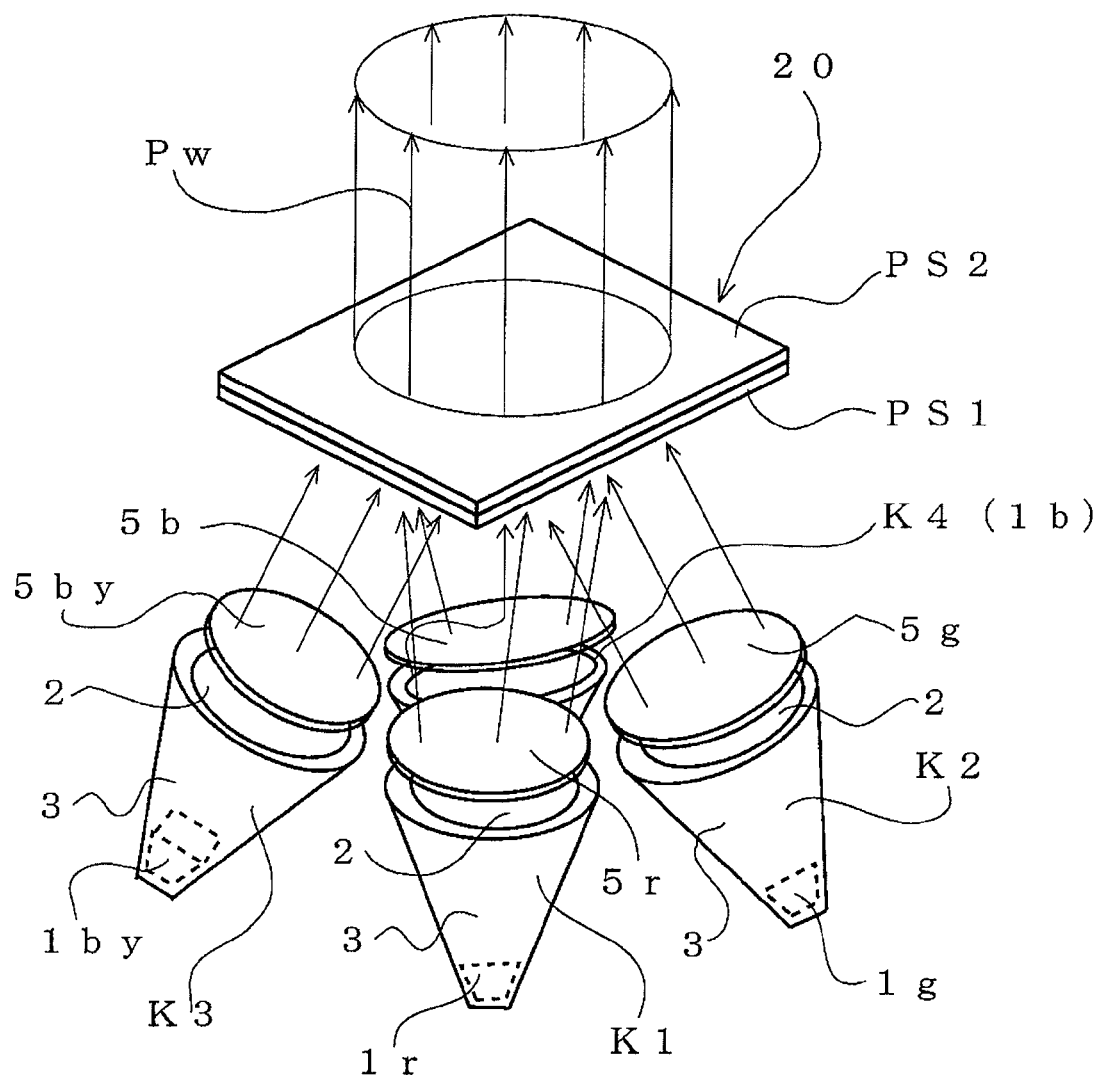
FIG. 17 is a perspective view of a light source apparatus according to a third embodiment of the present invention.
Figure 18:
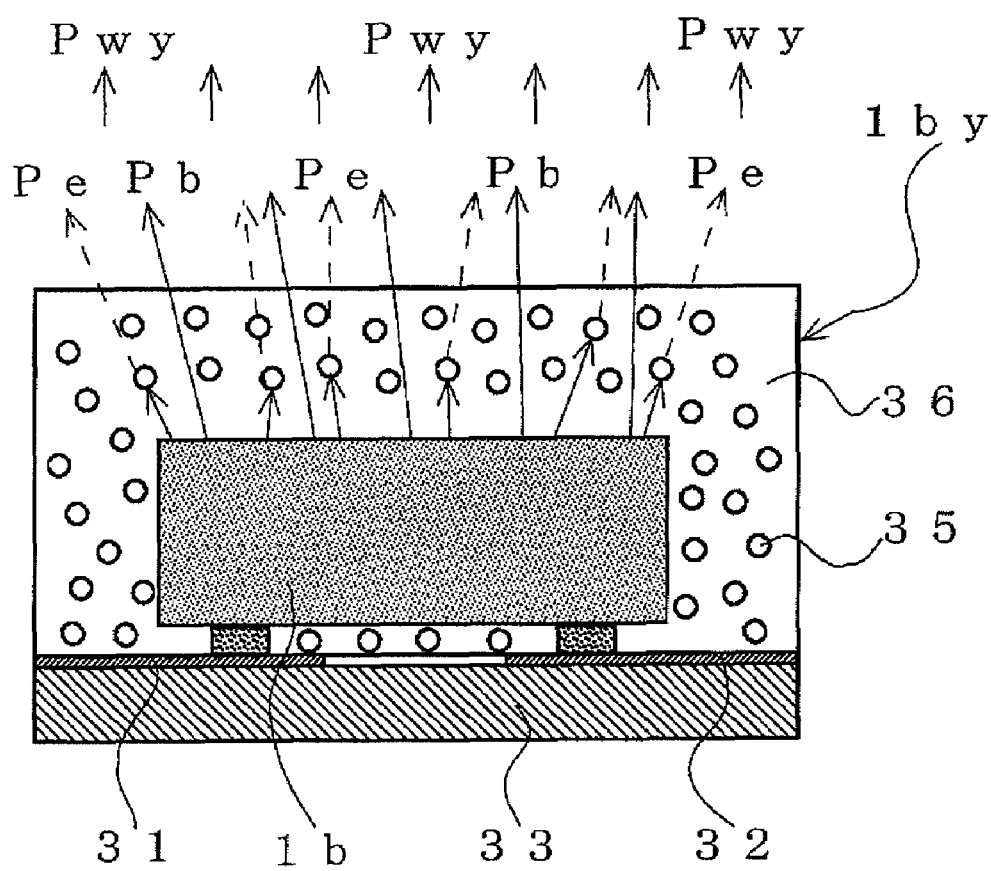
FIG. 18 is a sectional view of a blue YAG LED shown in FIG. 17.

Next, a light source apparatus according to a third embodiment of the present invention will be explained with reference to FIGS. 17 and 18. FIG. 17 is a perspective view of a light source apparatus 20 according to the third embodiment. The basic arrangement of the light source apparatus 20 is the same as that of the light source apparatus 10 of the first embodiment shown in FIG. 1. Therefore, the same constituent elements as those of the light source apparatus 10 shown in FIG. 1 are denoted by the same reference numerals as used in FIG. 1, and redundant explanation is omitted. The light source apparatus 20 shown in FIG. 17 differs from the light source apparatus 10 shown in FIG. 1 in that a blue YAG LED 1by is used as a light-emitting element of the light source K3 in place of the G LED.

The arrangement of the blue YAG LED 1by will be explained below. FIG. 18 is a sectional view of a blue YAG LED that is a fluorescent color-mixing type white light-emitting element. The blue YAG LED 1by shown in FIG. 18 has a B LED 1b connected to a substrate 33 having electrodes 31 and 32. The B LED 1b is molded with a transparent resin 36 mixed with YAG fluorescent particles 35.

The blue YAG LED 1by operates as follows. When a driving voltage is applied between the electrodes 31 and 32, the B LED 1b emits blue light Pb. When the blue light Pb collides with the fluorescent particles 35 mixed in the transparent resin 36, the fluorescent particles 35 are excited to cause wavelength conversion, and thus yellow light Pe is emitted from the fluorescent particles 35. As a result, the blue YAG LED 1by emits fluorescent white light Pwy that is a mixture of blue light Pb emitted from the B LED 1b and output without colliding with the fluorescent particles 35 and yellow light Pe obtained through wavelength conversion of the blue light Pb by colliding with the fluorescent particles 35.

As shown in FIG. 17, the light source apparatus 20 uses an R LED 1r in the light source K1, a G LED 1g in the light source K2, a blue YAG LED 1by in the light source K3 and a B LED 1b in the light source K4 to perform color mixing. Therefore, color-mixed light obtained from the R, G and B LEDs is additionally mixed with fluorescent white light Pwy from the blue YAG LED 1by. Thus, a lighting apparatus that is bright and superior in color rendering properties can be realized.

Fourth Embodiment

Figure 19:
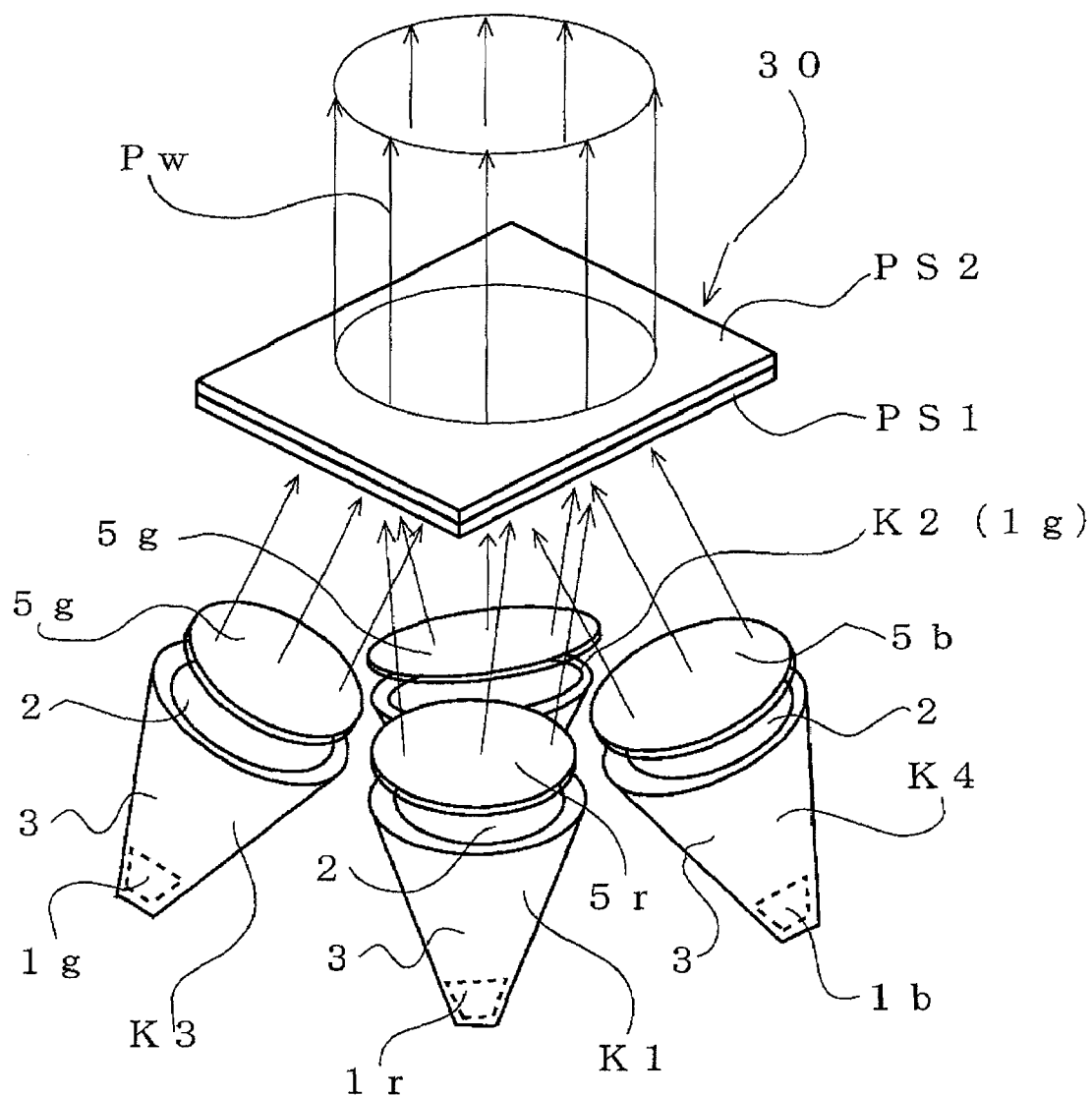
FIG. 19 is a perspective view of a light source apparatus according to a fourth embodiment of the present invention.
Figure 20:
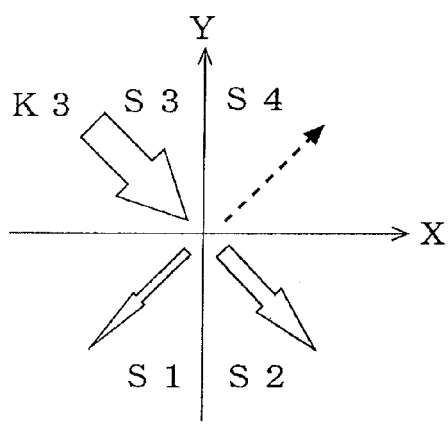
FIGS. 20a, 20b, 20c and 20d are plan views each showing, in the X-Y plane, the relationship between incident light from each light source and reflected light from two layered prism sheets in the light source apparatus shown in FIG. 19.
Figure 20:
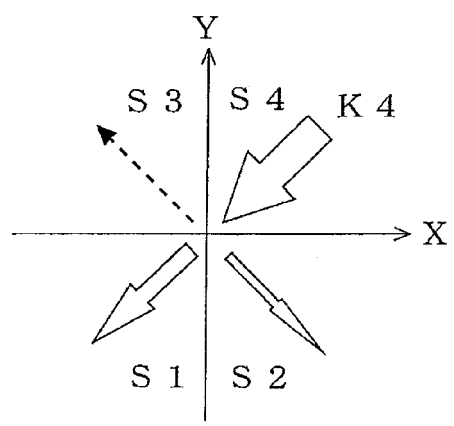
Figure 20:
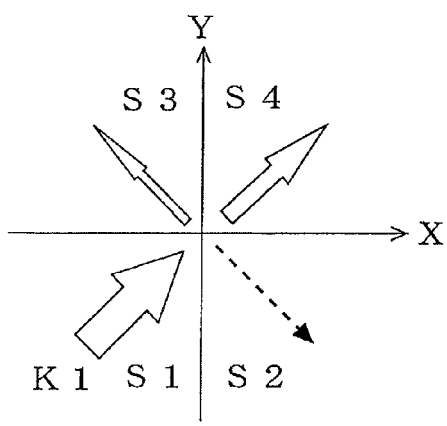
Figure 20:
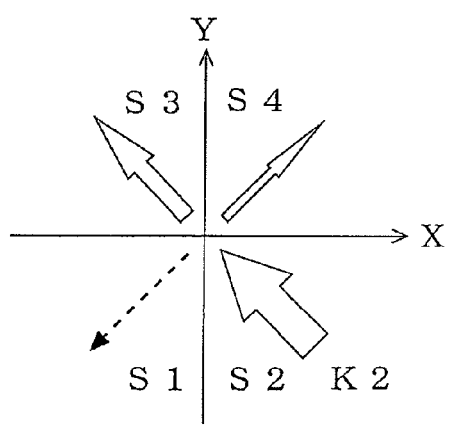
Figure 21:
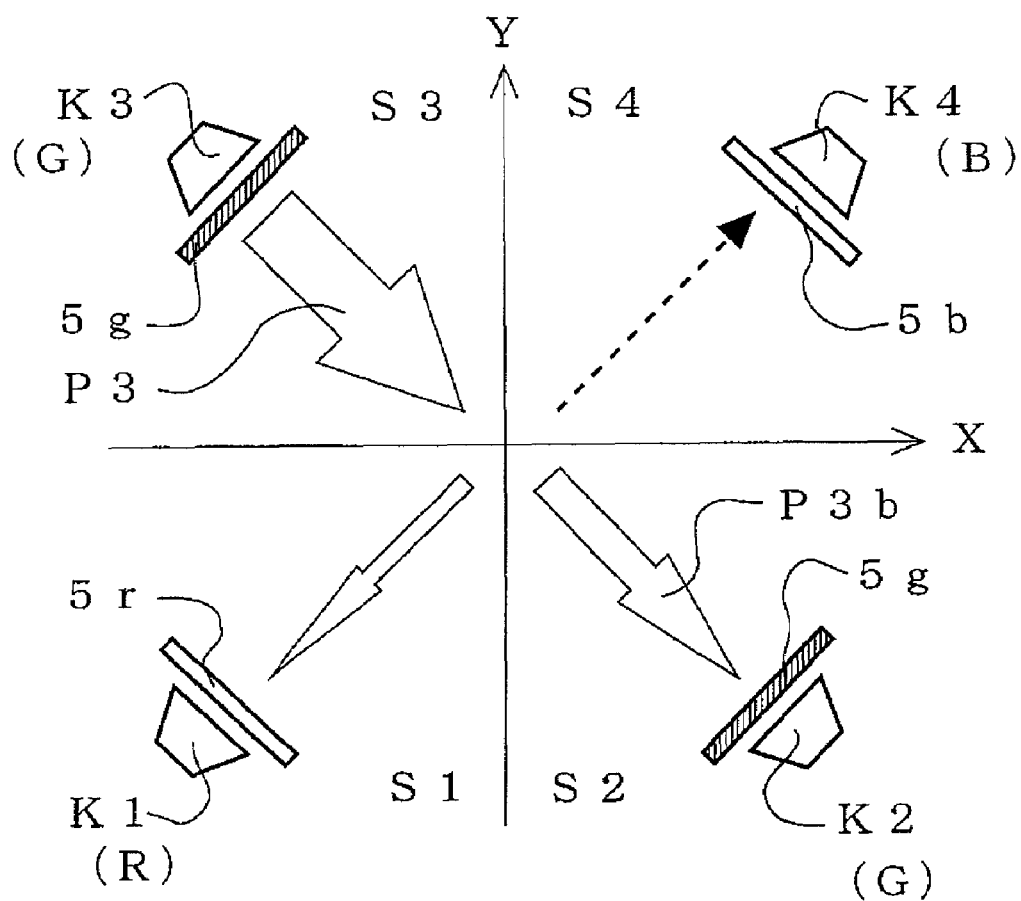
FIG. 21 is a plan view showing, in the X-Y plane, the relationship between incident light from a light source K3 and reflected light from two layered prism sheets in the light source apparatus shown in FIG. 19.
Figure 22:
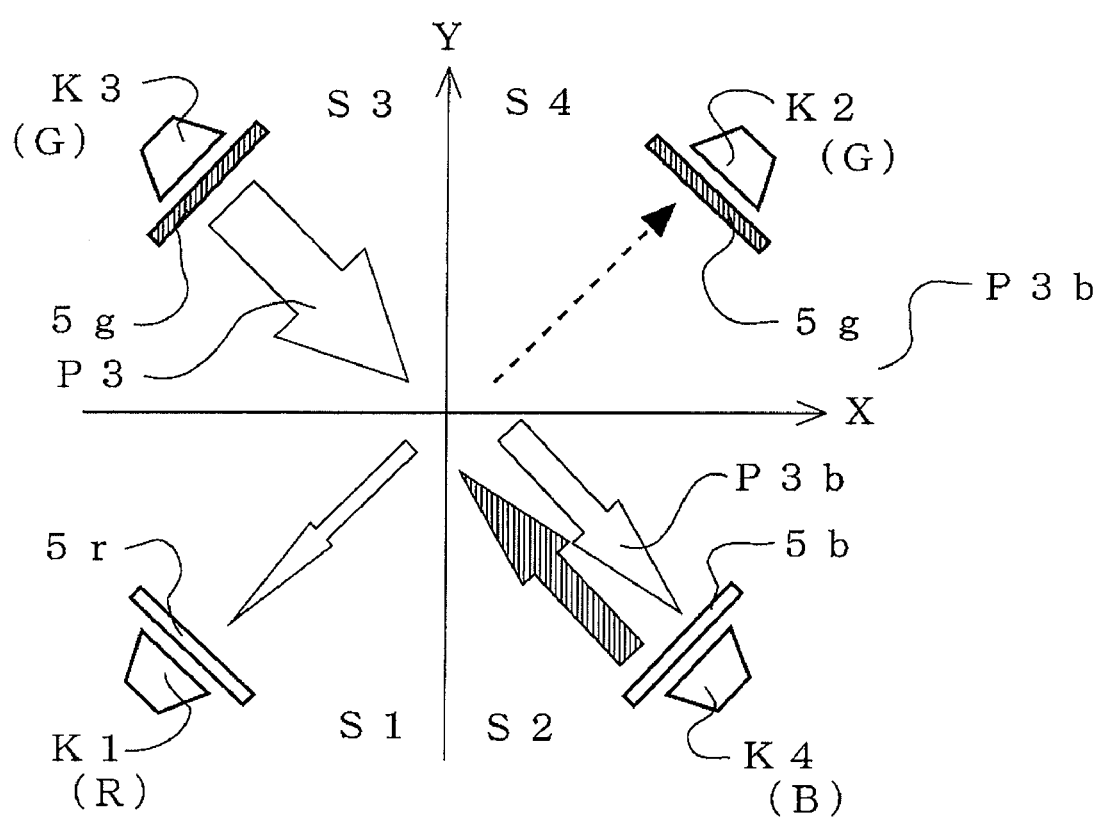
FIG. 22 is a plan view showing, in the X-Y plane, the relationship between incident light from a light source K3 and reflected light from two layered prism sheets in the light source apparatus shown in FIG. 19.

Next, a light source apparatus according to a fourth embodiment of the present invention will be explained with reference to FIGS. 19 to 22. FIG. 19 is a perspective view of the light source apparatus according to the fourth embodiment of the present invention. FIGS. 20a to 20d are plan views in the X-Y plane similar to FIG. 11, each showing the relationship between incident light from each light source and reflected light from two layered prism sheets PS1 and PS2. FIG. 20a shows incident light from the light source K3 in the zone S3. FIG. 20b shows incident light from the light source K4 in the zone S4. FIG. 20c shows incident light from the light source K1 in the zone S1. FIG. 20d shows incident light from the light source K2 in the zone S2. FIG. 21 is a plan view in an X-Y plane showing the relationship between incident light from the light source K3 in the light source apparatus 10 according to the first embodiment of the present invention, which is shown in FIG. 1, and reflected light from the two layered prism sheets PS1 and PS2. FIG. 22 is a plan view in an X-Y plane showing the relationship between incident light from the light source K3 in the light source apparatus according to the fourth embodiment of the present invention, which is shown in FIG. 19, and reflected light from the two layered prism sheets PS1 and PS2.

In FIG. 19, the light source apparatus 30 of the fourth embodiment has a basic structure similar to that of the light source apparatus 10 shown in FIG. 1. Accordingly, the same constituent elements as those of the light source apparatus 10 are denoted by the same reference numerals as used in FIG. 1, and redundant explanation is omitted. The light source apparatus 30 differs from the light source apparatus 10 in that the light source K2 and the light source K4 are replaced with each other. In the light source apparatus 10, the light source K4 is disposed in the zone S4 and the light source K2 in the zone S2.

In the light source apparatus 30, the light source K2 is disposed in the zone S4 and the light source K4 in the zone S2. This arrangement increases the efficiency of converting non-effective light, which is reflected light, into effective light.

The reason for the above will be explained below. FIGS. 20a to 20d are plan views each showing, in the X-Y plane, the relationship between incident light from each light source and reflected light from the two layered prism sheets PS1 and PS2. FIG. 20a shows incident light from the light source K3 in the zone S3. FIG. 20b shows incident light from the light source K4 in the zone S4. FIG. 20c shows incident light from the light source K1 in the zone S1. FIG. 20d shows incident light from light source K2 in the zone S2. The relationship of reflected light from the two prism sheets PS1 and PS2 to incident light from each light source is as follows. As has been explained above in connection with FIG. 11, for light emitted from one light source, a large amount of reflected light is directed to a zone opposing a zone where the light source is present. A small amount of reflected light is directed to another zone, and no reflected light is present in the remaining zone. A zone where there is no reflected light in relation to incident light from each zone is as shown in FIGS. 20a to 20d. As shown in FIG. 20a, no reflected light is present in the zone S4 in relation to incident light from the light source K3 in the zone S3. As shown in FIG. 20b, no reflected light is present in the zone S3 in relation to incident light from the light source K4 in the zone S4. As shown in FIG. 20c, no reflected light is present in the zone S2 in relation to incident light from the light source K1 in the zone S1. As shown in FIG. 20d, no reflected light is present in the zone S1 in relation to incident light from the light source K2 in the zone S2.

FIG. 21 is a plan view showing, in the X-Y plane, the relationship between incident light from the light source K3 in the light source apparatus 10 of the first embodiment, which is shown in FIG. 1, and reflected light from the two layered prism sheets PS1 and PS2 to examine the efficiency of converting non-effective light, i.e. reflected light, into effective light by taking into account the direction of reflected light shown in FIGS. 20a to 20d. The light source apparatus 10 mixes R, B and G light and emits the resulting color-mixed light. In this regard, G LED emits a small amount of light in comparison to R LED and B LED in the present state of art. Therefore, two G LEDs are used as shown in FIG. 21: R LED in the zone S1; G LED in the zone S2; G LED in the zone S3; and B LED in the zone S4.

In this arrangement, two G LEDs are disposed in the mutually opposing zones S2 and S3. Therefore, it is an optimum arrangement for color mixing but somewhat inferior from the viewpoint of the efficiency of converting non-effective light, i.e. reflected light, into effective light. That is, each light source is provided with a bandpass mirror, as has been stated above, and the two light sources K2 and K3, each having a G LED, are provided with similar bandpass mirrors 5g (shown by the hatched lines in the figure), respectively, which transmit lights in the wavelength region of G light. Consequently, when reflected light P3b of incident light P3 emitted from the light source K3 is directed to the zone S2, the bandpass mirror 5g of the light source K2 cannot reflect the light P3b, which is G light, but allows it to pass therethrough undesirably. As a result, the converting efficiency is degraded by an amount corresponding to the amount of reflected light P3b transmitted without being reflected and converted into effective light.

FIG. 22 is a plan view showing, in the X-Y plane, the relationship between incident light from the light source K3 in the light source apparatus 30 of the fourth embodiment, which is shown in FIG. 19, and reflected light from the two layered prism sheets PS1 and PS2. In the light source apparatus 30, the light source K2 having a G LED is disposed in the zone S4, and the light source K4 having a B LED is disposed in the zone S2. In this case, reflected light P3b of incident light P3 emitted from the light source K3 is directed to the zone S2. In the zone S2, however, the light source K4 is disposed. Therefore, the reflected light P3b is reflected and converted into effective light by the bandpass mirror 5b of the light source K4. That is, the light source K2 provided with the bandpass mirror 5g that would otherwise transmit reflected light P3b is disposed in the zone S4 where there is no reflected light of incident light from the light source K3, whereby it is possible to increase the efficiency of converting non-effective light into effective light.

It will be understood from the above that light sources emitting the same color of light should not be disposed in mutually opposing zones but should be disposed in mutually adjacent zones where each other's reflected light is not present. It will also be understood that the light sources emitting the same color of light can also be disposed in the zones S1 and S2 instead of being disposed in the zones S3 and S4 as shown in FIG. 22.

Fifth Embodiment

Figure 23:
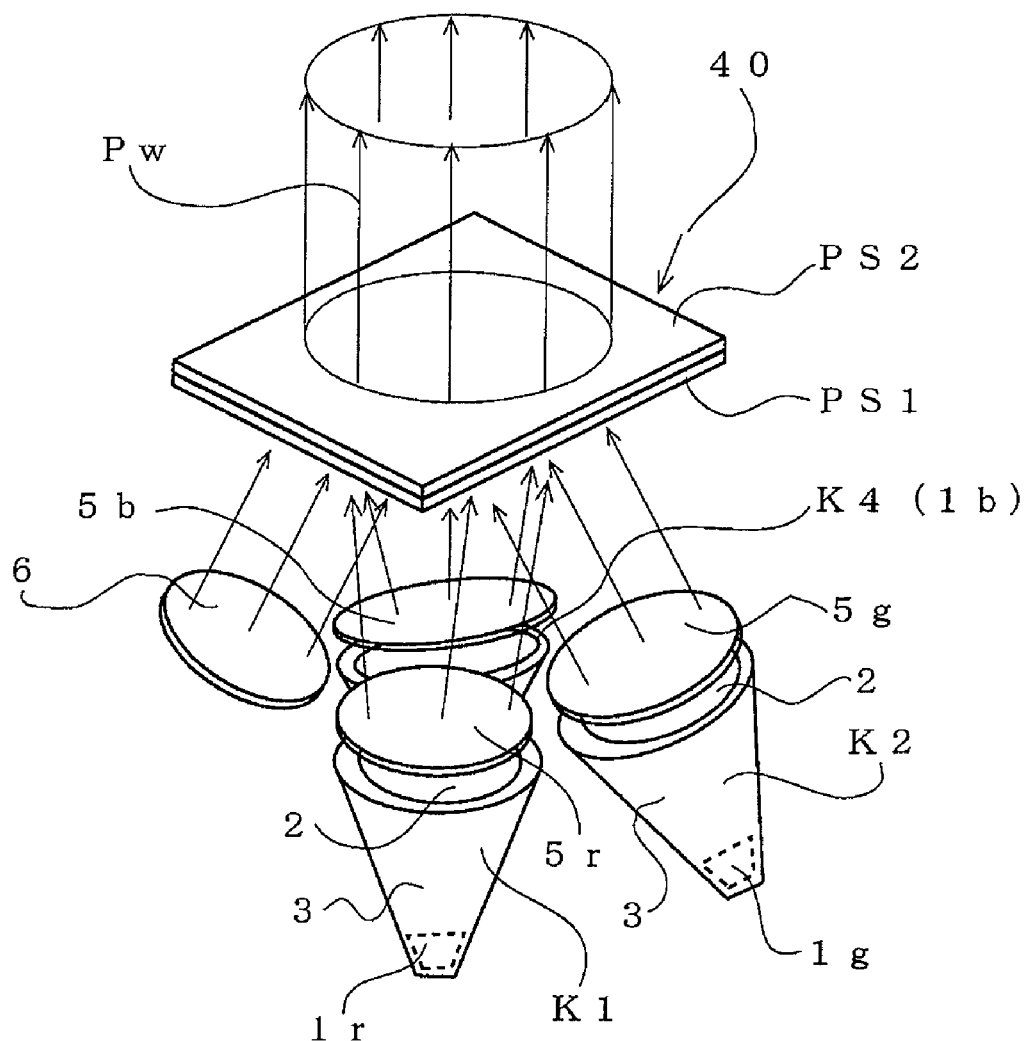
FIG. 23 is a perspective view of a light source apparatus according to a fifth embodiment of the present invention.

Next, a light source apparatus according to a fifth embodiment of the present invention will be explained with reference to FIG. 23. FIG. 23 is a perspective view of a light source apparatus 40 according to the fifth embodiment of the present invention. In FIG. 23, the light source apparatus 40 has the same basic structure as that of the light source apparatus 10 shown in FIG. 1. Therefore, the same constituent elements as those of the light source apparatus 10 shown in FIG. 1 are denoted by the same reference numerals as used in FIG. 1, and redundant explanation is omitted. The light source apparatus 40 differs from the light source apparatus 10 in that the light source K3 disposed in the zone S3 in the light source apparatus 10 is replaced with a mere reflection mirror 6. That is, the light source apparatus 40 uses three light sources, i.e. an R light source K1, a G light source K2, and a B light source K4. The reflection mirror 6 disposed in the zone S3 merely performs the function of converting non-effective light into effective light by reflecting all reflected light from the light sources. It is desirable in this arrangement that the G LED of the light source K2 should be balanced with the R and B LEDs of the other light sources in terms of emission light quantity by increasing the driving current or the number of G LEDs mounted to thereby increase the light quantity.

Sixth Embodiment

Figure 24:
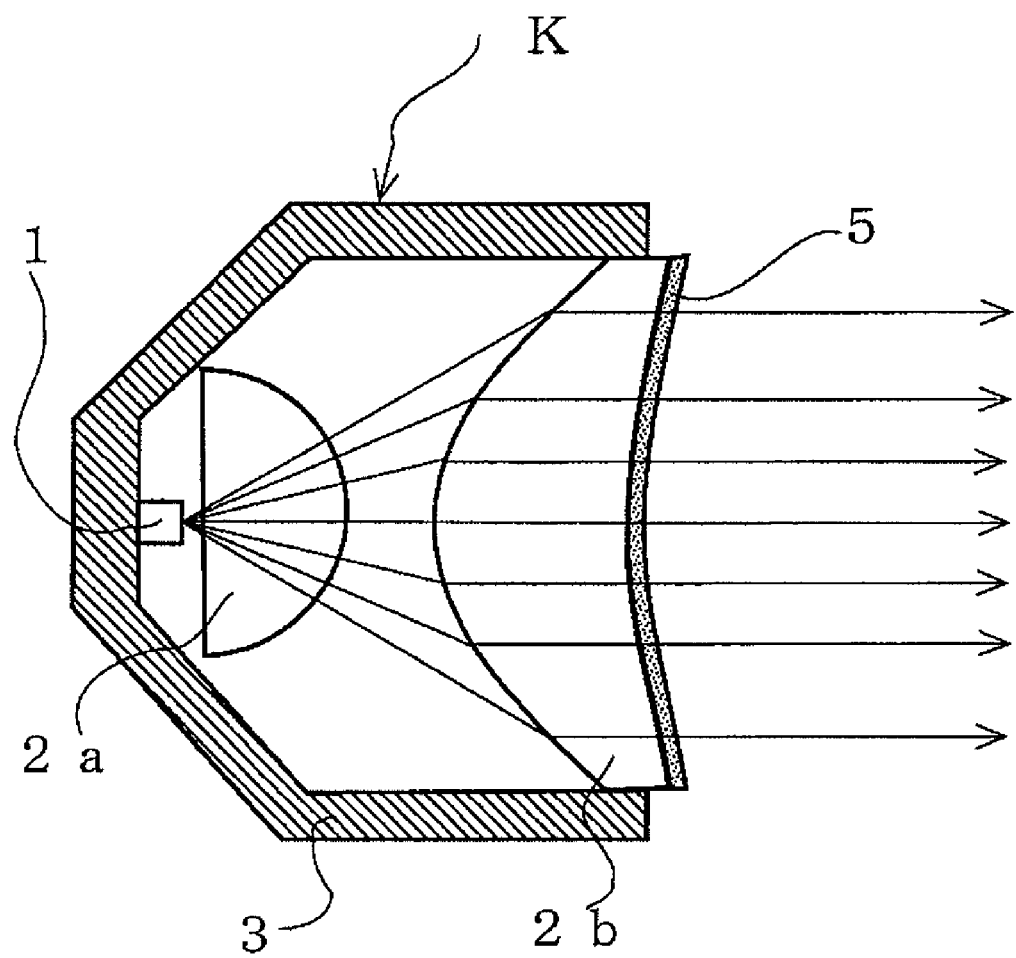
FIG. 24 is a sectional view of a light source in a light source apparatus according to a sixth embodiment of the present invention.

Next, a light source of a light source apparatus according to a sixth embodiment of the present invention will be explained. FIG. 24 is a sectional view of a light source of the light source apparatus according to the sixth embodiment of the present invention. In the figure, a light source K has an LED 1 and two lenses 2a and 2b incorporated in a casing 3, and a coating of bandpass mirror 5 is formed on the exit surface of the second lens 2b. That is, the light source K in this embodiment uses two condenser lenses to sufficiently collimate light emitted from the LED 1 into parallel . In addition, the bandpass mirror 5 is implemented by forming a reflection coating on the exit surface of the second lens 2b, thereby integrating the bandpass mirror 5 with the light source K. Further, the exit surface of the second lens 2b is formed into a concave lens to improve the performance of collecting reflected light.

It should be noted that the exit surface of the second lens 2b, on which the coating of bandpass mirror 5 is formed, is not necessarily limited to a concave lens (or concave mirror) but may be a convex lens (or convex mirror) or a plane lens. Which of them is to be used should preferably be properly determined according to the light-emitting condition of an LED used as a light-emitting source and the condition of reflected light. That is, if the LED is a light source emitting divergent light as in the case of a multiplanar light-emitting source, it is preferable to use a concave lens having the function of converging reflected light. If the LED is a point source emitting light having a high intensity at the center thereof, a convex lens having the function of diverging reflected light should preferably be used.

Seventh Embodiment

Figure 25:
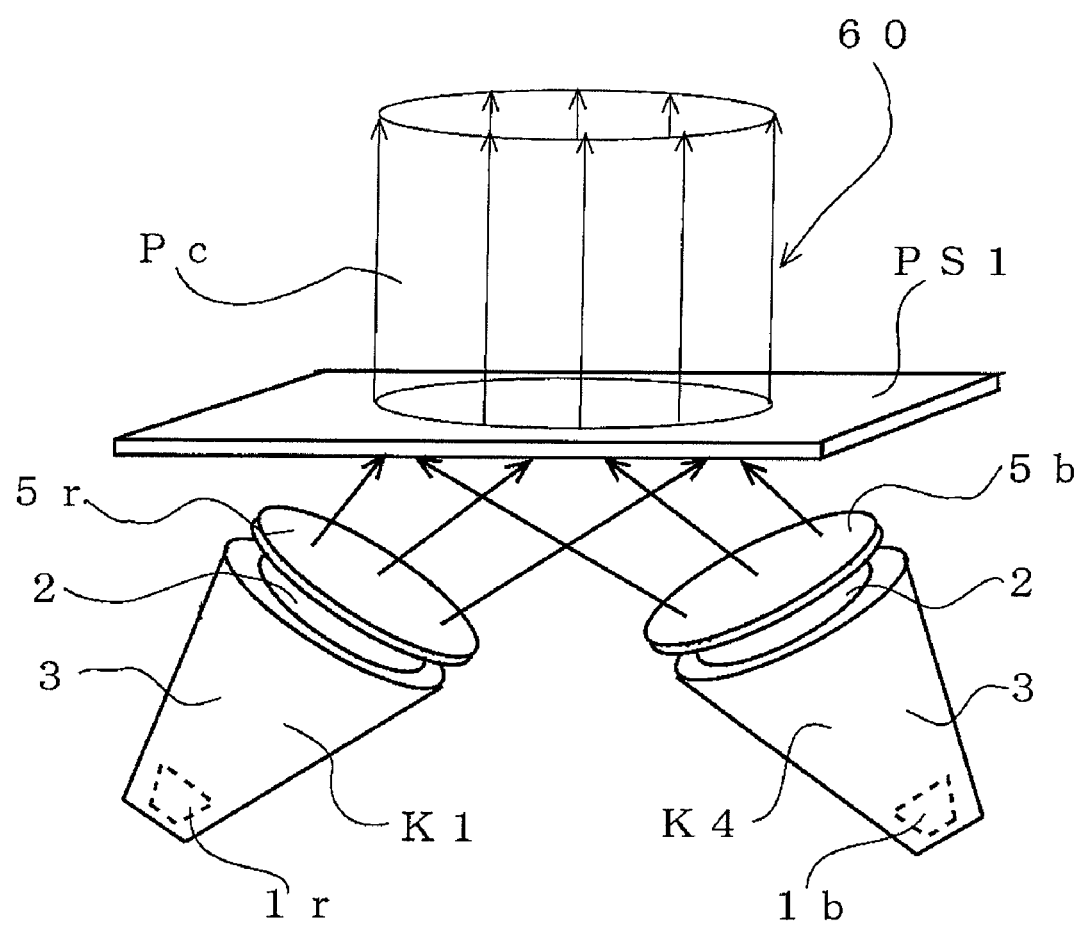
FIG. 25 is a perspective view of a light source apparatus according to a seventh embodiment of the present invention.

Next, a light source apparatus according to a seventh embodiment of the present invention will be explained with reference to FIG. 25. FIG. 25 is a perspective view of the light source apparatus according to the seventh embodiment of the present invention. In FIG. 25, the light source apparatus 60 of the seventh embodiment has a basic structure similar to that of the light source apparatus 10 shown in FIG. 1. Accordingly, the same constituent elements as those of the light source apparatus 10 are denoted by the same reference numerals as used in FIG. 1, and redundant explanation is omitted. The light source apparatus 60 differs from the light source apparatus 10 in that the former uses only one prism sheet PS1, and only two light sources, i.e. a light source K1 having an R LED and a light source K4 having a B LED. Thus, R light from the light source K1 and B light from the light source K4 are mixed, and color light Pc is obtained from the prism sheet PS1 as exiting light. That is, the light source apparatus 60 of this embodiment mixes two colors of light from two light sources by a single prism sheet and converts non-effective light into effective light by bandpass mirrors. The color mixing of light from two light sources and the operation of converting non-effective light into effective light by bandpass mirrors are as has been explained in connection with FIGS. 7 and 8. It should be noted that any light sources may be used according to the color of light Pc to be obtained.

In the case of the light source apparatus using a single prism sheet as stated above, light from two light sources can be combined by making light from the two light sources enter the prism sheet obliquely to the prism rows. The light source apparatus 60 of this embodiment can perform color mixing with a high converting efficiency by a simple structure comprising a combination of a single prism sheet and two light sources and is therefore usable as a light source apparatus providing efficiently color-mixed monochromatic light. Accordingly, the light source apparatus 60 can be expected to be used as color lighting apparatus in addition to white-light sources.

Eighth Embodiment

Figure 26:
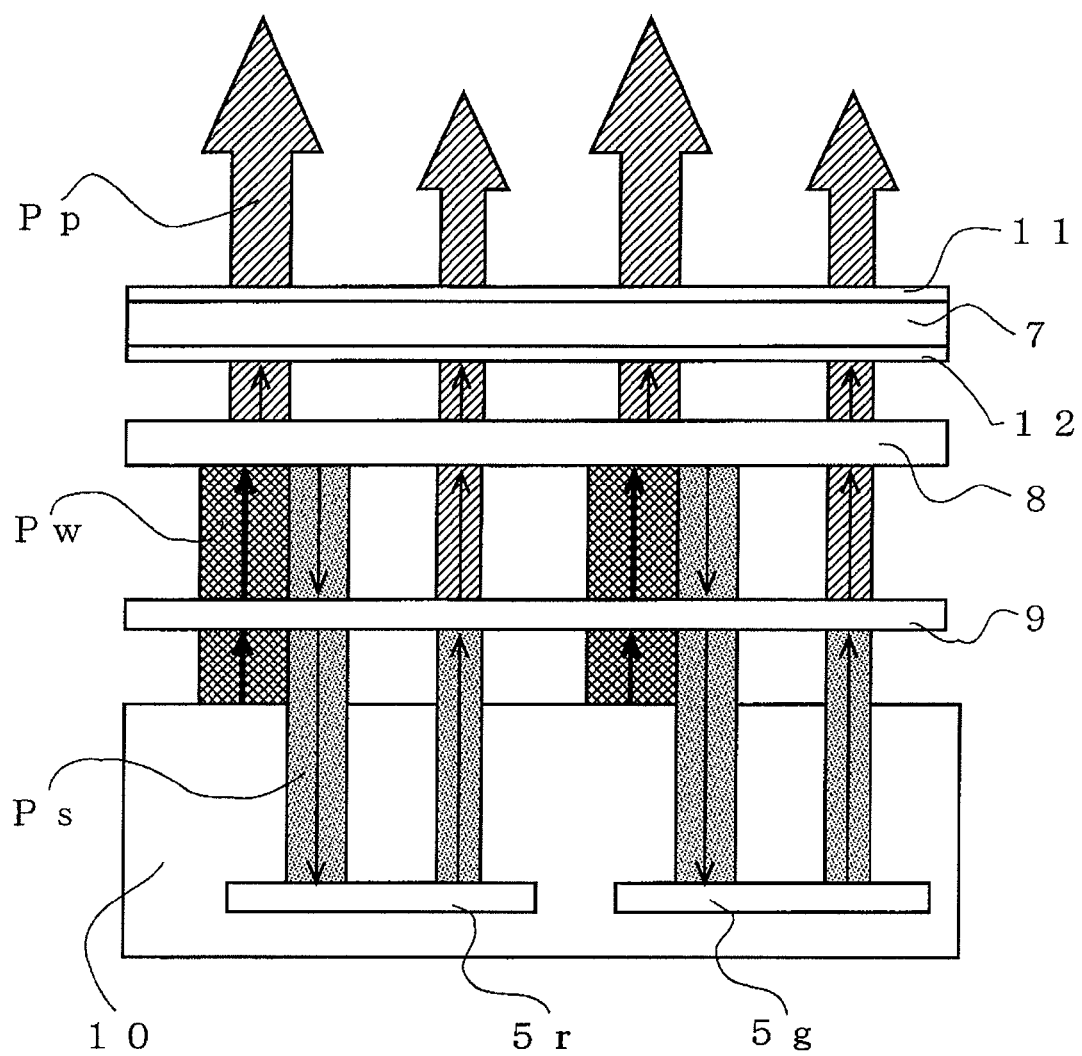
FIG. 26 is a sectional view schematically showing a liquid crystal display apparatus using a light source apparatus according to the present invention as a backlight unit.

The following is an explanation of an arrangement of a liquid crystal display apparatus using a light source apparatus according to the present invention as a backlight unit. FIG. 26 is a sectional view schematically showing a liquid crystal display apparatus using a light source apparatus of the present invention as a backlight unit. Reference numeral 10 denotes a light source apparatus of the present invention arranged as shown in FIG. 1. The light source apparatus 10 incorporates four bandpass mirrors 5r, 5g, 5b and 5g. A liquid crystal display element 7 has an upper polarizer 11 and a lower polarizer 12. A reflection-type polarization converting element 8 is disposed between the liquid crystal display element 7 and the light source apparatus 10. A phase plate 9 is disposed between the reflection-type polarization converting element 8 and the bandpass mirrors 5 of the light source apparatus 10. The liquid crystal display element 7, the reflection-type polarization converting element 8 and the phase plate 9 constitute in combination a liquid crystal display apparatus. The light source apparatus 10 constitutes a backlight unit. It should be noted that the light source apparatus 10 may be any of the above-described light source apparatuses.

The following is an explanation of the action of illuminating light in the liquid crystal display apparatus of the present invention. In FIG. 26, Pw shown by the lattice pattern is exiting light from the light source apparatus 10, and Pp shown by the hatched lines represents light (e.g. p-polarized light ) transmitted through the reflection-type polarization converting element 8. Further, Ps shown by the pear-skin pattern represents light (e.g. s-polarized light ) reflected by the reflection-type polarization converting element 8. First, exiting light Pw from the light source apparatus 10 passes through the phase plate 9 and impinges on the reflection-type polarization converting element 8. Of the exiting light Pw, p-polarized light Pp passes through the reflection-type polarization converting element 8 and illuminate the liquid crystal display element 7. However, the s-polarized light Ps is reflected by the reflection-type polarization converting element 8, passes through the phase plate 9 and returns to the light source apparatus 10.

The s-polarized light Ps reversely entering the light source apparatus 10 is dispersed in four directions by the layered prism sheets as will be explained later and reflected by the four bandpass mirrors 5r, 5g, 5b and 5g to exit the light source apparatus 10 again. The reexiting s-polarized light Ps passes through the phase plate 9, thereby being converted into p-polarized light Pp and thus allowed to pass through the reflection-type polarization converting element 8 to illuminate the liquid crystal display element 7. It should be noted that the phase plate 9 in this embodiment has a retardation set so that s-polarized light is converted into p-polarized light Pp by passing through the phase plate 9 twice.

Figure 27:
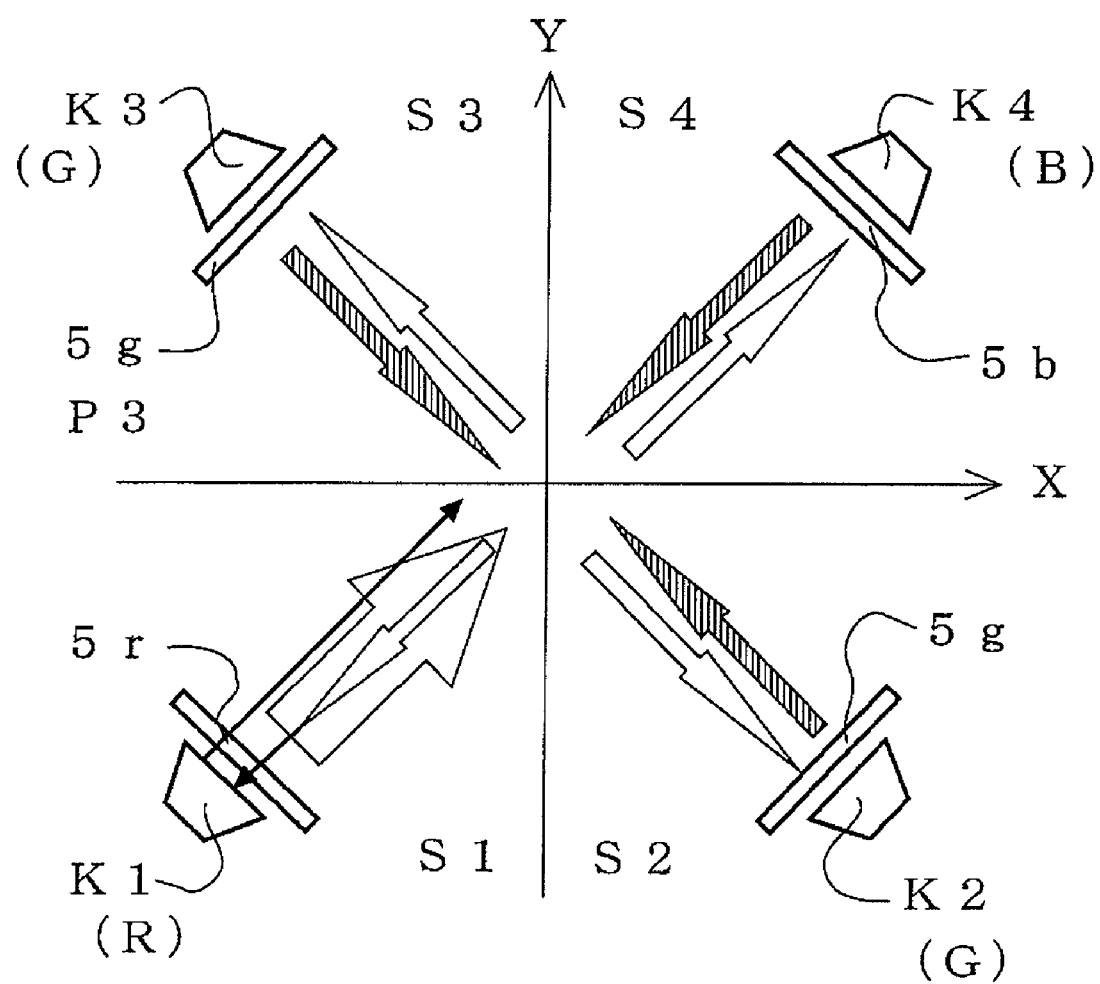
FIG. 27 is a plan view showing the way in which light reflected by a reflection-type polarization converting element shown in FIG. 26 reversely enters the light sources of the light source apparatus.

FIG. 27 show the way in which light is reflected by the reflection-type polarization converting element 8 to enter the light source apparatus 10 reversely. FIG. 27 shows reversely incident light having an R light component, which is emitted from the light source K1 in the zone S1, by way of example. The light reversely entering the light source apparatus 10 is divided into four equal parts and directed to the four bandpass mirrors 5r, 5g, 5b and 5g, respectively. The light having an R light component is reflected by the bandpass mirrors 5g and 5b as shown by the hatched arrows but transmitted through the bandpass mirror 5r, which is the light-emitting source of the light. That is, the light is not reflected by the bandpass mirror 5r. However, a part of the light transmitted through the bandpass mirror 5r impinges on and is reflected by the mounting surface of the LED element as shown by the thin-line arrow.

As has been stated above, the combination of a light source apparatus of the present invention and a liquid crystal display element enables light recycling to be performed efficiently by the reflection-type polarization converting element without using a diffusion enhancing member in the optical path of the backlight unit. The light-recycling efficiency can be further increased by using the phase plate in combination with the reflection-type polarization converting element. Although in this embodiment the phase plate 9 is disposed between the liquid crystal display element 7 and the light source apparatus 10, the phase plate 9 can be omitted by using a prism sheet having birefringent properties that introduce a desired retardation as a prism sheet constituting the light source apparatus. By so doing, an even thinner and less costly backlight unit can be realized.

Next, a light source apparatus using a prism sheet having a plurality of fine prisms on both sides thereof will be explained in detail by way of embodiment.

Ninth Embodiment

Figure 28:
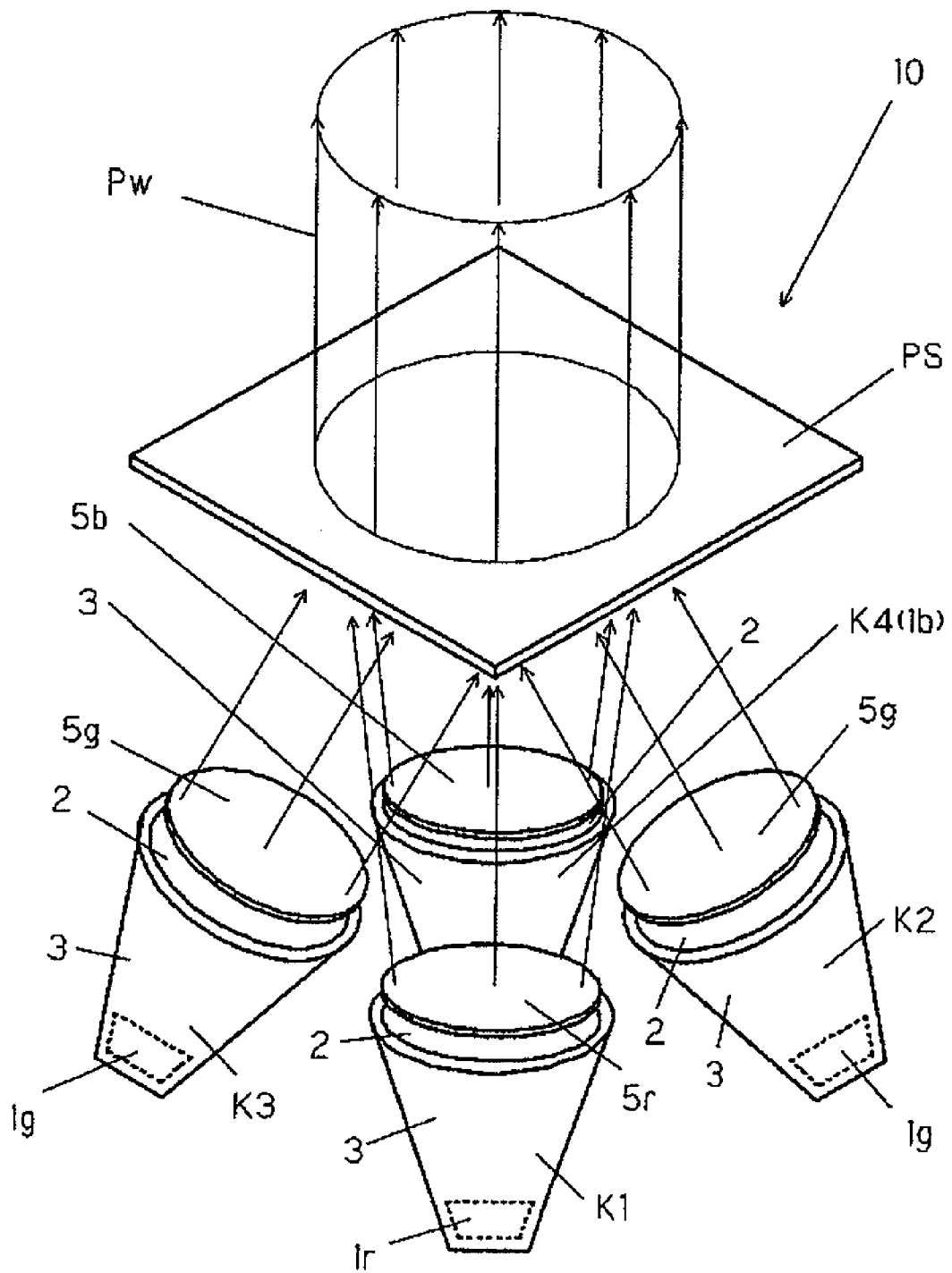
FIG. 28 is a perspective view of a light source apparatus according to a ninth embodiment of the present invention.
Figure 29:
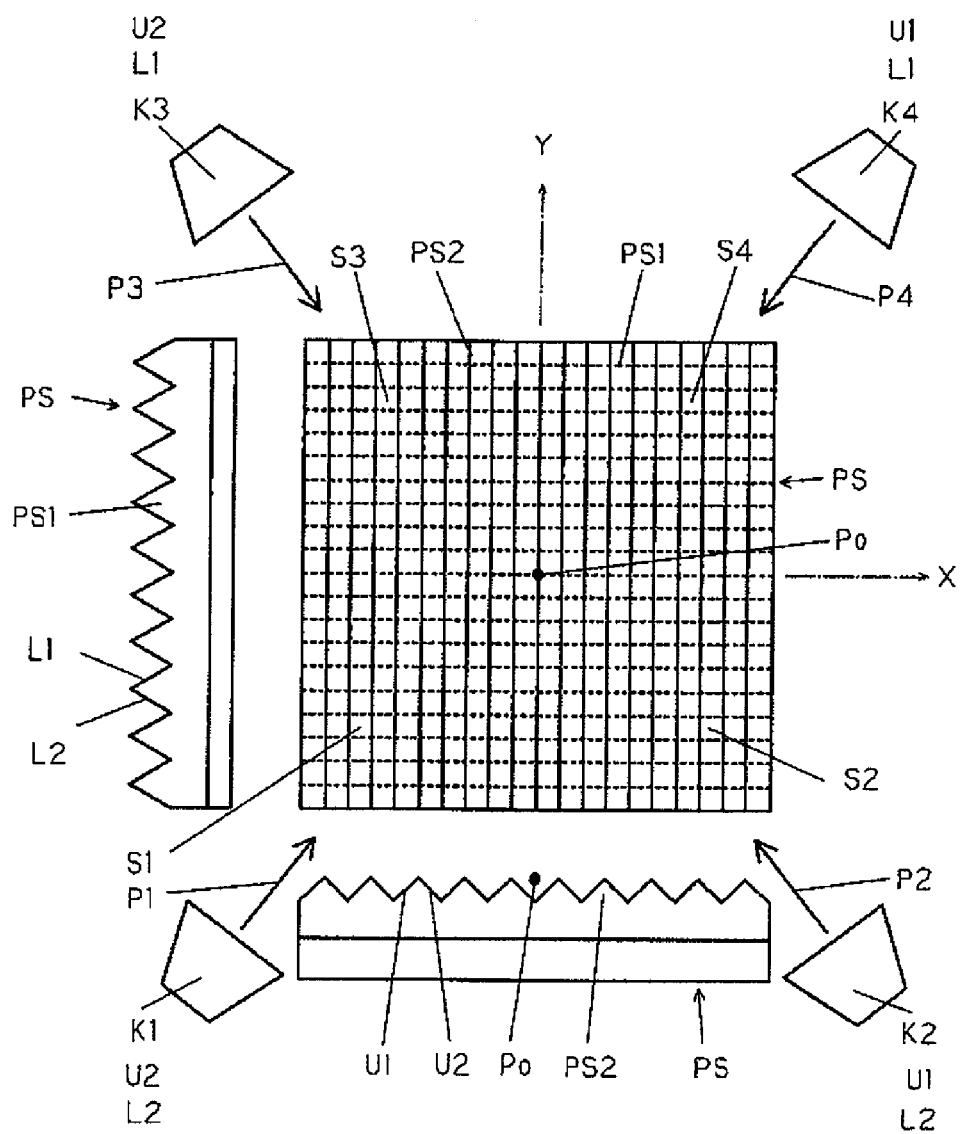
FIG. 29 is a diagram including top and side views showing the arrangement of a prism sheet in FIG. 28.
Figure 30:
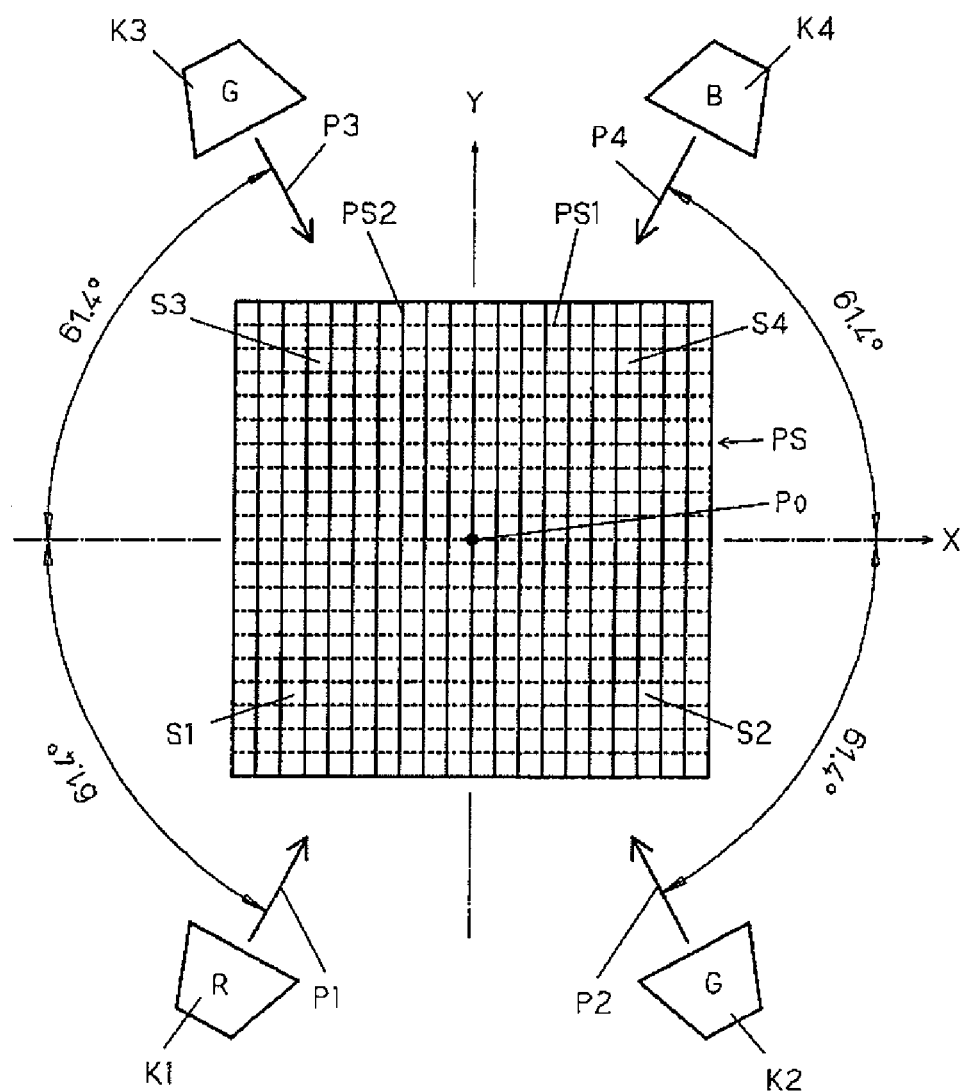
FIG. 30 is a plan view showing the relationship between the prism sheet and a plurality of light sources in FIG. 29.

One embodiment of the light source apparatus according to the present invention will be explained below with reference to the accompanying drawings. FIGS. 28 to 41 show a light source apparatus according to a ninth embodiment of the present invention. FIG. 28 is a perspective view of the light source apparatus. FIG. 29 is a diagram including top and side views showing the arrangement of a prism sheet. FIG. 30 is a plan view showing the relationship between the prism sheet and a plurality of light sources.

As shown in FIG. 28, a light source apparatus 10 of this embodiment includes a prism sheet PS and light sources K1, K2, K3 and K4 disposed at the light entrance surface side of the prism sheet PS at a tilt of a predetermined angle. Light emitted from the light sources K1, K2, K3 and K4 enters the prism sheet PS through the light entrance surface and exits from the exit surface thereof to enter a liquid crystal display element (not shown).

The light sources K1, K2, K3 and K4 comprise light-emitting diodes (hereinafter referred to as "LEDs") 1 emitting different colors of light, condenser lenses 2 collecting light from the light sources K1, K2, K3 and K4, and casings 3 housing the respectively associated LEDs 1 and condenser lenses 2. The light source K1 is provided with a red LED 1r (hereinafter referred to as "R LED"). The light sources K2 and K3 are each provided with a green LED 1g (hereinafter referred to as "G LED"). The light source K4 is provided with a blue LED 1b (hereinafter referred to as "B LED").

Next, the positional relationship between the prism sheet PS and the four light sources K1, K2, K3 and K4 will be explained with reference to FIGS. 29 and 30. F*ig*. 29 is a diagram including top and side views showing the arrangement of the prism sheet PS. FIG. 29 shows a top view of the prism sheet PS in the center thereof, a side view of the prism sheet PS as seen from an X axis direction on the left side thereof, and a side view of the prism sheet PS as seen from a Y axis direction on the lower side thereof. FIG. 30 shows the positional relationship of the four light sources K1, K2, K3 and K4 to the top view of the prism sheet PS shown in FIG. 29.

As shown in FIG. 29, the prism sheet PS has mutually parallel fine elongated prisms on each of the upper and lower surfaces thereof. The prisms on each surface of the prism sheet PS are aligned to form prism rows. The prisms on the upper and lower surfaces are formed such that the length directions of the prisms intersect each other (i.e. the alignment directions of the prism rows intersect each other). In this embodiment, the prism rows of aligned prisms formed on the lower surface are denoted by PS1, and the prism rows of aligned prisms formed on the upper surface are denoted by PS2. In this embodiment, the prism rows PS1 have a prism apex angle of 60°, and the prism rows PS2 have a prism apex angle of 90°. The surface where the prism rows PS1 are formed is a light entrance surface, and the surface where the prism rows PS2 are formed is an exit surface. The prisms on each surface are formed with their ridges extending parallel to each other. The pitch of the prisms on each surface is 1 μm to 100 μm. The prism sheet PS is formed by using an acrylic resin (PMMA) having a refractive index n of 1.49.

In the prism sheet PS, the angle of intersection of the prisms on the upper and lower surfaces (i.e. the angle of intersection of the alignment directions of the prism rows) is 90°. The angle of intersection is determined by the constituent material, configuration and so forth of the prism sheet. In FIG. 29, an axis parallel to the length direction of the prisms of the prism rows PS1 (i.e. the prism alignment direction of the prism rows PS2) is defined as an X axis, and an axis parallel to the length direction of the prisms of the prism rows PS2 (i.e. the prism alignment direction of the prism rows PS1) is defined as a Y axis. It should be noted that the dashed lines parallel to the X axis show the lines of peaks and valleys of the prisms of the lower prism rows PS1, and the solid lines parallel to the Y axis show the lines of peaks and valleys of the prisms of the upper prism rows PS2. The dashed lines and the solid lines form orthogonal cells. It should be noted that an axis perpendicular to the X-Y plane is defined as a Z axis, although not shown. The X axis and the Y axis are axes passing through the center point of the prism sheet, which are center lines parallel to the alignment directions of the prism rows PS1 and PS2.

The positional relationship between the prism sheet PS and the four light sources K1, K2, K3 and K4 will be explained below with reference to FIGS. 29 and 30. The four light sources K1, K2, K3 and K4 are disposed in four zones divided by intersection of the prism rows on the upper and lower surfaces of the prism sheet PS, i.e. four zones S1, S2, S3 and S4 defined by dividing the plane of the prism sheet PS by two axes passing through the center point of the sheet, i.e. the X axis, which is the center line of the prism rows PS1, and the Y axis, which is the center line of the prism rows PS2. Accordingly, incident light P1, P2, P3 and P4 emitted from the light source K1, K2, K3 and K4, respectively, are convergently applied such that the center axes of the incident light P1, P2, P3 and P4 are directed to a predetermined converging point Po at the prism sheet PS. In this embodiment, the predetermined converging point Po at the prism sheet PS is the center point on the upper side of the prism sheet PS.

Consequently, the positional relationship between the light sources is as follows. As shown in FIG. 30, the light source K1 and the light source K4 are positioned in point symmetry with respect to the converging point Po, and so are the light source K2 and the light source K3. The light source K1 and the light source K3 are positioned in line symmetry with respect to the X axis that passes through the converging point Po, and so are the light source K2 and the light source K4. The angle of each of the light sources K1, K2, K3 and K4 from the X axis is the same. This angle is determined by the refractive index of the constituent material of the prism sheet PS, the prism apex angle, etc. In this embodiment, the light sources K, K2, K3 and K4 are all positioned at the same angle of 61.4° from the X axis as seen in the X-Y plane. The reason for this is as follows. The prism angle has plus and minus values, and hence there are four different directions of lights depending on the surfaces on which the lights impinge. In this embodiment, however, the prisms are formed such that the alignment directions of the prism rows on the upper and lower surfaces intersect each other at right angles. Therefore, the four directions are the same from the viewpoint of the angle relative to the normal to each surface. In other words, although the directions of lights differ from each other, the incidence angles are the same. To allow exiting light to be emitted directly upward under the conditions that the refractive index n of the prism sheet PS is 1.49 and that the upper prism apex angle is 90° and further that the lower prism apex angle is 60°, the incidence directions of the incident light P1, P2, P3 and P4 are at the same angle of ±61.4° with respect to the X axis as seen in the X-Y plane. For the same reason, the light sources K1, K2, K3 and K4 are all positioned at the same angle of 63.1° from the Z axis.

Next, the bandpass mirror 5, which is a characteristic feature of the present invention, will be explained with reference to FIG. 28. The bandpass mirror 5 is disposed between each of the light sources K1, K2, K3 and K4 and the prism sheet PS. The bandpass mirror 5 transmits light in a wavelength region emitted from the LED of the associated light source and reflects light in the other wavelength regions. A bandpass mirror 5r is disposed in front of the light-emitting surface of the light source K1. The bandpass mirror 5r transmits the wavelength region of red light (hereinafter referred to as "R light") emitted from the associated R LED 1r and reflects light in the other wavelength regions. Bandpass mirrors 5g are disposed in front of the respective light-emitting surfaces of the light sources K2 and K3. The bandpass mirrors 5g each transmit the wavelength region of green light (hereinafter referred to as "G light") emitted from the associated G LED 1g and reflect light in the other wavelength regions. A bandpass mirror 5b is disposed in front of the light-emitting surface of the light source K4. The bandpass mirror 5b transmits the wavelength region of blue light (hereinafter referred to as "B light") emitted from the associated B LED 1b and reflects light in the other wavelength regions. It should be noted that the bandpass mirror 5 may be implemented by forming a reflection coating on the exit surface of the condenser lens 2 of each light source.

Incidence conditions of light applied from each light source to the prism sheet PS in the present invention will be detailed later. The basic light-combining (color mixing) operation will be explained below with reference to FIG. 29. In the following explanation, one prism inclined surface constituting the prism surface of the prism rows PS1 is denoted by L1, and the other prism inclined surface by L2. One prism inclined surface constituting the prism surface of the prism rows PS2 is denoted by U1, and the other prism inclined surface by U2.

Incident light from each light source positioned as stated above is obliquely applied to the prism sheet PS. That is, the light source apparatus 10 makes incident light from each light source obliquely enter the prism surface and uses the prism surface diagonally, thereby allowing incident light applied from four different directions to be emitted with refraction under the same conditions. As shown in FIG. 29, incident light P1 emitted from the light source K1 passes through the prism inclined surfaces L2 of the prism rows PS1 and the prism inclined surfaces U2 of the prism rows PS2 to become exiting light. Similarly, incident light P2 emitted from the light source K2 passes through the prism inclined surfaces L2 of the prism rows PS1 and the prism inclined surfaces U1 of the prism rows PS2 to become exiting light. Incident light P3 emitted from the light source K3 passes through the prism inclined surfaces L1 of the prism rows PS1 and the prism inclined surfaces U2 of the prism rows PS2 to become exiting light. Incident light P4 emitted from the light source K4 passes through the prism inclined surfaces L1 of the prism rows PS1 and the prism inclined surfaces U1 of the prism rows PS2 to become exiting light.

Incident light with a wide sectional area that is emitted from each light source enters the prism sheet PS through the inclined surfaces of a multiplicity of prisms formed on the prism sheet PS and is finally emitted from the prism sheet PS with refraction. In this regard, because the prism pitch is as fine as 1 μm to 100 μm, the light P1, P2, P3 and P4 as emitted from the prism sheet PS are not visually recognized as discrete exiting light but as combined single exiting light.

Accordingly, if the light source K1 emits R light and the light source K4 emits B light and further the light sources K2 and K3 emit G light, then the R light, B light and G light are mixed together, and white light Pw is emitted as exiting light.

Figure 31:
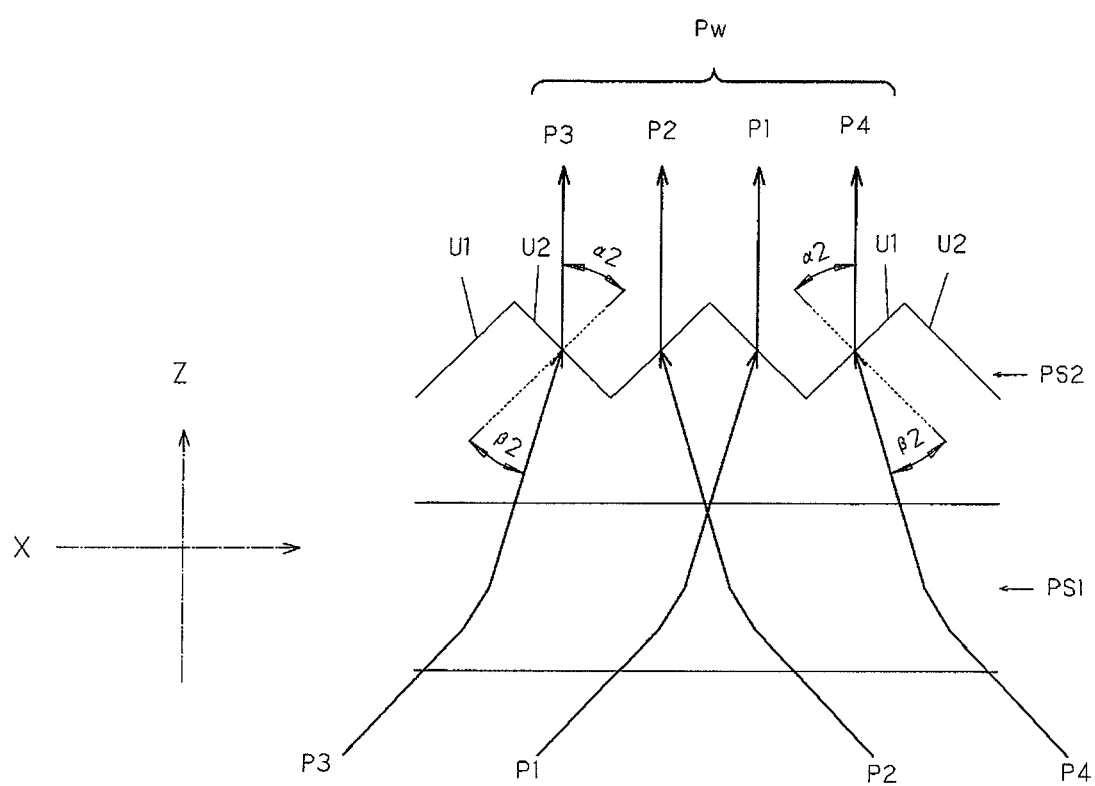
FIG. 31 is an enlarged view of a part of prism rows PS2 shown in FIG. 29, which are formed from aligned prisms.
Figure 32:
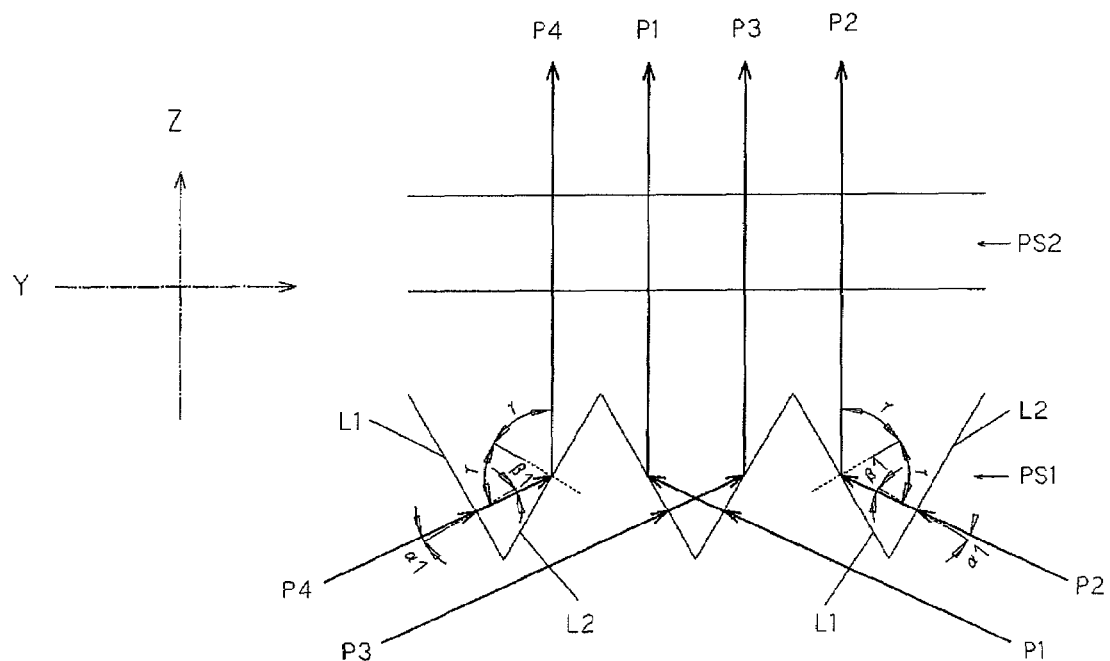
FIG. 32 is an enlarged view of a part of prism rows PS1 shown in FIG. 29, which are formed from aligned prisms.

Next, the optical path of incident light from each light source that is applied to the prism sheet PS will be explained in detail with reference to FIGS. 31 and 32. FIG. 31 is an enlarged view of a part of the prism rows PS2 shown in FIG. 29, illustrating the optical path of each incident light passing through the prism rows PS2 while being refracted. FIG. 32 is an enlarged view of a part of the prism rows PS1 shown in FIG. 29, illustrating the optical path of each incident light passing through the prism rows PS1 while being refracted.

To obtain an optical path through a prism, the following method is generally used: In a case where incident light is made to enter a single prism sheet from the light entrance surface side thereof to obtain exiting light emitted directly upward from the prism sheet, light is traced backward to obtain the optical path. For example, in the case of the prism sheet PS shown in FIG. 31, color-mixed white light Pw needs to be emitted directly upward as exiting light. Therefore, exiting light from each light source is made to enter the prism sheet PS from directly above to trace the backward. At this time, the incident light travels through the prism sheet PS after being given a predetermined angle of refraction according to Snell's law at the interface between the air and the acrylic resin due to the difference in refractive index therebetween. When exiting into the air from the light entrance surface of the prism sheet PS, the light is also given a predetermined refraction angle according to Snell's law at the interface between the acrylic resin and the air.

To use the prism sheet PS in an actual light source apparatus, incident light from each light source enters the prism sheet PS through the light entrance surface of the prism sheet PS at an angle equal to the angle of light exiting into the air from the prism sheet light entrance surface in the above-described backward ray tracing. If light enters the prism sheet PS through the light entrance surface of the prism sheet PS at this angle, the incident light travels through the prism sheet PS at a predetermined angle of refraction similar to the above. Therefore, it is possible to obtain exiting light emitted directly upward from the exit surface of the prism sheet PS.

When the above-described optical path obtaining method is applied, light entering the entrance surface of the prism sheet PS from each light source of the light source apparatus 10 passes along an optical path as shown in FIGS. 31 and 32.

In the case of the upper prism rows PS2 shown in FIG. 31, the X-Z plane is shown. Incident light P1 from the light source K1 and incident light P3 from the light source K3, which are shown in FIG. 29, pass through the right prism inclined surfaces U2 of the prism rows PS2 and exit directly upward. Incident light P2 from the light source K2 and incident light P4 from the light source K4 pass through the left prism inclined surfaces U1 of the prism rows PS2 and exit directly upward. Thus, the direction of incidence of the incident light P1 and P3 on the prism rows PS2 is rightward oblique, and the incidence direction of the incident light P2 and P4 is leftward oblique. That is, the incidence directions of the incident light P1 and P3 and the incident light P2 and P4 are opposite to each other. However, the travel angles of these incident light are the same.

At this time, the angles β2 and α2 of all incident light P1, P2, P3 and P4 relative to the normal (shown by the dashed lines) to the interfaces of the prism inclined surfaces of the prism rows PS2 are the same, respectively. For the prism rows PS2 of aligned prisms that are formed from an acrylic resin having a refractive index of 1.49 and that have a prism apex angle of 90°, the above-described angles are as follows: β2=28.3°, and α2=45.0°.

In the case of the lower prism rows PS1 shown in FIG. 32, the Y-Z plane is shown. The incident light P1, P2, P3 and P4 enter the prism rows PS1 by being refractively transmitted through the light entrance prism inclined surfaces and are totally reflected by the prism inclined surfaces inclined oppositely to the light entrance prism inclined surfaces to travel through the prism sheet PS. The angles α1, β1 and γ of all incident light P1, P2, P3 and P4 relative to the normal (shown by the dashed lines) to the interfaces of the prism rows PS1 are the same, respectively. For the prism rows PS1 of aligned prisms that are formed from an acrylic resin having a refractive index of 1.49 and that have a prism apex angle of 60°, the above-described angles are as follows: α1=25.3°; β1=16.7°; and γ=61.4°. Although the exiting light P1 to P4 from the prism rows PS1 in FIG. 32 are shown to be emitted directly upward for the sake of drawing, it should be noted that these exiting light have an angle of inclination relative to a direction perpendicular to the plane of FIG. 32. That is, the direction of inclination is invisible in FIG. 32, which shows the Y-Z plane. In actuality, the exiting light P1 and P3 have an angle of inclination to the back of the plane of FIG. 32, and the exiting light P2 and P4 have an angle of inclination to the front of the plane of FIG. 32. In FIG. 32, the angles α1 and β1 are shown to be small angles, but in actuality, these angles have an angle of inclination relative to a direction perpendicular to the plane of FIG. 32.

Figure 33:
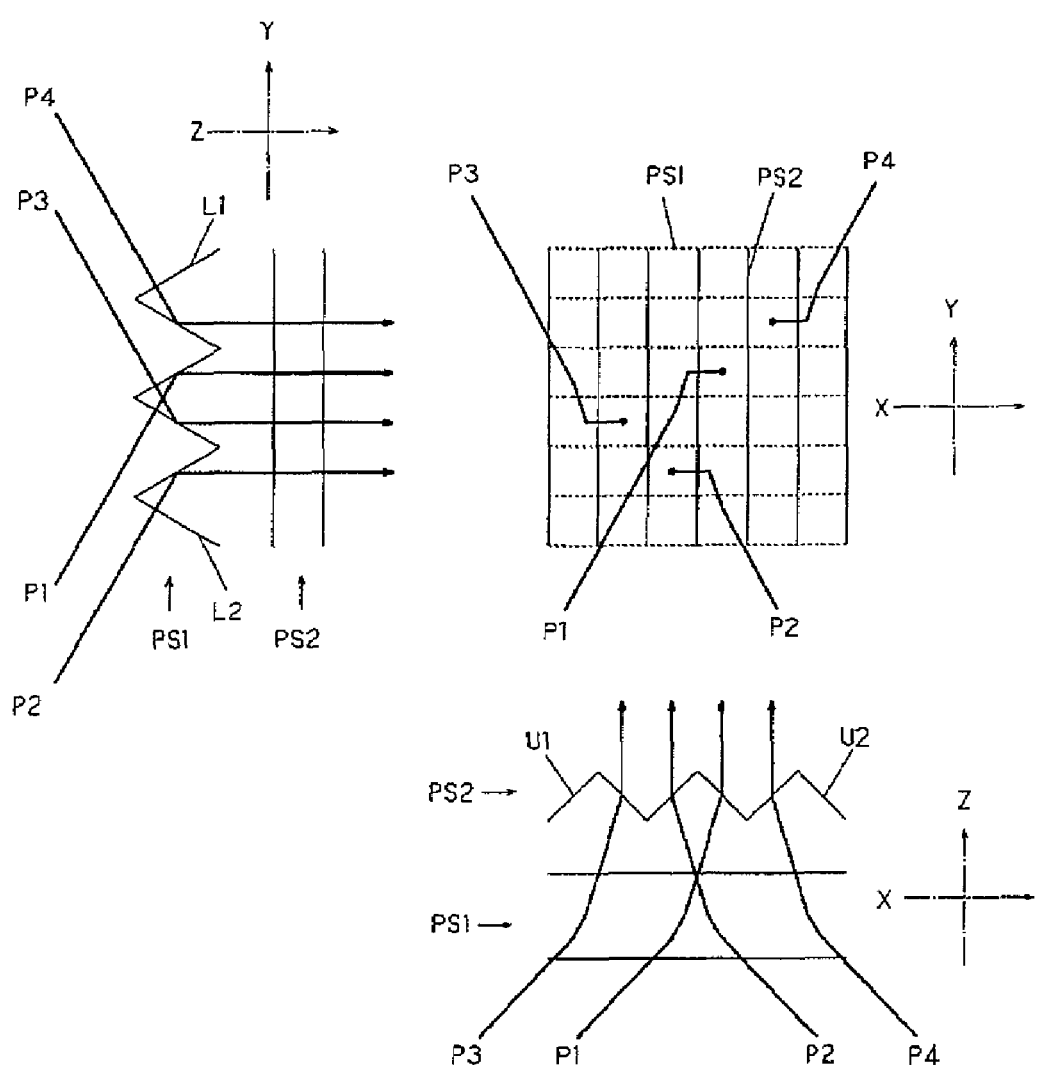
FIG. 33 is a diagram including top and side views showing optical paths along which incident light passes through prism sheets shown in FIG. 29.

FIG. 33 is a diagram including top and side views showing optical paths along which incident light passes through the prism sheet PS. FIG. 33 shows a top view of the prism sheet PS in the center thereof, a side view of the prism sheet PS as seen from the X axis direction, shown in FIG. 32, on the left side thereof, and a side view of the prism sheet PS as seen from the Y axis direction, shown in FIG. 31, on the lower side thereof. The solid and dashed lines in the top view of the prism sheet PS show the lines of peaks and valleys of the prisms of the prism rows, respectively, in the same way as in FIG. 29. It will be seen from FIG. 33 that light directed directly upward is only light exiting the prism rows PS2, and it will be possible to understand from the top view and the side views from different directions the inclination and traveling directions of the light that cannot be shown in FIG. 32 because they have an angle of inclination relative to a direction perpendicular to the plane of FIG. 32. That is, the directions of inclination of the incident light P1, P2, P3 and P4 are different from each other, but the angles of inclination thereof are the same, i.e. 63.1° relative to the Z axis, and 61.4° relative to the X axis in the X-Y plane. This angle of inclination is 25.3° with respect to the normal to the interface of each prism inclined surface of the prism rows PS1. Thus, the incident light P1 to P4 obliquely enter the prism sheet PS. The angles of the incident light P1 to P4 relative to the normal to the prism interfaces are as stated above. The incident light P1 to P4 are transmitted through the prism rows PS2 and emitted directly upward from the upper surface of the prism sheet PS. It should be noted that FIGS. 31 to 33 show the way in which the incident light P1 to P4 pass through different prism inclined surfaces and exit directly upward for the sake of easy understanding. In actuality, the incident light P1 to P4 also pass through the same prism inclined surfaces simultaneously and are combined together.

Figure 34:
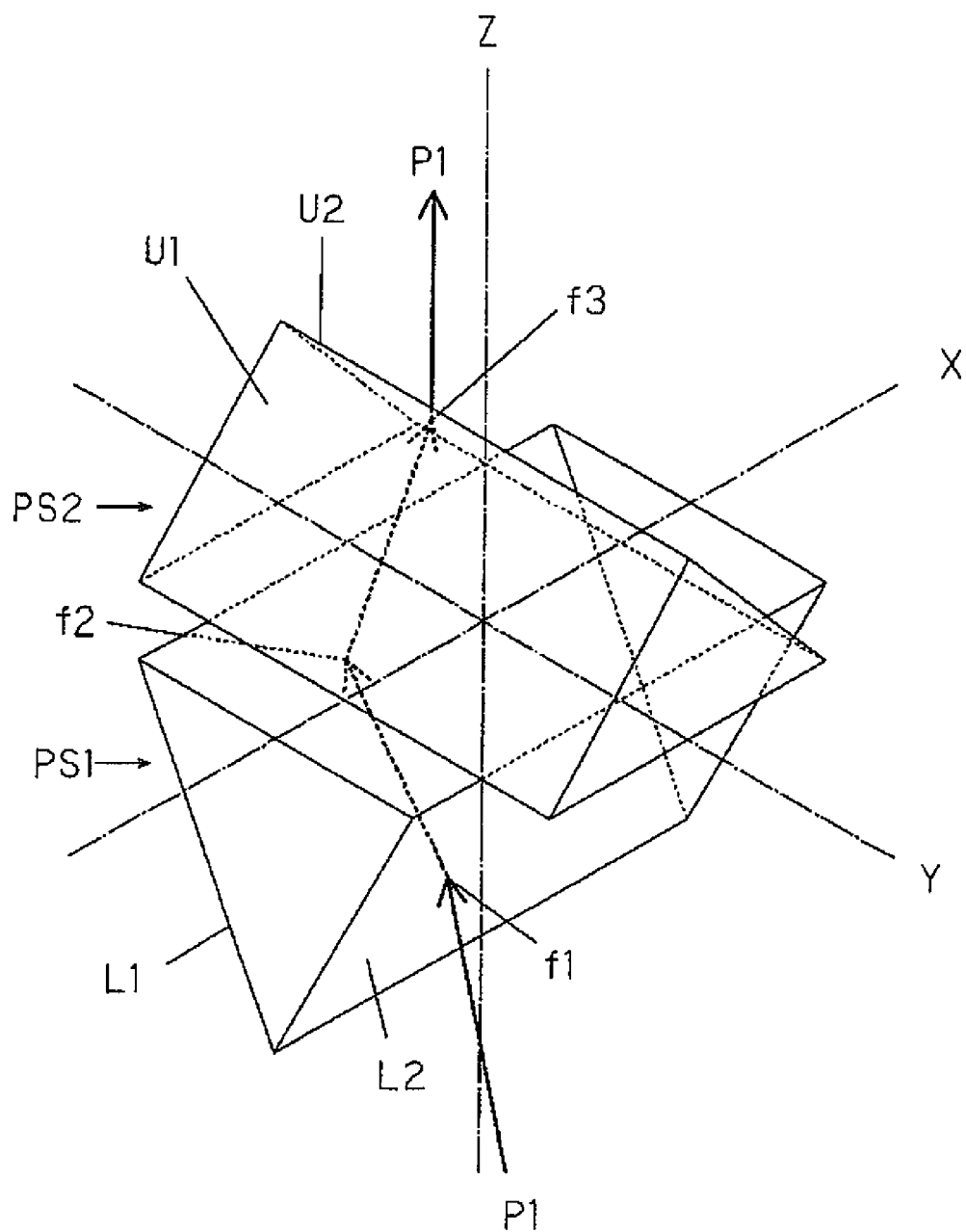
FIG. 34 is a perspective view schematically showing an optical path along which incident light passes through the prism sheets shown in FIG. 29.

FIG. 34 is a perspective view schematically showing an optical path along which incident light passes successively through the two prism rows PS1 and PS2. In FIG. 34, only incident light P1 is shown as a representative example. Incident light P1 is applied to the prism row PS1 from the lower side of the two prism rows PS1 and PS2 at an angle of 63.1° relative to the Z axis and 61.4° relative to the X axis in the X-Y plane. The light P1 enters the prism sheet PS1 through the prism inclined surface L2 of the prism row PS1 at an inclination of 25.3° from the normal to the interface (f1). The light is refracted and travels through the prism sheet PS toward the prism inclined surface L1 at an inclination of 16.7° from the normal to the interface. The light reaching the prism inclined surface L1 is at an angle of 61.4° from the normal to the interface of the prism inclined surface L1. Thus, the light reaches the interface at an angle greater than the critical angle and is therefore totally reflected (f2). The totally reflected light travels through the prism sheet PS toward the prism row PS2 at an inclination of 61.4° from the normal to the interface, which is the same as that when reaching the interface, and reaches the prism inclined surface U2 of the prism row PS2 at an inclination of 28.3° from the normal to the interface (f3). The light is refracted and emitted into the air at an inclination of 45.0° from the normal to the interface, i.e. in a direction parallel to the Z axis and directly upward relative to the X-Y plane. Similarly, incident light P2, P3 and P4 (not shown in FIG. 34) travel and exit along the optical paths shown in FIGS. 31 to 33.

Thus, the light source apparatus 10 uses a prism sheet having prism rows of aligned prisms formed on both surfaces thereof such that the alignment directions of the prism rows intersect each other, and incident light enters the prism sheet from an oblique direction having an angle relative to the X-Y plane direction and an angle relative to the Z axis direction, thereby using the prism inclined surfaces diagonally. As a result, incident light from four different directions can be made to enter the prism sheet simultaneously under the same optical conditions to combine them together. Thus, R light, G light and B light are combined together into single white light Pw, which is then emitted directly upward from the exit surface of the prism sheet PS.

Figure 35:
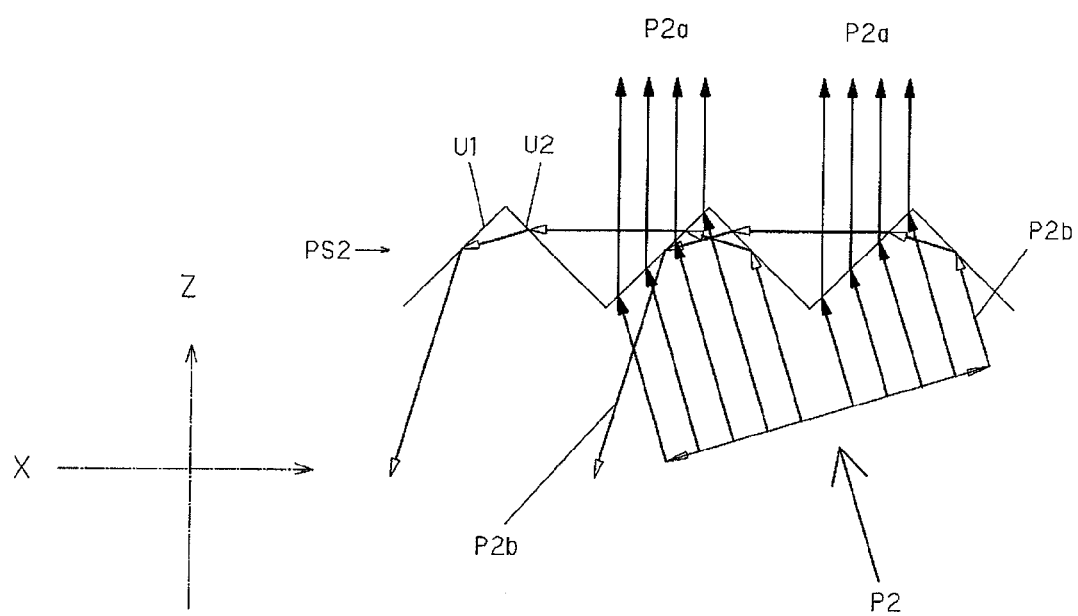
FIG. 35 is an enlarged view of a part of the prism rows PS2 in FIG. 29 formed from aligned prisms, showing effective light and non-effective light.

In the light source apparatus 10, lights enter the prism sheet from each light source. In this regard, there are effective light that are allowed to exit to the exit surface side of the prism sheet and ineffective light that are not allowed to exit to the prism sheet exit surface side. The reason why the ineffective light occur will be explained below with reference to FIG. 35. FIG. 35 is a fragmentary sectional view of the upper prism rows PS2, showing a state where incident light P2 from the light source K2 in FIG. 29 enters the prism sheet PS through the prism rows PS2 of the prism sheet PS, by way of example. As shown in FIG. 35, the incident light P2 from the light source K2 is leftward oblique incident light, and light entering the prism sheet PS2 through the leftwardly downwardly inclined prism inclined surfaces U1 of the prism rows PS2 are allowed to exit as effective light. Accordingly, the prism inclined surfaces U1 are effective prism inclined surfaces, and the rightwardly downwardly inclined prism inclined surfaces U2 are non-effective prism inclined surfaces.

On the above-described assumption, when incident light P2 from the light source K2 having a certain width enters the prism sheet PS from the light entrance surface side thereof, the greater part of light (shown by the black arrows) of the incident light P2 pass through the prism inclined surfaces U1, which are effective prism inclined surfaces, and exit as effective light P2a. However, some light (shown by the white arrows) of the incident light P2 impinge on and are reflected by the prism inclined surfaces U2, which are non-effective prism inclined surfaces. After traveling through the prisms, the reflected light exit through the prism inclined surfaces U1 with refraction and travel through the air. Thereafter, the light impinges on and is refracted by the prism inclined surfaces U2 of the next prisms. After traveling through the prisms again, the light impinges on and are reflected by the prism inclined surfaces U1 to the light entrance surface side of the prism sheet PS as non-effective light P2b.

More specifically, the light of effective light, which is shown by the black arrows, impinges on the prism inclined surfaces U1 at an angle smaller than the critical angle and is therefore transmitted therethrough with refraction. On the other hand, the light of non-effective light, which is shown by the white arrows, impinges on the prism inclined surfaces U2 at an angle not smaller than the critical angle and is therefore reflected thereby. Thereafter, the light of non-effective light reflected by the prism inclined surfaces U2 is transmitted or reflected according to whether or not the incident angle is smaller than the critical angle. Eventually, the light of non-effective light is directed to travel in a direction opposite to the direction of incidence. In the case of the prism sheet PS in this embodiment, the optical path of non-effective light has the same angle to the lower surface of the prism sheet PS when the light firstly enters and emerges from it. That is, the angle of incidence and the angle of emergence are the same.

Figure 36:
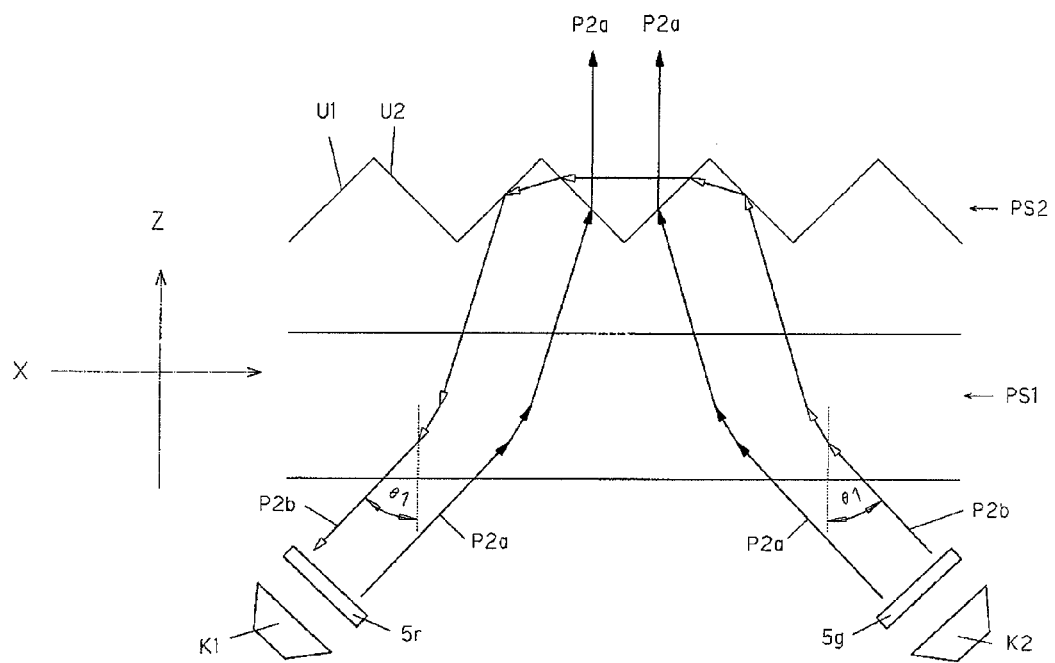
FIG. 36 is an enlarged view of a part of the prism sheets in FIG. 29, showing effective light and non-effective light.

Next, the principle of converting the non-effective light into effective light will be explained with reference to FIG. 36. FIG. 36 is a fragmentary sectional view of a prism sheet and light sources, showing an arrangement for converting a non-effective light component of light emitted from the light source K2 into effective light by the bandpass mirror $5r$ of the light source K1. The light P2 emitted from the light source K2 includes effective light P2a and non-effective light P2b. The effective light P2a, which is shown by the black arrows, passes through the prism inclined surface U1 of the prism rows PS2 and exits directly upward. The non-effective light P2b, which is shown by the white arrows, enters the prism sheet PS2 through the prism inclined surface U2 and repeatedly reflected and refracted and is finally emitted from the prism sheet PS2 through the lower surface of the prism sheet PS. It should be noted that in FIG. 36 the way in which the light traveling through the prism rows PS1 changes their travel direction twice is shown by the change in direction of the arrows. In the illustration, the light transmitted and reflected as explained above in connection with FIG. 32 is shown as seen from a different direction. In actuality, the light of light emitted from the light source K2 also has an angle of inclination to the back of the plane of FIG. 36, and the light that enters and emerges from the bandpass mirror $5r$ of the light source K1 also have an angle of inclination to the front of the plane of FIG. 36. In FIG. 36, the light source K2 and the light source K1 are disposed in the mutually adjacent zones S2 and S1 of the four zones divided by the X and Y axes as shown in FIG. 30.

Here, attention should be paid to the travel direction and angle of the non-effective light P2b. That is, for the non-effective light P2b, the angle of first incidence on the prism sheet PS from the lower side thereof and the angle of emergence from the prism sheet PS to the lower side thereof are the same although the directions of incidence and emergence are different from each other, as has been explained above in connection with FIG. 35. Consequently, the non-effective light P2b exiting the prism sheet PS from the light entrance surface side thereof impinges on and is reflected by the bandpass mirror $5r$ of the light source K1 disposed at a position adjacent to the light source K2, thereby being converted into effective light P2a. More specifically, the reflected effective light P2a enters the prism sheet PS from the light entrance surface side thereof as rightward oblique incident light and passes through the prism inclined surface U2 of the prism rows PS2 to exit directly upward. The reason why the non-effective light P2b can be converted into effective light P2a is that the angle of first incidence of the non-effective light P2b on the prism sheet PS from the lower side thereof and the angle of emergence of the non-effective light P2b from the prism sheet PS to the lower side thereof are the same.

The reason why the non-effective light P2b converted into the effective light P2a by reflection from the bandpass mirror $5r$ can enters the prism sheet PS2 through the prism inclined surface U2 of the prism rows PS2 is that the size of the bandpass mirror and the distance from the prism surface to the bandpass mirror differ from the prism size to a considerable extent. That is, the pitch of the prisms is as fine as 1 µm to 100 µm, whereas the bandpass mirror size and the distance from the prism surface to the bandpass mirror are 5 mm to 20 mm, i.e. about two digits greater than the prism pitch. Accordingly, light after traveling through a long distance has some fluctuation due to the influence of parallelism, part assembly accuracy, etc. Therefore, the non-effective light P2b converted into the effective light P2a by reflection from the bandpass mirror $5r$ does not accurately return back to the previous position but returns with some fluctuation to the prism inclined surface U2, which provides a wide angle of incidence. As a result, almost all the reflected light passes through the prism inclined surface U2 and exits directly upward. In this way, non-effective light is converted into effective light.

Figure 37:
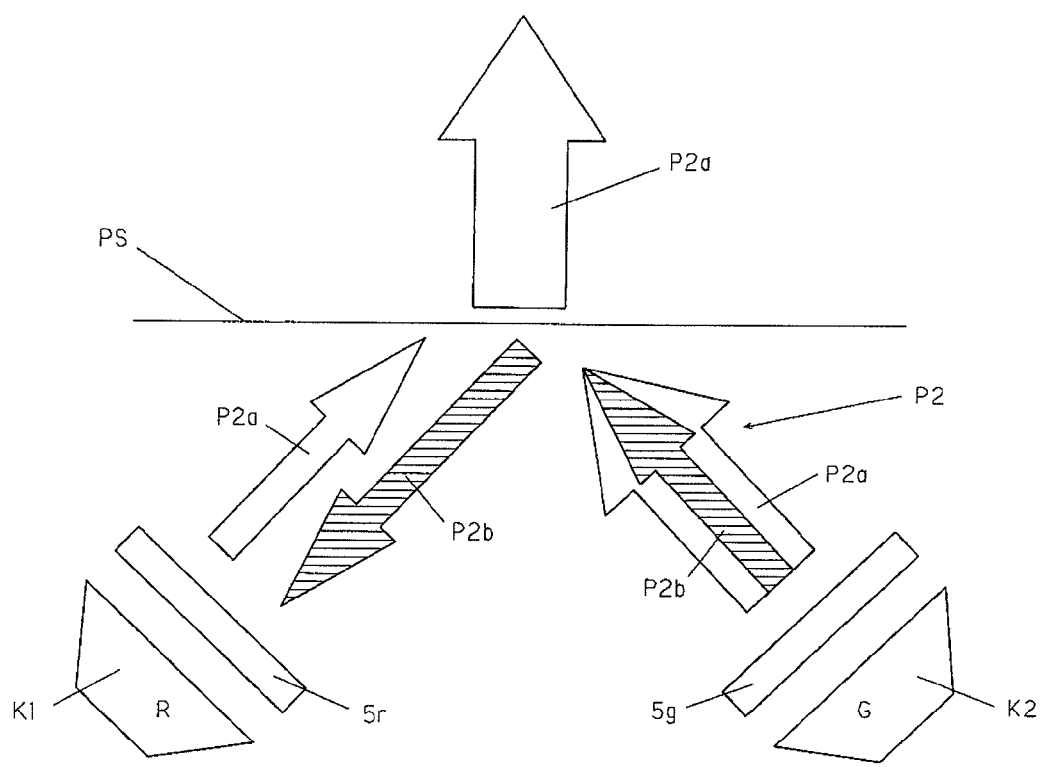
FIG. 37 is a fragmentary sectional view of a prism sheet and light sources, showing an arrangement for converting a non-effective light component of light emitted from a light source K2 into effective light by a bandpass mirror of a light source K1.
Figure 38:
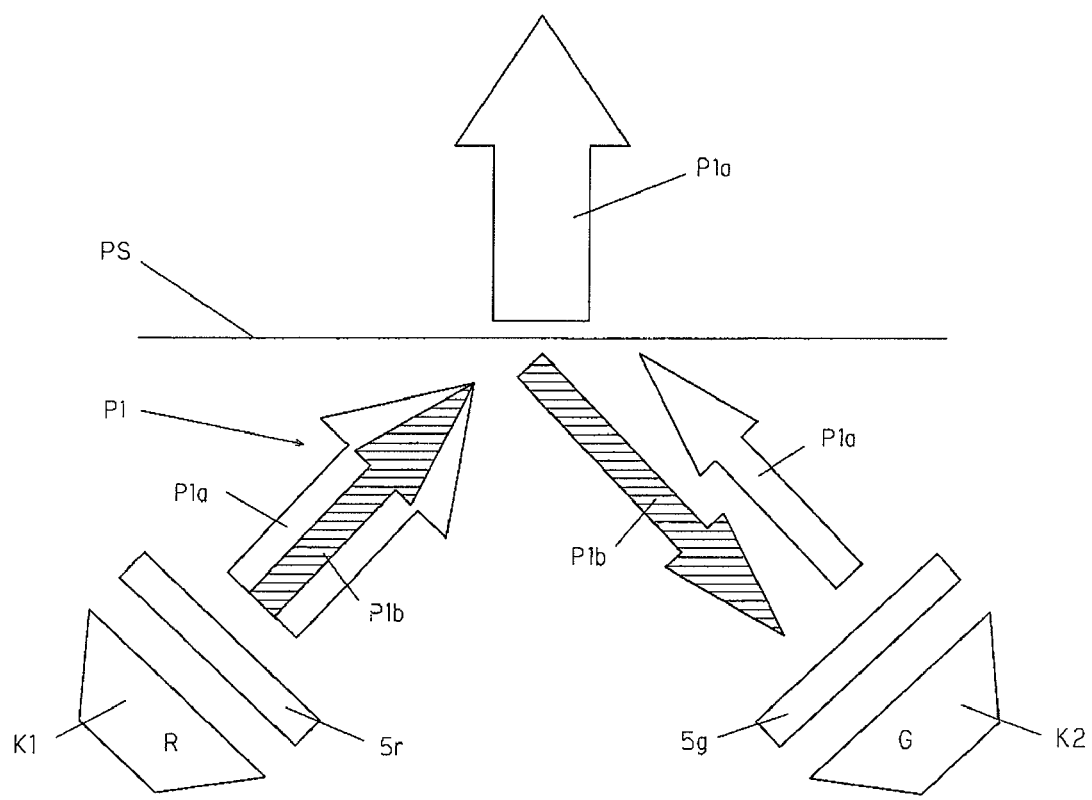
FIG. 38 is a fragmentary sectional view of a prism sheet and light sources, showing an arrangement for converting a non-effective light component of light emitted from the light source K1 into effective light by a bandpass mirror of the light source K2.

Next, the above-described arrangement for converting non-effective light P2b into effective light P2a will be explained with reference to FIGS. 37 and 38. FIG. 37 is a sectional view of a prism sheet and light sources, showing an arrangement for converting the non-effective light component P2b of light P2 emitted from the light source K2 into effective light P2a by the bandpass mirror $5r$ of the light source K1. FIG. 38 is a sectional view of a prism sheet and light sources, showing an arrangement for converting the non-effective light component P1b of light P1 emitted from the light source K1 into effective light P1a by the bandpass mirror $5g$ of the light source K2 [K4]. It should be noted that in FIGS. 37 and 38 the thick arrows represent light having a predetermined sectional area. Effective light is shown by the white arrows and non-effective light by the hatched arrows. In FIG. 37, the light source K2 and the light source K1 are disposed at mutually adjacent positions, as has been stated in connection with FIG. 36. Light P2 emitted from the light source K2 includes effective light P2a and non-effective light P2b. The effective light P2a shown by the white arrow passes through a multiplicity of prism inclined surfaces U1 of the prism sheet PS and exits directly upward. The non-effective light P2b shown by the hatched arrow enters the prism sheet PS2 through a multiplicity of prism inclined surfaces U2 and thereafter repeatedly reflected and refracted and is finally emitted from the prism sheet PS2 through the light entrance surface of the prism sheet PS.

The non-effective light P2b exiting to the lower side through the light entrance surface of the prism sheet PS impinges on and is reflected by the bandpass mirror $5r$ of the light source K1 disposed at a position adjacent to the light source K2, thereby being converted into an effective light P2a. That is, the reflected effective light P2a enters the prism sheet PS from the lower side thereof as rightward oblique incident light and passes through a multiplicity of prism inclined surfaces U2 to exit directly upward.

The role of the bandpass mirror in the above-described converting operation is as follows. The bandpass mirror $5g$ of the light source K2 transmits only light in the wavelength region of G light and reflects light in the other wavelength regions. Therefore, G light P2 emitted from the light source K2 passes through the bandpass mirror 5g and enters the prism sheet PS. The bandpass mirror 5r of the light source K1 transmits only light in the wavelength region of R light and reflects light in the other wavelength regions. Therefore, the G light P2g entering the bandpass mirror 5r from the prism sheet PS is reflected therefrom to reenter the prism sheet PS. That is, each bandpass mirror 5 transmits light emitted from the associated light source and reflects light emitted from the other light sources, thus having the function of converting the non-effective light component of light emitted from the other light sources into effective light.

FIG. 38 is a sectional view of a prism sheet and light sources, showing an arrangement of converting the non-effective light component P1b of light P1 emitted from the light source K1 into effective light P1a by the bandpass mirror 5g of the light source K2. The converting arrangement shown in FIG. 38 is in reverse relation to that shown in FIG. 37. That is, the light P1 emitted from the light source K1 includes effective light P1a and non-effective light P1b. The effective light P1a shown by the white arrow passes through a multiplicity of prism inclined surfaces U2 of the prism sheet PS and exits directly upward. The non-effective light P1b shown by the hatched arrow enters the prism sheet PS through a multiplicity of prism inclined surfaces U1 and thereafter repeatedly reflected and refracted and is finally emitted from the prism sheet PS through the light entrance surface of the prism sheet PS.

The non-effective light P1b exiting to the lower side through the light entrance surface of the prism sheet PS impinges on and is reflected by the bandpass mirror 5g of the light source K2 disposed at a position adjacent to the light source K1, thereby being converted into an effective light P1a. That is, the reflected effective light P1a enters the prism sheet PS from the lower side thereof as leftward oblique incident light and passes through a multiplicity of prism inclined surfaces U1 to exit directly upward.

The role of the bandpass mirror in the above-described converting operation is as follows. The bandpass mirror 5r of the light source K1 transmits only light in the wavelength region of R light and reflects light in the other wavelength regions. Therefore, R light P1 emitted from the light source K1 passes through the bandpass mirror 5r and enters the prism sheet PS. The bandpass mirror 5g of the light source K2 transmits only light in the wavelength region of G light and reflects light in the other wavelength regions. Therefore, the R light P1b entering on the bandpass mirror 5g from the prism sheet PS is reflected therefrom to reenter the prism sheet PS.

In other words, the light source K2 and the light source K1 performs a function of converting each other's non-effective light into effective light by their respective bandpass mirrors. The converting operations of the two light sources are simultaneously performed. The light source K4 and the light source K3, which are disposed adjacent to each other, also perform a mutually converting function similar to the above. Accordingly, non-effective light from all the light sources is converted into effective light.

Figure 39:
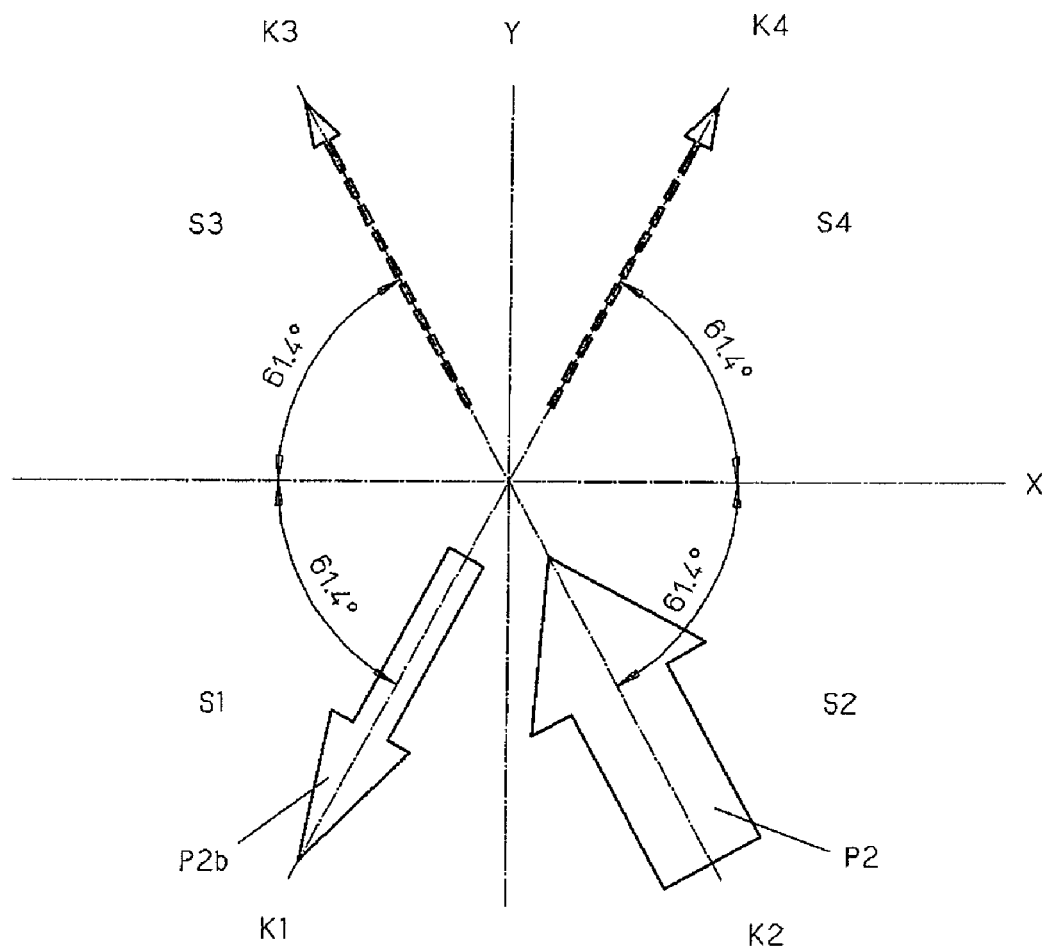
FIG. 39 is a plan view showing, in the X-Y plane, the relationship between incident light from the light source K2 and reflected light from the prism sheet.
Figure 40:
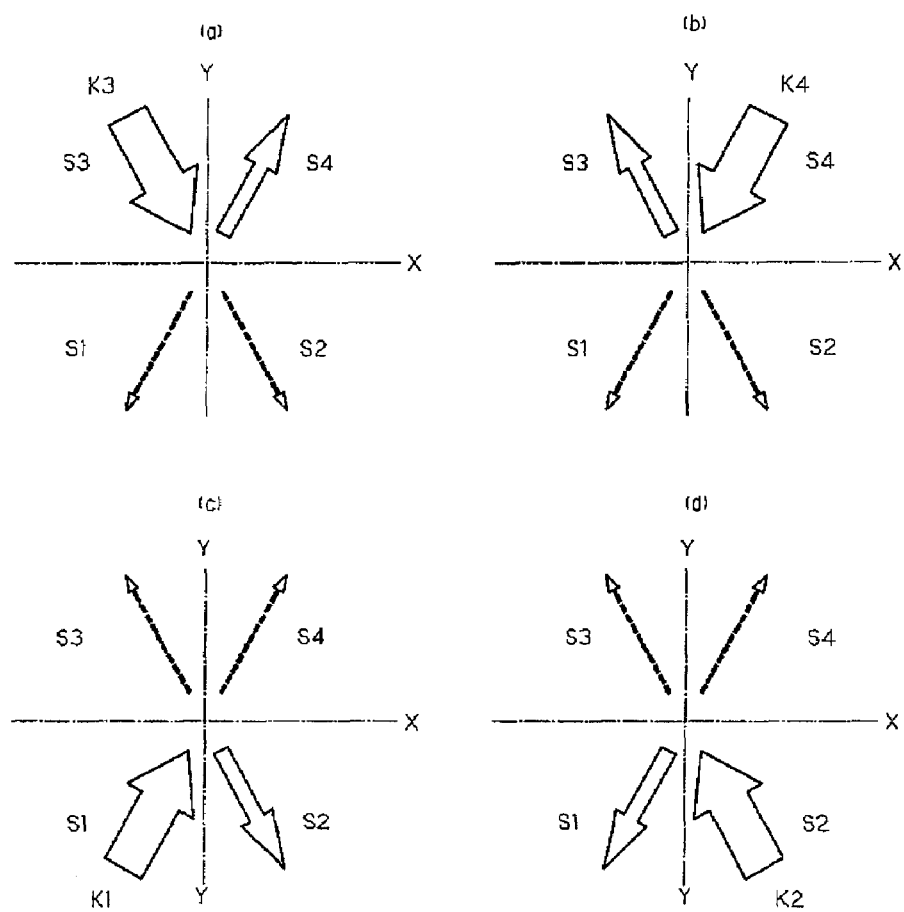
FIGS. 40a, 40b, 40c and 40d are plan views each showing, in the X-Y plane, the relationship between incident light from each light source and reflected light from the prism sheet.

FIG. 39 is a plan view showing, in the X-Y plane, the relationship between incident light from the light source K2 and reflected light from the prism sheet PS, shown in FIG. 37. In FIG. 39, four zones defined relative to the X and Y axes correspond to the positional arrangement of the light sources shown in FIGS. 29 and 30. Reference symbol P2 denotes incident light from the light source K2 in the zone S2. Reference symbol P2b denotes reflected light directed toward the zone S1. In the case of incident light from the light source K2, there is no reflected light directed toward either of the zones S3 and S4. Light of imaginary reflected light directed toward the zones S3 and S4 are shown by the dashed lines. In the X-Y plane, the directions of all light are at the same angle of 61.4° from the X axis. Almost all incident light P2 from the light source K2 is allowed to exit directly upward. A part of the incident light P2 is reflected and refracted by the prism sheet PS toward the zone S1.

The relationship between incident light from the light source K2 in the zone S2 and reflected light from the prism sheet PS similarly applies to light emitted from the light sources K1, K3 and K4 in the zones S1, S3 and S4. FIGS. 40a to 40d are plan views each showing, in the X-Y plane, the relationship between incident light from each light source and reflected light from the prism sheet PS. FIG. 40a shows incident light from the light source K3 in the zone S3. FIG. 40b shows incident light from the light source K4 in the zone S4. FIG. 40c shows incident light from the light source K1 in the zone S1. FIG. 40d shows incident light from the light source K2 in the zone S2. The relationship of reflected light from the prism sheet PS to incident light from each light source is as follows. As has been explained above in connection with FIG. 39, reflected light of incident light from a light source in one zone is directed to a zone adjacent to the zone where the light source is present, and no reflected light is present in the remaining zones. Zones where no reflected light is present in relation to incident light from each zone are as shown in FIGS. 40a to 40d. That is, no reflected light is present in the zones S3 and S4 in relation to incident light from the light sources K1 and K2 in the zones S1 and S2 No reflected light is present in the zones S1 and S2 in relation to incident light from the light sources K3 and K4 in the zones S3 and S4.

Figure 41:
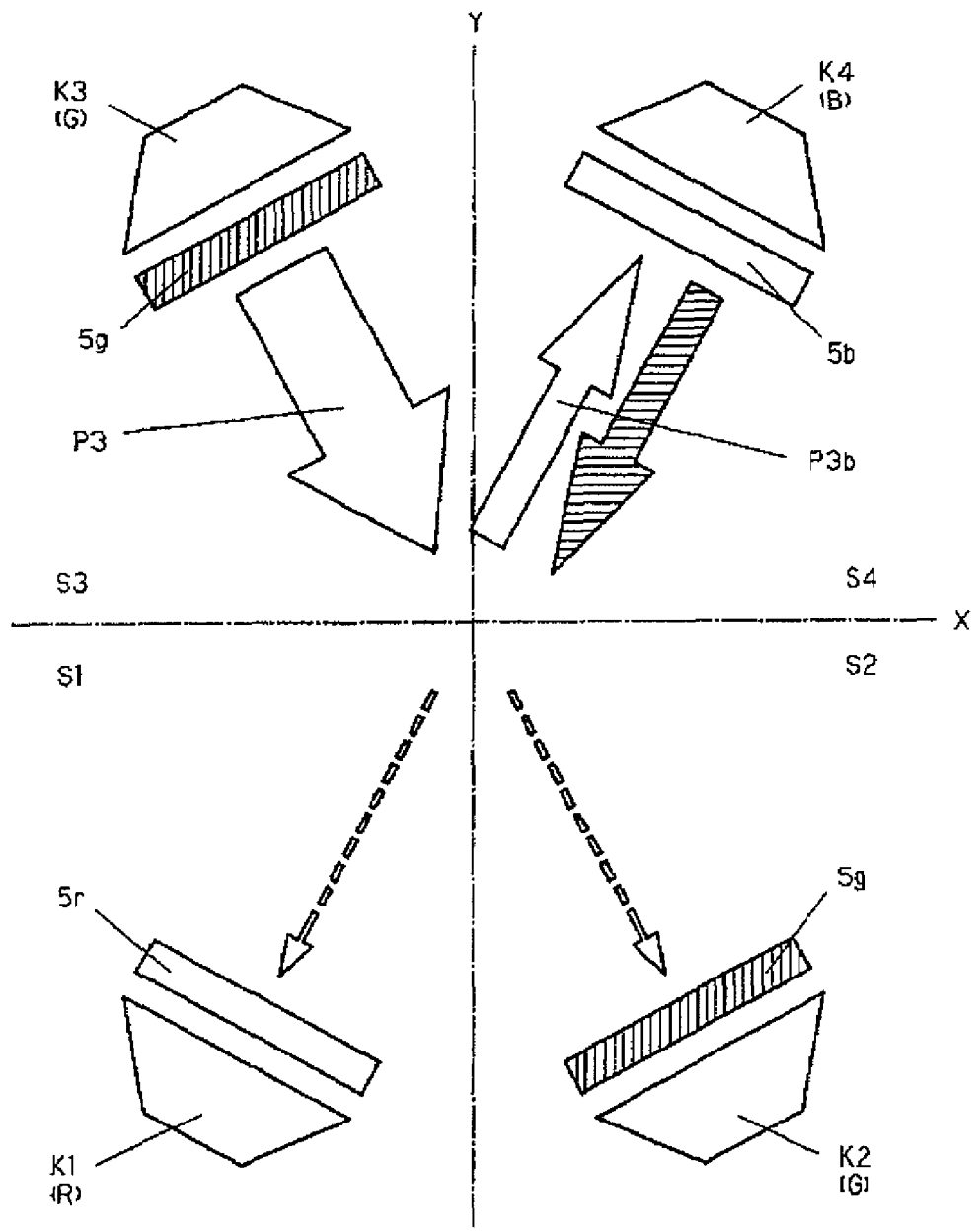
FIG. 41 is a plan view showing, in the X-Y plane, the relationship between incident light from a light source K3 and reflected light from the prism sheet.

FIG. 41 is a plan view showing, in the X-Y plane, the relationship between incident light from the light source K3 in the light source apparatus 10 of the ninth embodiment, which is shown in FIG. 28, and reflected light from the prism sheet PS. The light source apparatus 10 mixes R, B and G light and emits the resulting color-mixed light. In this regard, G LED emits a small amount of light in comparison to R LED and B LED in the present state of art. Therefore, two G LEDs are used as shown in FIG. 41: R LED in the zone S1; G LED in the zone S2; G LED in the zone S3; and B LED in the zone S4. Regarding the layout position of each LED, the light sources are positioned by taking into account the direction of reflected light shown in FIGS. 40a to 40d, thereby allowing the conversion of non-effective light, i.e. reflected light, into effective light to be realized efficiently. That is, reflected light P3b of incident light P3 emitted from the light source K3 is directed toward the zone S4, where the light source K4 is disposed. Therefore, the reflected light P3b is reflected and thus converted into effective light by the bandpass mirror 5b of the light source K4. The light source K2 provided with the bandpass mirror 5g, which would otherwise transmit reflected light P3b, is disposed in the zone S2 where reflected light of incident light from the light source K3 is not present, thereby increasing the efficiency of converting non-effective light, i.e. reflected light, into effective light.

As will be understood from the above, light sources emitting the same color of light should be disposed in zones where each other's reflected light is not present, i.e. in zones opposing each other with respect to an axis parallel to the prism alignment direction of the prism rows formed on the light entrance surface side of the prism sheet. In this embodiment, the light sources K2 and K3 are provided with G LEDs, respectively, and disposed in the zones S2 and S3, which are zones opposing each other with respect to the X axis, of the four zones divided by the X and Y axes as shown in FIG. 41. That is, to increase the efficiency of converting non-effective light into effective light, light sources emitting the same color of light should be disposed in zones opposing each other with respect to the X axis parallel to the prism alignment direction of the prism rows PS1 formed on the light entrance surface side of the prism sheet. For example, if a light source is disposed in the zone S1 or S2 of the four zones, a light source emitting the same color of light as the first-mentioned light source should be positioned in the zone S3 or S4.

It should be noted that the prism sheet in this embodiment is as follows. The prism rows PS1 have a prism apex angle of 60°, and the prism rows PS2 have a prism apex angle of 90°. The alignment direction of the prism rows PS1 and that of the prism rows PS2 perpendicularly intersect each other. The surface where the prism rows PS1 are formed is a light entrance surface, and the surface where the prism rows PS2 are formed is an exit surface. The ratio of reflected light returned from the prism sheet varies according to the above-described prism sheet conditions, the refractive index of the prism sheet, the prism configuration, and so forth. For example, if the two prism rows on the prism sheet in this embodiment have the same prism apex angle of 60°, the amount of light emitted directly upward increases. Thus, the ratio of reflected light returned from the prism sheet can be reduced. The configuration of the prism sheet should be appropriately set in consideration of the prism sheet processing conditions and the expansion of light in the light source apparatus (described later).

Figure 42:
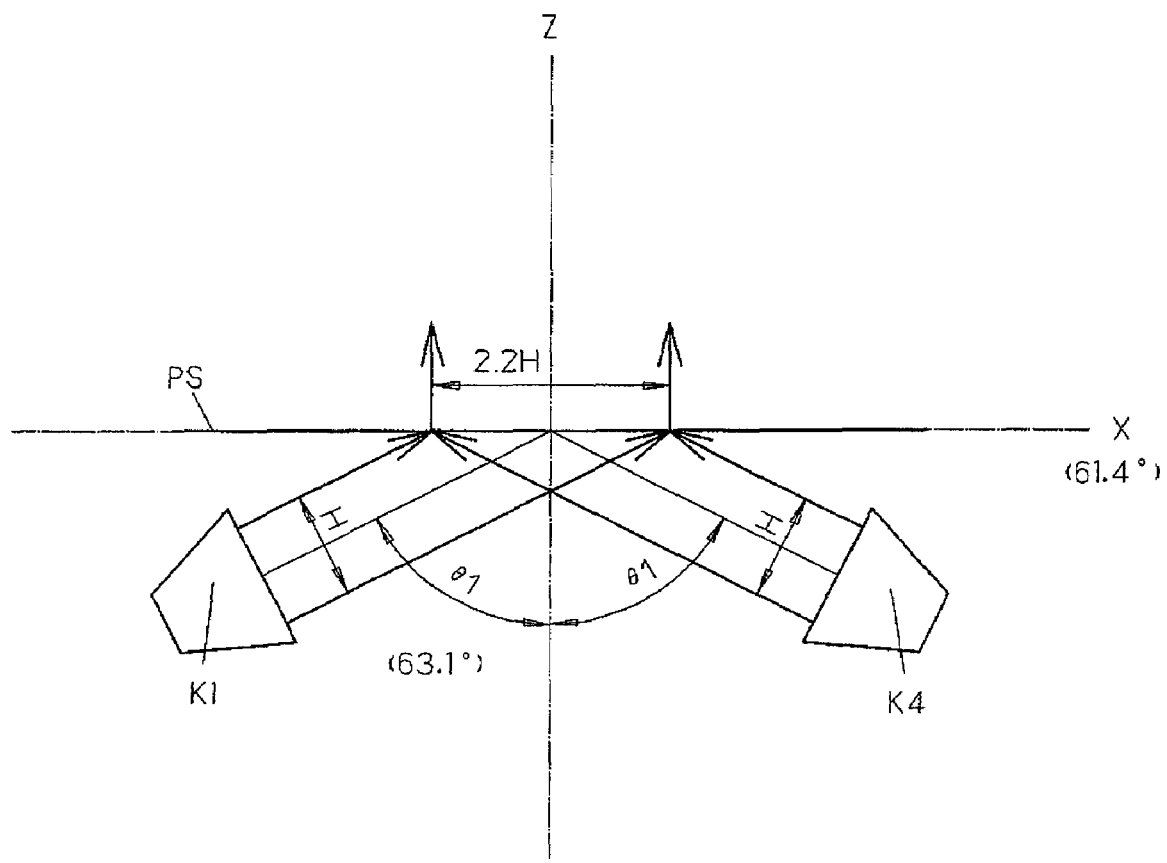
FIG. 42 is a side view showing the expansion of light when incident light obliquely enters a prism sheet in the present invention.

Next, the expansion of light in the light source apparatus of the present invention will be explained. FIG. 42 is a side view showing the expansion of light when incident light P1 and P4 enter the prism sheet PS through the lower surface of the prism sheet PS. When the light source apparatus is used as a lighting apparatus, the optical axis of exiting light from the lighting apparatus is in a direction parallel to the Z axis, and the optical axis of incident light from each of the light sources K1 and K4 is in a direction inclined at an angle θ1 (63.1°) from the Z axis. The horizontal axis is an axis rotated through 61.4° from the X axis of the prism sheet PS. Let us consider a case where incident light P1 having a light width H from the light source K1 enters the prism sheet PS through the lower surface of the prism sheet PS. In this case, because a light having a width enters a horizontal plane from an oblique direction, the width of the light expands on the plane of incidence. Consequently, the incident light P1 exits as a light having a width of 2.2H. Incident light P4 from the light source K4 also enters the prism sheet PS through the lower surface of the prism sheet PS from a position symmetric to the position of the light source K1 under the same conditions as the incident light P1 from the light source K1, and the light P4 expands in the same way as the above.

Figure 43:
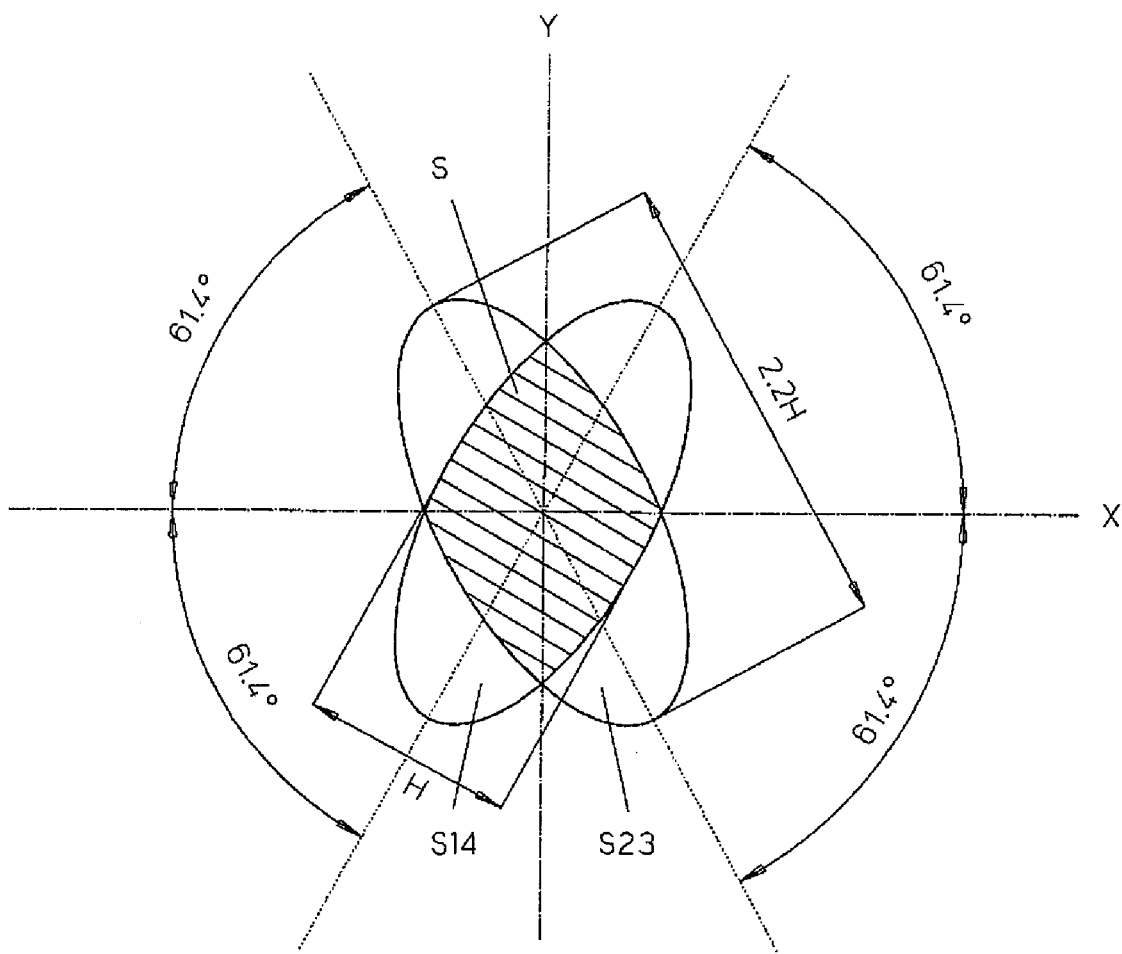
FIG. 43 is a plan view of incident light on the prism sheet shown in FIG. 42 from four light sources.

FIG. 43 is a plan view showing the expansion of light when incident light P1 to P4 enter the prism sheet PS from four directions by the four light sources K1 to K4 in the light source apparatus shown in FIG. 42. In FIG. 43, the dashed lines show axes rotated through 61.4° from the X axis. Reference symbol S14 denotes illuminating light formed from light from the light sources K1 and K4. Reference symbol S23 denotes illuminating light formed from light from the light sources K2 and K3. Each illuminating light has an elliptical sectional shape having a minor diameter equal to the width H of the incident light and a major diameter equal to the width 2.2H of the exiting light. The two elliptic illuminating light S14 and S23 are superimposed on one another with their center points aligned with each other. As a result, the overlapping portions of the two ellipses, shown by the hatched lines, can be utilized as illuminating light S synthesized from the incident light P1 to P4 from the four light sources K1 to K4. That is, if light emitted from the four light sources K1 to K4 are R light, B light, G light and G light, color-mixed white light Pw can be utilized as illuminating light S.

Tenth Embodiment

Figure 44:
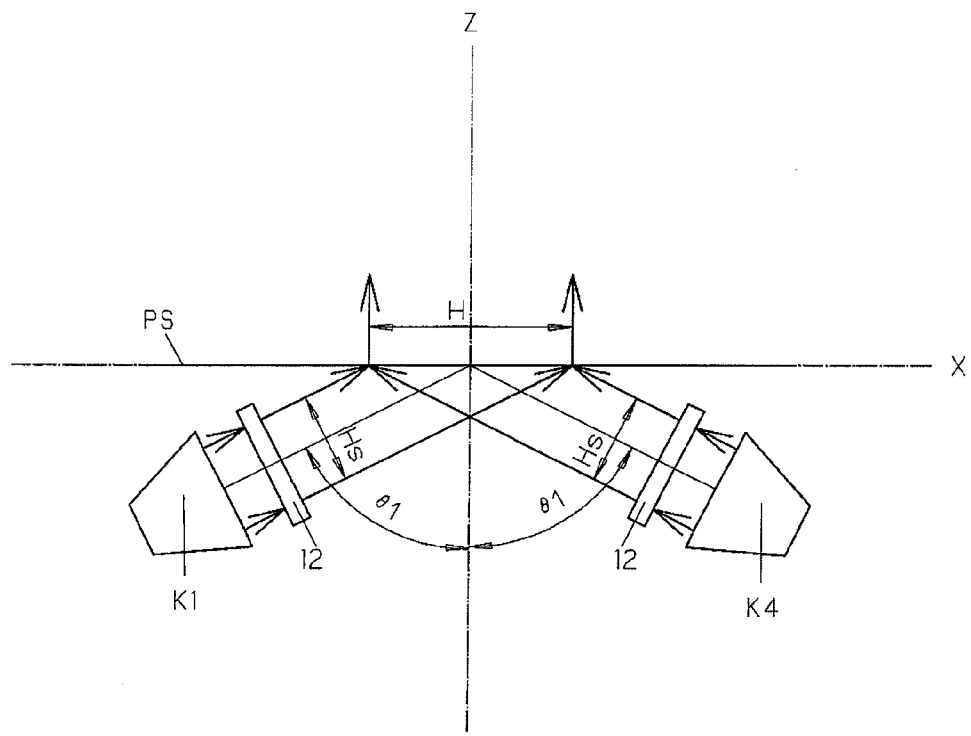
FIG. 44 is a side view showing the expansion of light when incident light obliquely enters a prism sheet in a light source apparatus according to a tenth embodiment of the present invention.
Figure 45:
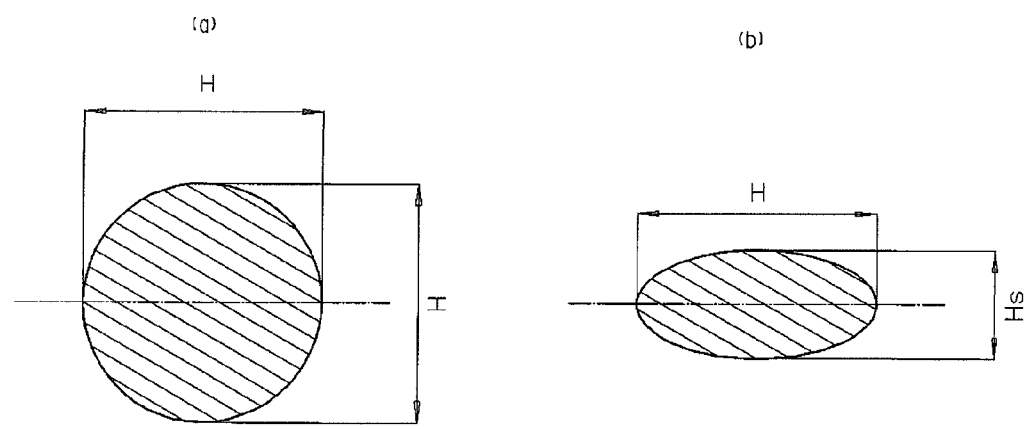
FIGS. 45a and 45b are plan views of incident light on the prism sheet shown in FIG. 44.

Next, a light source apparatus according to a tenth embodiment of the present invention will be explained with reference to FIGS. 44 to 46. FIG. 44 is a side view showing the expansion of light when incident light P1 and P4 from the light sources K1 and K4 enters the prism sheet PS through the lower surface of the prism sheet PS, which corresponds to FIG. 42 showing the light source apparatus of the ninth embodiment. Accordingly, the same constituent elements as those of the light source apparatus shown in FIG. 42 are denoted by the same reference numerals as used in FIG. 42, and redundant explanation is omitted. The light source apparatus shown in FIG. 44 differs from the light source apparatus in FIG. 42 in that lenses each having different radii of curvature in the longitudinal and transverse directions thereof are disposed as optical elements in the respective optical paths between the light sources K1 and K4 and the lower surface of the prism sheet PS. In this embodiment, anamorphic lenses 12 are used as the optical elements.

Next, the way in which light expands will be explained with reference to FIGS. 44, 45a and 45b. Let us consider a case where incident light P1 of a circular sectional shape having a diameter H as shown in FIG. 45a is emitted from the light source K1. By passing through the anamorphic lens 12, the incident light P1 is subjected to different optical changes in the longitudinal and transverse directions thereof. Consequently, the incident light P1 is formed into a light having an elliptical sectional shape as shown in FIG. 45b, which has a major diameter H in the transverse direction and a minor diameter Hs in the longitudinal direction, and this elliptical incident light P1 enters the prism sheet PS through the lower surface of the prism sheet PS. Because the incident light P1 is applied to a horizontal plane from an oblique direction, the light width in the longitudinal direction expands on the plane of incidence, resulting in the longitudinal light width expanding from Hs to H. Thus, the light is restored to a light of a circular sectional shape having a diameter H, as shown in FIG. 45a, and the restored light is allowed to exit. In other words, the light width of the incident light P1 is contracted in advance by an amount corresponding to the amount of expansion due to the oblique incidence by using the anamorphic lens 12, thereby obtaining exiting light having the same sectional shape as that of the incident light.

Figure 46:
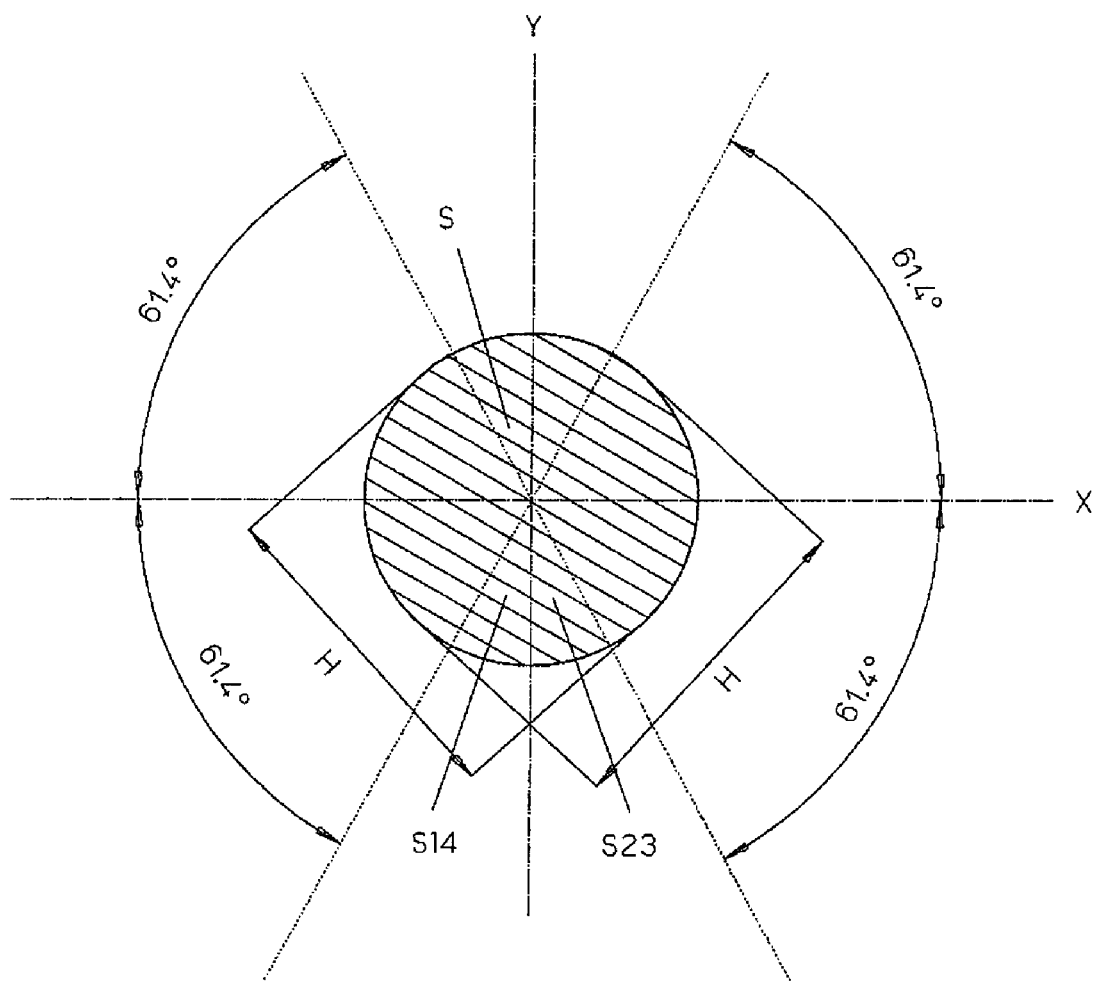
FIG. 46 is a plan view of light entering the prism sheet shown in FIG. 44 from four light sources.

FIG. 46 is a plan view showing the expansion of light when incident light enters the prism sheet PS from four directions by the four light sources K1 to K4 in the light source apparatus having the anamorphic lenses 12 shown in FIG. 44. FIG. 46 corresponds to FIG. 43 showing the light source apparatus of the ninth embodiment. FIG. 46 differs from FIG. 43 as follows. In FIG. 46, both illuminating light S14 formed from light from the light sources K1 and K4 and illuminating light S23 formed from light from the light sources K2 and K3 have a circular sectional shape of a diameter H, and hence illuminating light S obtained by superimposition of the illuminating light S14 and S23 also has a circular sectional shape of a diameter H. Accordingly, all the illuminating light S14, S23 and S become a single light of a circular sectional shape shown by the hatched lines. That is, the light source apparatus of the tenth embodiment can utilize all the incident light as illuminating light and hence can serve as an efficient lighting apparatus. It should be noted that the light source apparatus shown in FIG. 44 has an arrangement in which the anamorphic lenses 12 are disposed in the optical paths of the light source apparatus of the ninth embodiment shown in FIG. 42. The arrangement, however, is not necessarily limited to the illustrated one. An anamorphic lens 12 may be used in place of the condenser lens 2 disposed in each light source K. A reflection coating may be formed on the exit surface of the anamorphic lens 12 to implement a bandpass mirror function.

Eleventh Embodiment

Figure 47:
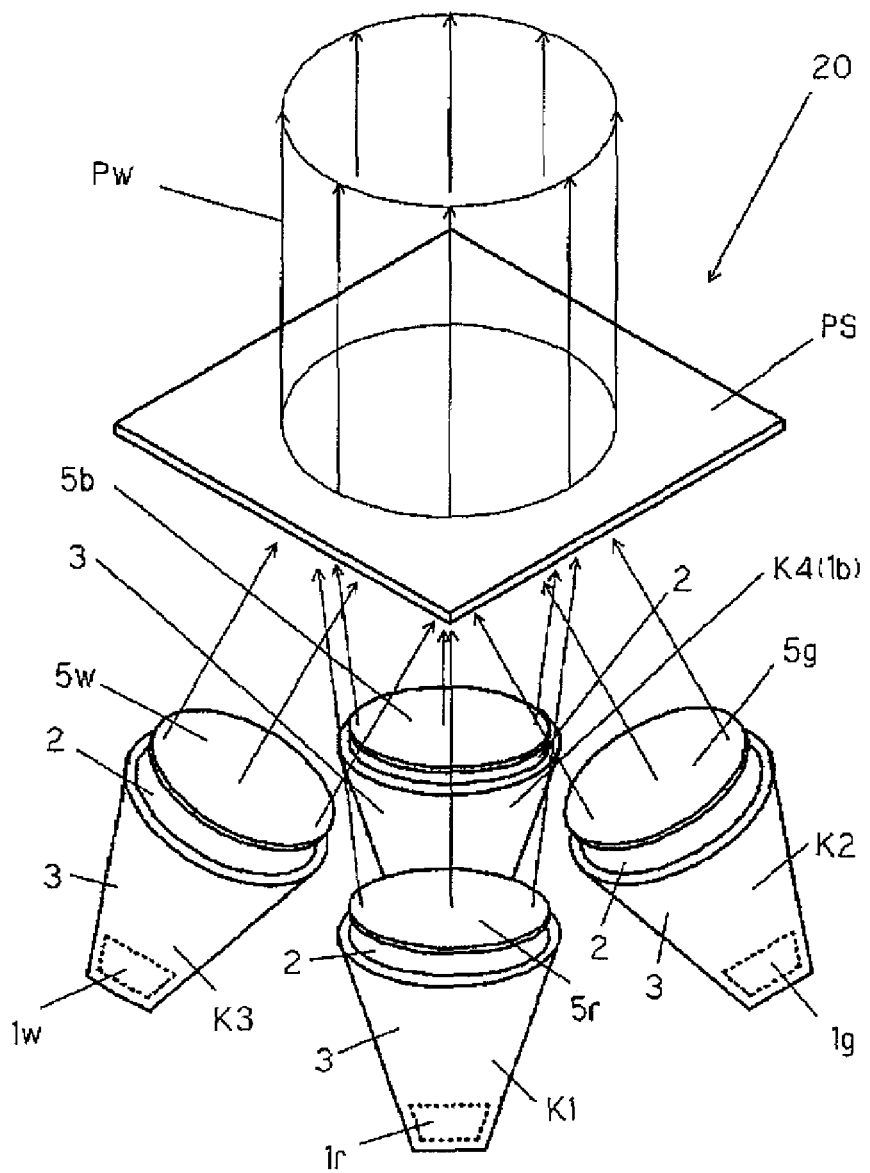
FIG. 47 is a perspective view of a light source apparatus according to an eleventh embodiment of the present invention.
Figure 48:
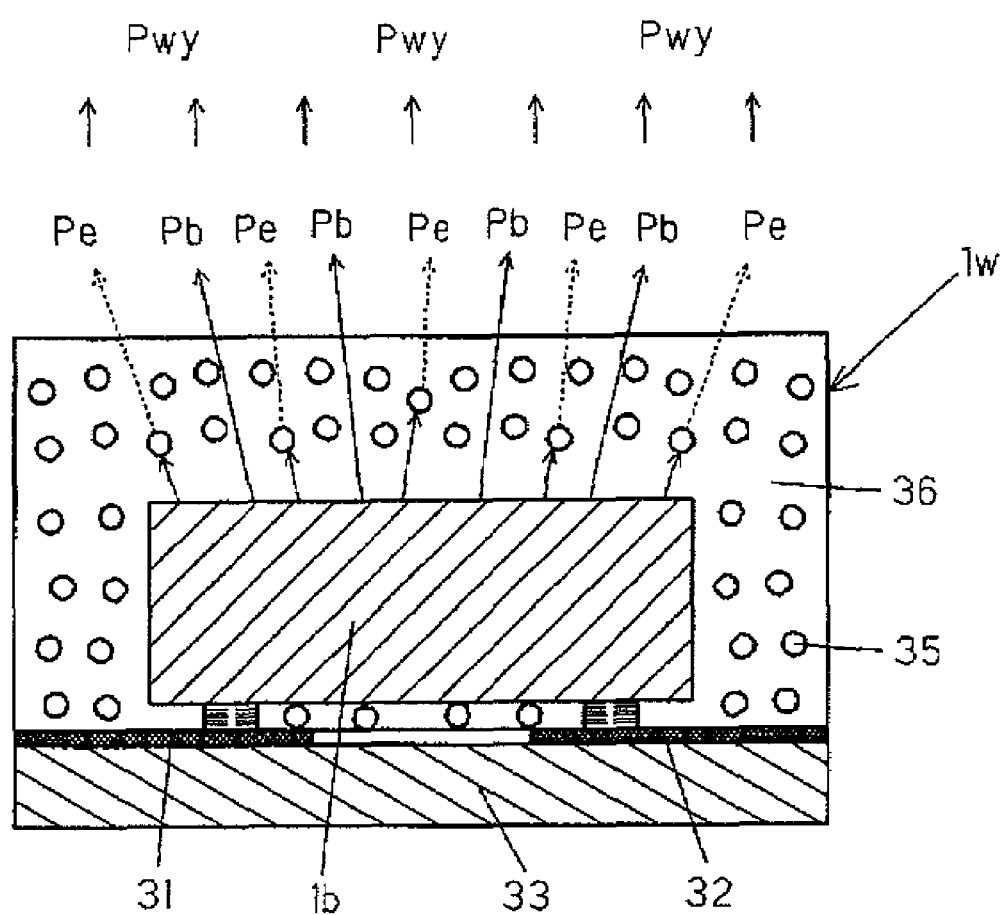
FIG. 48 is a sectional view of a white LED shown in FIG. 47.

Next, a light source apparatus according to an eleventh embodiment of the present invention will be explained with reference to FIGS. 47 and 48. FIG. 47 is a perspective view of a light source apparatus 20 according to the eleventh embodiment. The basic arrangement of the light source apparatus 20 is the same as that of the light source apparatus 10 of the ninth embodiment shown in FIG. 28. Therefore, the same constituent elements as those of the light source apparatus 10 shown in FIG. 28 are denoted by the same reference numerals as used in FIG. 28, and redundant explanation is omitted. The light source apparatus 20 shown in FIG. 47 differs from the light source apparatus 10 shown in FIG. 28 in that a white LED 1w is used as a light-emitting element of the light source K3 in place of the G LED.

The arrangement of the white LED 1w will be explained below. FIG. 48 is a sectional view of a fluorescent color-mixing type white LED. The white LED 1w has a B LED 1b connected to a substrate 33 having electrodes 31 and 32. The B LED 1b is molded with a transparent resin 36 mixed with YAG fluorescent particles 35.

The white LED 1w operates as follows. When a driving voltage is applied between the electrodes 31 and 32, the B LED 1b emits blue light Pb. When the blue light Pb collides with the fluorescent particles 35 mixed in the transparent resin 36, the fluorescent particles 35 are excited to cause wavelength conversion, and thus yellow light Pe is emitted from the fluorescent particles 35. As a result, the white LED 1w emits fluorescent white light Pwy that is a mixture of blue light Pb emitted from the B LED 1b and output without colliding with the fluorescent particles 35 and yellow light Pe obtained through wavelength conversion of the blue light Pb by colliding with the fluorescent particles 35.

As shown in FIG. 47, the light source apparatus 20 uses an R LED 1r in the light source K1, a G LED 1g in the light source K2, a white LED 1w in the light source K3 and a B LED 1b in the light source K4 to perform color mixing. Therefore, color-mixed light obtained from the R, G and B LEDs is additionally mixed with fluorescent white light Pwy from the white LED 1w. Thus, a lighting apparatus that is bright and superior in color rendering properties can be realized.

Twelfth Embodiment

Figure 49:
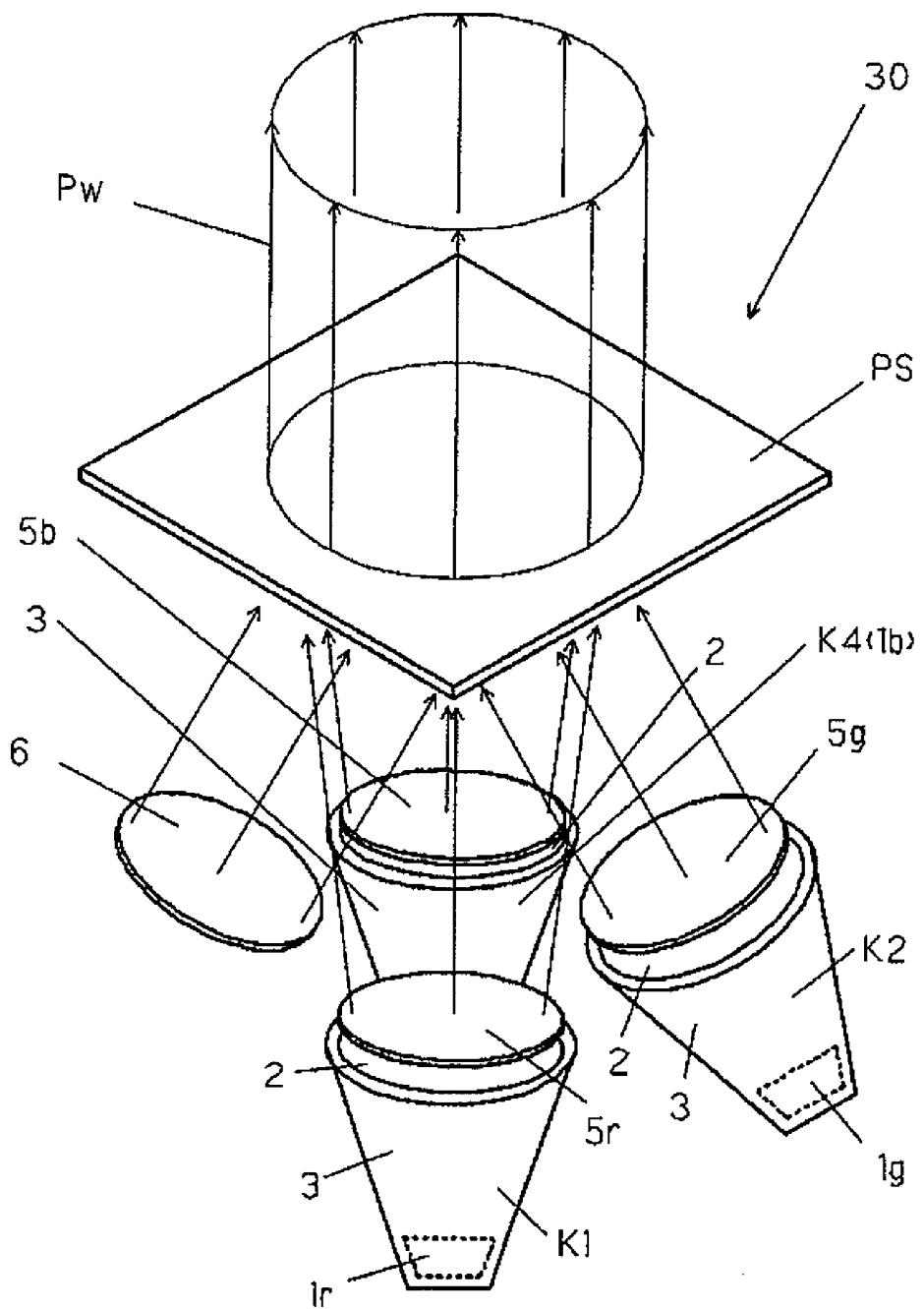
FIG. 49 is a perspective view of a light source apparatus according to a twelfth embodiment of the present invention.

Next, a light source apparatus according to a twelfth embodiment of the present invention will be explained with reference to FIG. 49. FIG. 49 is a perspective view of a light source apparatus 30 according to the twelfth embodiment of the present invention. In FIG. 49, the light source apparatus 30 has the same basic structure as that of the light source apparatus 10 shown in FIG. 28. Therefore, the same constituent elements as those of the light source apparatus 10 shown in FIG. 28 are denoted by the same reference numerals as used in FIG. 28, and redundant explanation is omitted. The light source apparatus 30 differs from the light source apparatus 10 in that the light source K3 disposed in the zone S3 in the light source apparatus 10 is replaced with a mere reflection mirror 6. That is, the light source apparatus 30 uses three light sources, i.e. an R light source K1, a G light source K2, and a B light source K4. The reflection mirror 6 disposed in the zone S3 merely performs the function of converting non-effective light into effective light by reflecting all reflected light from the light sources. It is desirable in this arrangement that the G LED of the light source K2 should be balanced with the R and B LEDs of the other light sources in terms of emission light quantity by increasing the driving current or the number of G LEDs mounted to thereby increase the light quantity.

The number of light sources may be two. For example, if a light source K1 having an R LED and a light source K4 having a B LED are disposed in two zones and reflection mirrors 6 are disposed in two zones where no light source is disposed, exiting light from the prism sheet PS is mixed color light of R light from the light source K1 and B light from the light source K4. That is, two different colors of light from the two light sources are mixed by the prism sheet, and non-effective light is converted into effective light by the reflection mirrors. The mixing of two different colors of light and the operation of converting non-effective light into effective light by the mirrors are as has been stated above. It should be noted that light sources to be used may be determined as desired according to the color of color light to be obtained. The light source apparatus 30 in this embodiment can efficiently mix different colors of light from two or three light sources to produce monochromatic light by using a single prism sheet and thus can be expected to be used as white-light sources, variable color lighting apparatus, etc.

Thirteenth Embodiment

Figure 50:
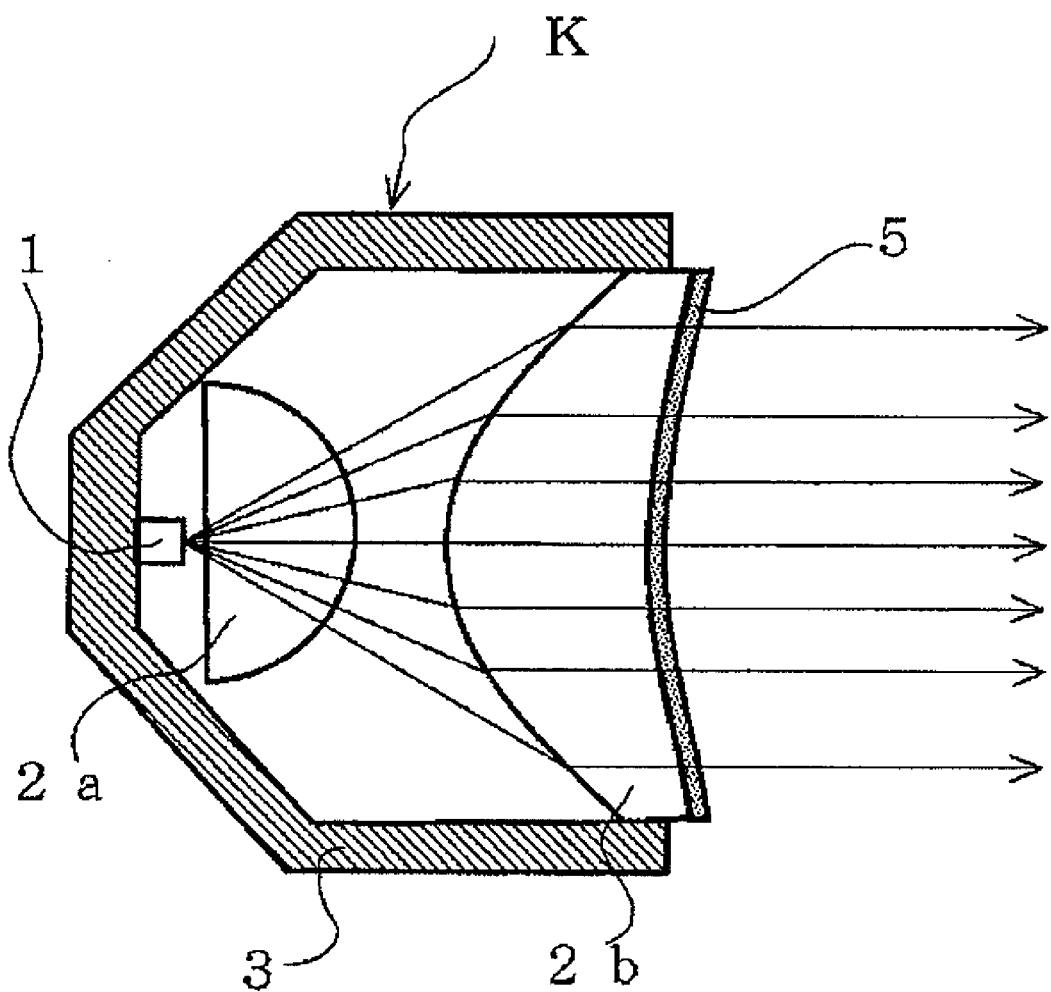
FIG. 50 is a perspective view of a light source apparatus according to a thirteenth embodiment of the present invention.

Next, a light source of a light source apparatus according to a thirteenth embodiment of the present invention will be explained. FIG. 50 is a sectional view of a light source of the light source apparatus according to the thirteenth embodiment of the present invention. In the figure, a light source K has an LED 1 and two lenses 2a and 2b incorporated in a casing 3, and a coating of bandpass mirror 5 is formed on the exit surface of the second lens 2b. That is, the light source K in this embodiment uses two condenser lenses to collimate light emitted from the LED 1 into parallel light. In addition, the bandpass mirror 5 is implemented by forming a reflection coating on the exit surface of the second lens 2b, thereby integrating the bandpass mirror 5 with the light source K. Further, the exit surface of the second lens 2b is formed into a concave lens to improve the performance of collecting reflected light.

It should be noted that the exit surface of the second lens 2b on which the coating of bandpass mirror 5 is formed is not necessarily limited to a concave lens (or concave mirror) but may be a convex lens (or convex mirror) or a plane lens. Which of them is to be used should preferably be properly determined according to the light-emitting condition of an LED used as a light-emitting source and the condition of reflected light. That is, if the LED is a light source emitting divergent light as in the case of a multiplanar light-emitting source, it is preferable to use a concave lens having the function of converging reflected light. If the LED is a point source emitting light having a high intensity at the center thereof, a convex lens having the function of diverging reflected light should preferably be used.

Fourteenth Embodiment

Figure 51:
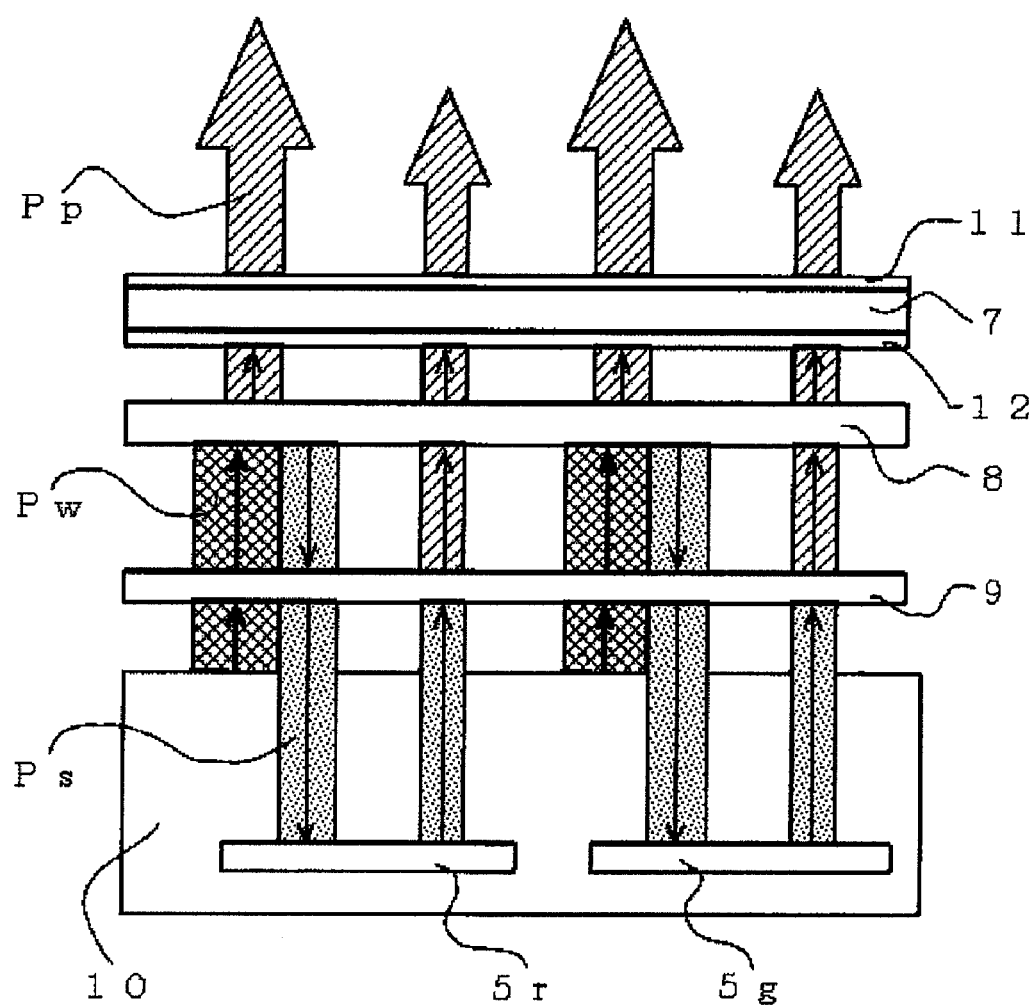
FIG. 51 is a sectional view schematically showing a liquid crystal display apparatus using a light source apparatus of the present invention as a backlight unit.

The following is an explanation of an arrangement of a liquid crystal display apparatus using a light source apparatus according to the present invention as a backlight unit. FIG. 51 is a sectional view schematically showing a liquid crystal display apparatus using a light source apparatus of the present invention as a backlight unit. Reference numeral 10 denotes a light source apparatus of the present invention arranged as shown in FIG. 28. The light source apparatus 10 incorporates four bandpass mirrors 5r, 5g, 5b and 5g. A liquid crystal display element 7 has an upper polarizer 11 and a lower polarizer 12. A reflection-type polarization converting element 8 is disposed between the liquid crystal display element 7 and the light source apparatus 10. A phase plate 9 is disposed between the reflection-type polarization converting element 8 and the bandpass mirrors 5 of the light source apparatus 10. The liquid crystal display element 77 the reflection-type polarization converting element 8 and the phase plate 9 constitute in combination a liquid crystal display apparatus. The light source apparatus 10 constitutes a backlight unit. It should be noted that the light source apparatus 10 may be any of the above-described light source apparatuses.

The following is an explanation of the action of illuminating light in the liquid crystal display apparatus of the present invention. In FIG. 51, Pw shown by the lattice pattern is exiting light from the light source apparatus 10, and Pp shown by the hatched lines represents light (e.g. p-polarized light) transmitted through the reflection-type polarization converting element 8. Further, Ps shown by the pear-skin pattern represents light (e.g. s-polarized light) reflected by the reflection-type polarization converting element 8. First, exiting light Pw from the light source apparatus 10 passes through the phase plate 9 and impinges on the reflection-type polarization converting element 8. Of the exiting light Pw, p-polarized light Pp passes through the reflection-type polarization converting element 8 and illuminate the liquid crystal display element 7. However, the s-polarized light Ps is reflected by the reflection-type polarization converting element 8, passes through the phase plate 9 and return to the light source apparatus 10.

The s-polarized light Ps reversely entering the light source apparatus 10 is incident light from directly above as seen from the light source apparatus 10. Because the light source apparatus 10 is arranged to allow combined light to exit directly upward, incident light from directly above passes through an optical path opposite to that of exiting light. The incident light from directly above firstly enters the prism sheet PS2 through the prism rows PS2. Because the incident light has no inclination, it is equally divided into two and directed to the prism rows PS1. Although the light reaching the prism rows PS1 has an inclination, the direction of the inclination is perpendicular to the prism rows PS1. Therefore, the lights are also equally divided into two at the prism rows PS1. That is, the s-polarized light Ps reversely entering the light source apparatus 10 from directly above are equally divided into four by the two prism rows on the prism sheet PS. The light separated into four pass through respective optical paths opposite to those of the exiting light. Therefore, the separated lights are directed to the four light sources, respectively, and reflected by the four bandpass mirrors 5r, 5g, 5b and 5g to reexit the light source apparatus 10. The reexiting s-polarized light Ps passes through the phase plate 9, thereby being converted into p-polarized light Pp and thus allowed to pass through the reflection-type polarization converting element 8 to illuminate the liquid crystal display element 7. It should be noted that the phase plate 9 in this embodiment has a retardation set so that s-polarized light is converted into p-polarized light by passing through the phase plate 9 twice.

Figure 52:
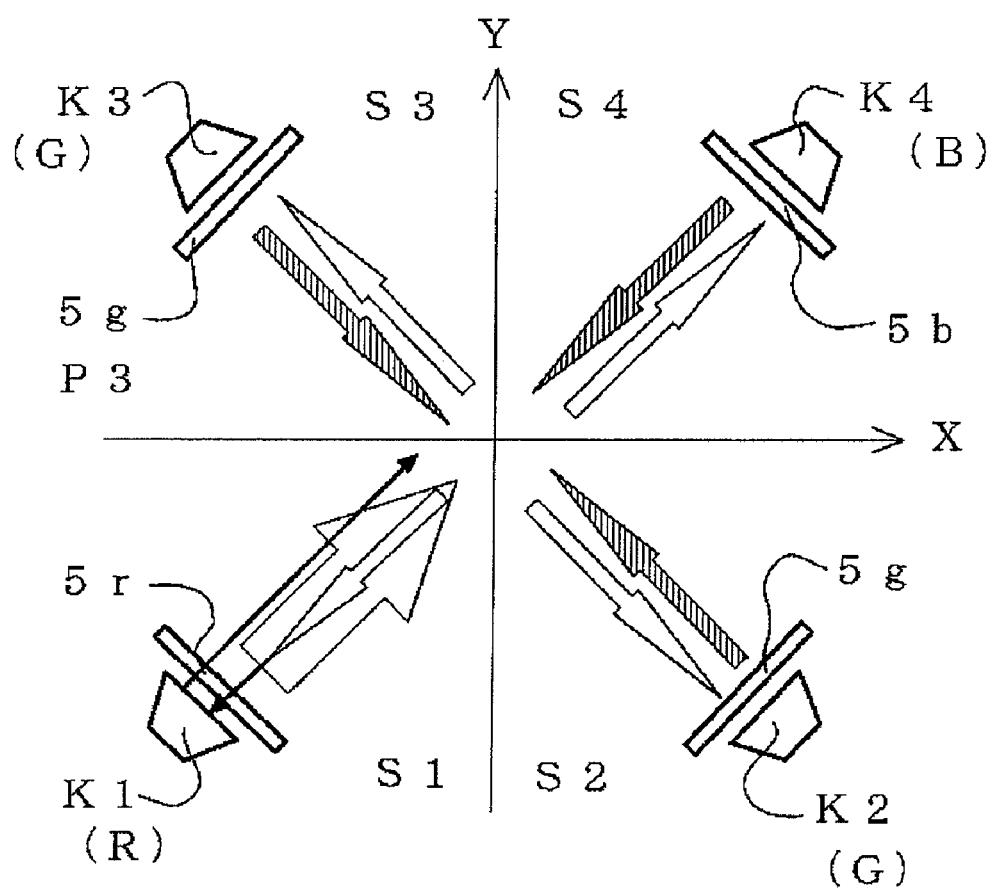
FIG. 52 is a plan view showing the way in which light reflected by a reflection-type polarization converting element shown in FIG. 51 reversely enters the light sources of the light source apparatus.

FIG. 52 show the way in which light is reflected by the reflection-type polarization converting element 8 to enter the light source apparatus 10 reversely. FIG. 52 shows reversely incident light having an R light component, which is emitted from the light source K1 in the zone S1 by way of example. The light reversely entering the light source apparatus 10 is divided into four equal parts and directed to the four bandpass mirrors 5r, 5g, 5b and 5g, respectively. The light having an R light component are reflected for recycling by the bandpass mirrors 5g and 5b as shown by the hatched arrows. The light having an R light component are transmitted through the bandpass mirror 5r, which is the light-emitting source of the light. That is, the light is not reflected by the bandpass mirror 5r. However, a part of the light transmitted through the bandpass mirror 5r impinges on and is reflected by the mounting surface of the LED element, which has a high reflectance, as shown by the thin-line arrow.

As has been stated above, the combination of a light source apparatus of the present invention and a liquid crystal display element enables light recycling to be performed efficiently by the reflection-type polarization converting element without using a diffusion enhancing member in the optical path of the backlight unit. The light-recycling efficiency can be further increased by using the phase plate in combination with the reflection-type polarization converting element. Although in this embodiment the phase plate 9 is disposed between the liquid crystal display element 7 and the light source apparatus 10, the phase plate 9 can be omitted by using a prism sheet having birefringent properties that introduce a desired retardation as a prism sheet constituting the light source apparatus. By so doing, an even thinner and less costly backlight unit can be realized.

As has been stated above, the present invention enables incident light from a plurality of light sources to be efficiently combined and color-mixed together by a thin optical system using a single prism sheet. Therefore, it is possible to provide a light source apparatus that is less costly, small and thin in shape and optically superior in light combining performance. The present invention has a wide application range and is usable not only as general lighting apparatus but also as light sources for projectors. The application of the present invention to a backlight unit for display apparatus, for example, enables realization of a display apparatus of high light utilization efficiency.

Figure 53:
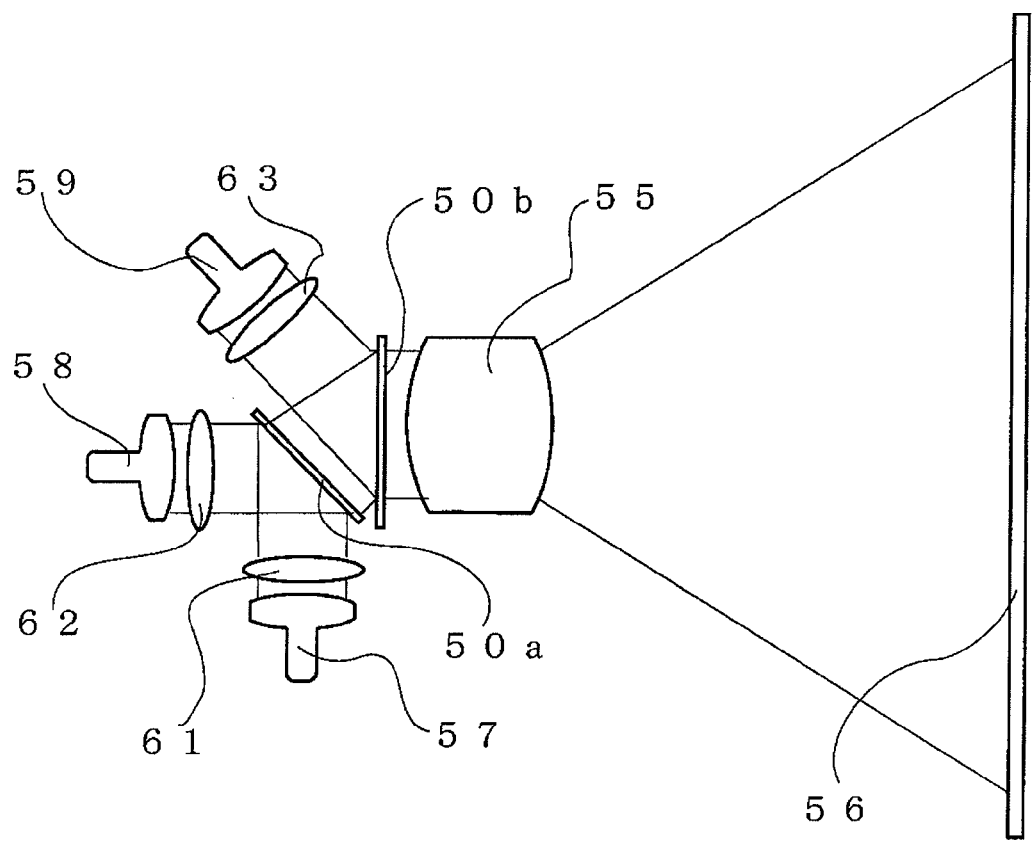
FIG. 53 is a schematic view showing the arrangement of a conventional color projector.
Figure 54:
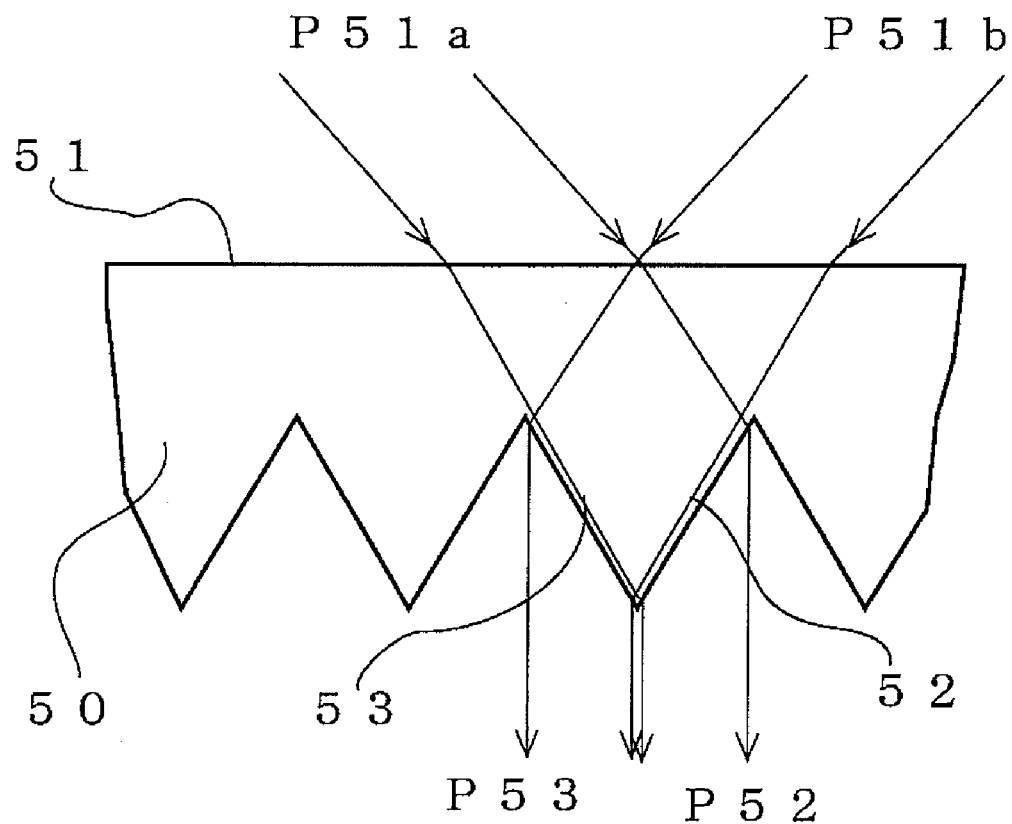
FIG. 54 is a fragmentary sectional view of a linear prism plate shown in FIG. 53.
Figure 55:
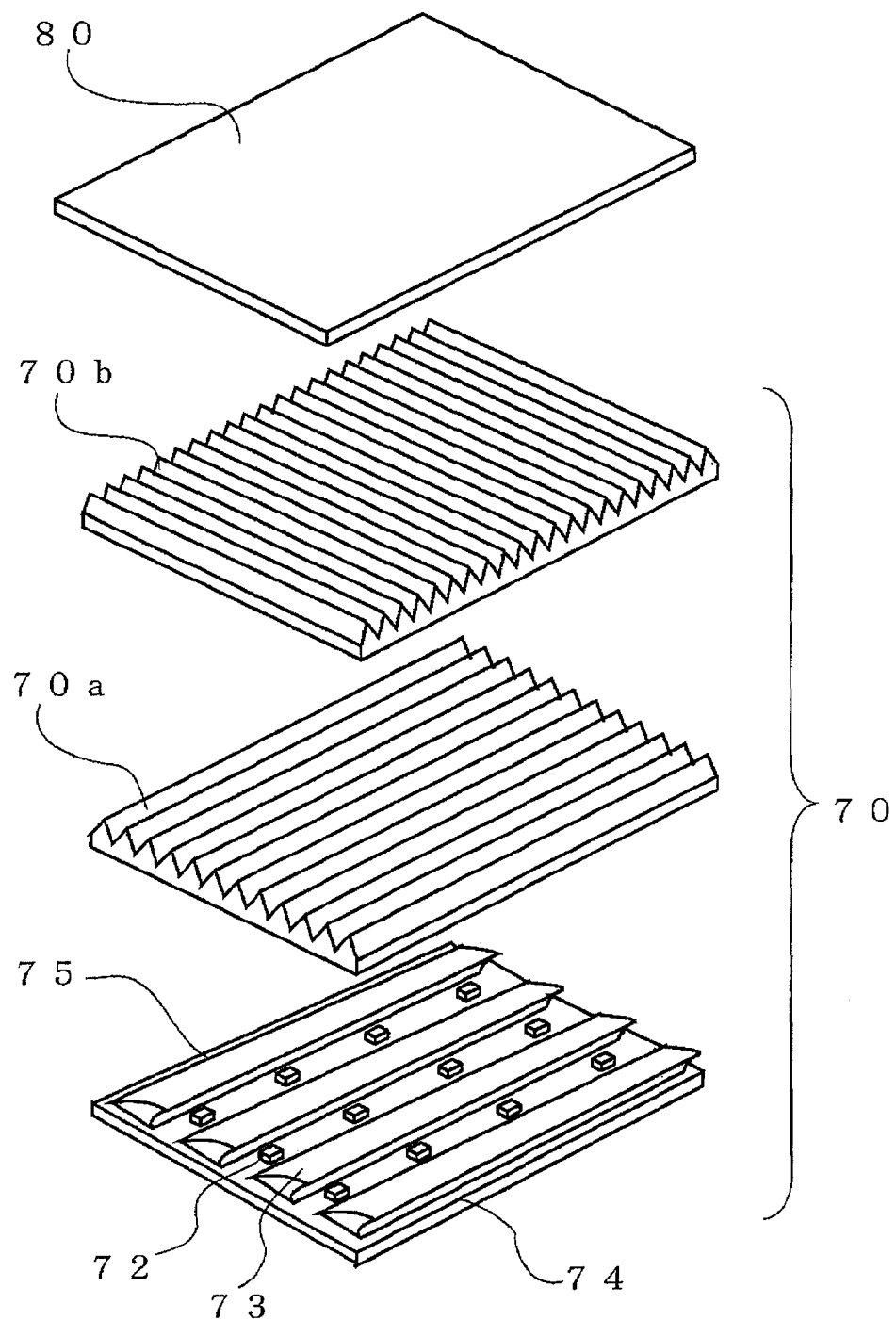
FIG. 55 is an exploded perspective view of a conventional planar light-emitting apparatus.
Figure 56:
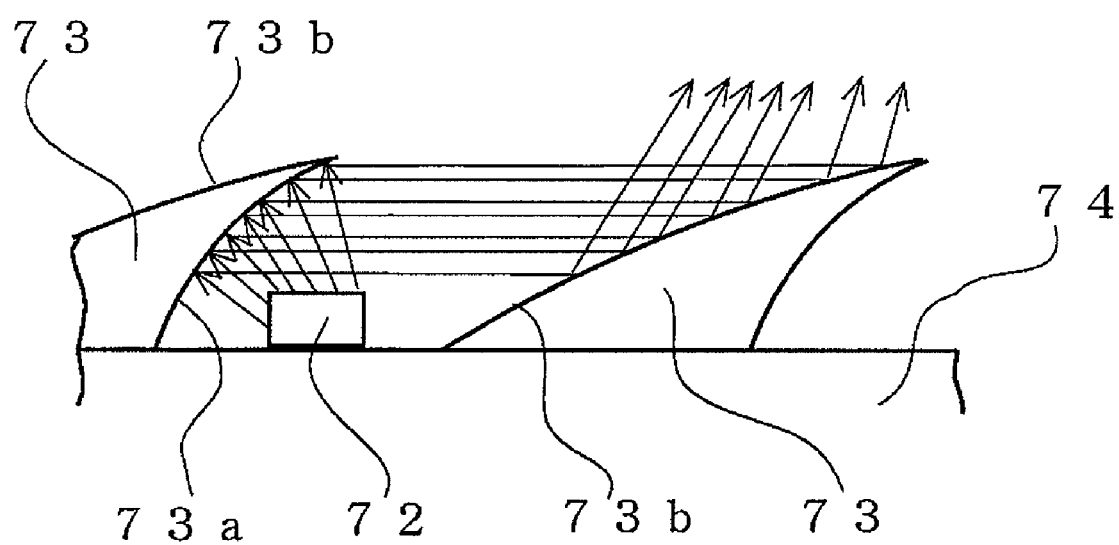
FIG. 56 is an enlarged side view of a part of a light-emitting substrate shown in FIG. 55.

In the foregoing embodiments, the light source apparatus has been explained with regard to arrangements using a single prism sheet or two stacked prism sheets. The present invention, however, is not necessarily limited to the described arrangements. The same object can also be attained with an arrangement in which two or three prism sheets are disposed arbitrarily to combine light from a plurality of light sources as in the light source apparatus shown in FIG. 53 by providing a bandpass mirror in front of each light source.

As has been stated above, the present invention enables incident light from a plurality of light sources to be efficiently combined and color-mixed together by a thin optical system using at least one prism sheet. Therefore, it is possible to provide a light source apparatus that is small and thin in shape and optically superior in light combining performance. The present invention has a wide application range and is usable not only as general lighting apparatus but also as light sources for projectors. The application of the present invention to a backlight unit for display apparatus, for example, enables realization of a display apparatus of high light utilization efficiency.

The invention claimed is:

1. A light source apparatus comprising:
   a plurality of light sources different in emission wavelength from each other;
   a prism sheet having a plurality of mutually parallel fine elongated prisms on at least one surface thereof, the prism sheet configured to receive lights from the plurality of light sources through a light entrance surface thereof at predetermined angles and emit the lights from an exit surface thereof as color-mixed exiting light; and
   a bandpass mirror disposed between each of the light sources and the prism sheet to transmit light in a wavelength region emitted from a corresponding one of the light sources and to reflect light in other wavelength regions.

2. The light source apparatus of claim 1, wherein an other surface of the prism sheet is smooth.

3. The light source apparatus of claim 1, wherein the prism sheet has the prisms formed on both surfaces thereof and a length direction of the prisms formed on one of the both surfaces and a length direction of the prisms formed on an other of the both surfaces are configured to intersect each other at a predetermined angle as seen from a direction of incidence of light.

4. The light source apparatus of claim 1, wherein the prisms each have one prism inclined surface through which incident light is refracted to exit from the exit surface and an other prism inclined surface that reflects incident light toward the bandpass mirror, the bandpass mirror being arranged to allow the light reflected from the other prism inclined surface to be reenter the light entrance surface of the prism sheet.

5. The light source apparatus of claim 1, wherein a lens for collecting light is disposed in front of a light-emitting surface of each of the light sources.

6. The light source apparatus of claim 5, wherein the lens has different radii of curvature in longitudinal and transverse directions thereof.

7. The light source apparatus of claim 5, wherein the bandpass mirror is a reflection coating formed on an exit surface of the lens.

8. The light source apparatus of claim 7, wherein the exit surface of the lens, on which the reflection coating is formed, is a curved surface.

9. The light source apparatus of claim 1, having a plurality of the prism sheets.

10. The light source apparatus of claim 1, having two prism sheets, the two prism sheets being layered each other and length directions of their respective prisms intersect each other at a predetermined angle as seen in a direction of incidence of light.

11. The light source apparatus of claim 10, wherein the light sources are disposed in four zones defined by intersection of prism rows each comprising the mutually parallel prisms of the two layered prism sheets.

12. The light source apparatus of claim 10, wherein the two layered prism sheets configured to receive lights from the light sources at the entrance surface along near center lines passing through respective centers of angles of intersection between the prism rows of the two layered prism sheets.

13. The light source apparatus of claim 1, wherein the prism sheet configured to receive the lights from the light sources at a predetermined converging point of the prism sheet.

14. The light source apparatus of claim 13, wherein the light sources are disposed in point symmetry with respect to the predetermined converging point.

15. The light source apparatus of claim 13, wherein the light sources are disposed in line symmetry with respect to an axis that passes through the predetermined converging point.

16. The light source apparatus of claim 1, wherein the light sources comprises red, green and blue light-emitting diode light sources.

17. The light source apparatus of claim 16, wherein the light sources are disposed at four positions on a side of the light entrance surface of the prism sheet, and the light sources comprises red, green and blue light-emitting diode light sources disposed at three of the four positions and a green light-emitting diode light source disposed at a remaining one of the four positions.

18. The light source apparatus of claim 10, wherein red, green and blue light-emitting diode light sources are disposed at three positions, respectively, at a side of the light entrance surface of the two layered prism sheets, and a green light-emitting diode light source is disposed at one position at the side of the light entrance surface of the two layered prism sheets, the two green light-emitting diode light sources being disposed in mutually adjacent zones.

19. The light source apparatus of claim 16, wherein red, green and blue light-emitting diode light sources are disposed at three positions, respectively, at a side of the light entrance surface of the prism sheet, and a blue YAG light-emitting diode light source is disposed at one position at the side of the light entrance surface of the prism sheet.

20. The light source apparatus of claim 16, wherein red, green and blue light-emitting diode light sources are disposed at three positions, respectively, at a side of the light entrance surface of the prism sheet, and a reflection mirror is disposed at one position at the side of the light entrance surface of the prism sheet.

21. The light source apparatus of claim 1, wherein the prisms each have an apex angle of substantially 90 degrees.

22. The light source apparatus of claim 3, wherein the light sources are disposed in four zones defined by intersection of prism rows each comprising the prisms on each surface of the prism sheet.

23. The light source apparatus of claim 16, wherein red, green and blue light-emitting diode light sources are disposed at three positions, respectively, at a side of the light entrance surface of the prism sheet, and a white light-emitting diode light source is disposed at one position at the side of the light entrance surface of the prism sheet.

24. The light source apparatus of claim 1, wherein the light sources comprises two light-emitting diode light sources having a same emission wavelength and disposed at two positions, respectively, at a side of the light entrance surface of the prism sheet, the two light-emitting diode light sources being disposed in zones opposing each other with respect to an axis parallel to a row of the prism formed at the side of the light entrance surface of the prism sheet.

25. The light source apparatus of claim 1, wherein a reflection mirror is disposed at at least one of positions at which the light sources are placed at a side of the light entrance surface of the prism sheet.

26. A liquid crystal display apparatus comprising:
the light source apparatus of claim 1, the light source apparatus being used as a backlight unit for a liquid crystal cell; and
a reflection-type polarization converting element disposed between the liquid crystal cell and the light source apparatus.

27. The liquid crystal display apparatus of claim 26, wherein the prism sheet has birefringent properties.

28. The liquid crystal display apparatus of claim 26, wherein a phase plate is disposed between the reflection-type polarization converting element and the bandpass mirror.

* * * * *